(12) United States Patent
Ström et al.

(10) Patent No.: US 11,330,278 B2
(45) Date of Patent: May 10, 2022

(54) CHROMA ADJUSTMENT WITH COLOR COMPONENTS IN COLOR SPACES IN VIDEO CODING

(71) Applicant: TELEFONAKTIEBOLAGET LM ERICSSON (PUBL), Stockholm (SE)

(72) Inventors: Jacob Ström, Stockholm (SE); Kenneth Andersson, Gävle (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 171 days.

(21) Appl. No.: 16/472,393

(22) PCT Filed: Dec. 18, 2017

(86) PCT No.: PCT/SE2017/051292
§ 371 (c)(1),
(2) Date: Jun. 21, 2019

(87) PCT Pub. No.: WO2018/117948
PCT Pub. Date: Jun. 28, 2018

(65) Prior Publication Data
US 2019/0364288 A1    Nov. 28, 2019

Related U.S. Application Data

(60) Provisional application No. 62/438,786, filed on Dec. 23, 2016.

(51) Int. Cl.
*G09G 5/02* (2006.01)
*H04N 19/117* (2014.01)
(Continued)

(52) U.S. Cl.
CPC ........... *H04N 19/186* (2014.11); *G09G 5/026* (2013.01); *H04N 19/117* (2014.11); *G09G 2340/06* (2013.01)

(58) Field of Classification Search
None
See application file for complete search history.

(56) References Cited

U.S. PATENT DOCUMENTS 9,363,421 B1 *   6/2016   Russell ................ H04N 19/86
2002/0167523 A1 * 11/2002   Taylor ................. G09G 5/393
                                                345/582

(Continued)

FOREIGN PATENT DOCUMENTS

WO    2016130066 A1    8/2016
WO    2016168051 A1    10/2016
(Continued)

OTHER PUBLICATIONS

Extended European Search Report dated Nov. 4, 2019, issued in European Patent Application No. 17883949.4, 8 pages.
(Continued)

*Primary Examiner* — Soo Shin
(74) *Attorney, Agent, or Firm* — Rothwell, Figg, Ernst & Manbeck, P.C.

(57) ABSTRACT

A processing for a first pixel in a picture comprises setting upper and/or lower limits of a first color component of the first pixel in a first color space to a respective fixed value if a maximum and/or minimum value of the first color component in the first color space results in a color component in a second color space that is below a first value of the color component in the second color space and above a second value of the color component in the second color space. A filtered value is obtained of the first color component and which is equal to or larger than the lower limit and equal to or lower than the upper limit. The processing results in filtered values that are cheaper to encode but that are visibly undistinguishable from the original colors of the pixels.

19 Claims, 18 Drawing Sheets

(51) Int. Cl.
*H04N 19/154* (2014.01)
*H04N 19/186* (2014.01)
*H04N 19/86* (2014.01)

(56) References Cited

U.S. PATENT DOCUMENTS

| | | | | |
|---|---|---|---|---|
| 2003/0038803 | A1* | 2/2003 | Morein | G06T 15/405 |
| | | | | 345/421 |
| 2003/0152285 | A1 | 8/2003 | Feldmann et al. | |
| 2009/0167751 | A1 | 7/2009 | Kerofsky | |
| 2009/0167789 | A1 | 7/2009 | Kerofsky | |
| 2013/0321700 | A1 | 12/2013 | Cote et al. | |
| 2014/0285477 | A1* | 9/2014 | Cho | G09G 5/06 |
| | | | | 345/207 |
| 2014/0333654 | A1 | 11/2014 | Li | |
| 2015/0381994 | A1* | 12/2015 | Yu | H04N 19/186 |
| | | | | 375/240.24 |
| 2016/0309059 | A1* | 10/2016 | Tourapis | H04N 1/6058 |
| 2017/0134731 | A1* | 5/2017 | Tourapis | H04N 19/51 |
| 2019/0364288 | A1* | 11/2019 | Strom | H04N 19/117 |

FOREIGN PATENT DOCUMENTS

| | | | | |
|---|---|---|---|---|
| WO | 2016186547 | A1 | 11/2016 | |
| WO | 2016186551 | A1 | 11/2016 | |
| WO | WO-2016186551 | A1 * | 11/2016 | .......... H04N 19/186 |
| WO | 2017200447 | A1 | 11/2017 | |

OTHER PUBLICATIONS

International Search Report and the Written Opinion of the International Searching Authority, issued in corresponding International Application No. PCT/SE2017/051292, dated Apr. 24, 2018, 15 pages.
Xi et al. "The Color Components' Computing on Different Color Spaces and the Using for Image Segmentation" 2011 Third International Conference on Multimedia Information Networking and Security, IEEE, pp. 29-32.
De Dios et al. "Fast face segmentation in component color space" 2004 International Conference on Image Processing (ICIP), IEEE, pp. 191-194.
Kikuchi et al. "Adaptive Color Space Transforms for 4:4:4 Video Coding Considering Uncorrelated Noise Among Color Components" 2016 IEEE 18th International Workshop on Multimedia Signal Processing (MMSP), Sep. 21, 2016, 5 pages.
Ström et al. "Chroma Adjustment for HDR Video" 2017 IEEE International Conference on Image Processing (ICIP), Sep. 17, 2017, IEEE, 5 pages.
SMPTE Standard "High Dynamic Range Electro-Optical Transfer Function of Mastering Reference Displays", SMPTE ST 2084:2014, 14 pages.
ITU-R Radiocommunication Sector of ITU, Recommendation ITU-R BT.2020-2 (Oct. 2015), "Parameter values for ultra-high definition television systems for production and international programme exchange" BT Series, Broadcasting service (television), 8 pages.
ITU-R Radiocommunication Sector of ITU, Recommendation ITU-R BT.1886 (Mar. 2011), "Reference electro-optical transfer function for flat panel displays used in HDTV studio production" BT Series, Broadcasting service (television), 7 pages.
ITU-R Radiocommunication Sector of ITU, Recommendation ITU-R BT.709-6 (Jun. 2015), "Parameter values for the HDTV standards for production and international programme exchange" BT Series, Broadcasting service (television), 19 pages.
SMPTE Engineering Guideline "Digital Source-Processing—D-Cinema Low Frequency Effects (LFE) Channel Audio Characteristics", EG 432-2-2006, 3 pages.
SMPTE Engineering Guideline "Digital Source Processing—Color Processing for D-Cinema", SMPTE EG 432-1:2010, 81 pages.
CEA Standard "HDR Static Metadata Extensions" CEA-861.3, Jan. 2015, 8 pages.
Ström "Investigation of HDR Color Subsampling" International Organisation for Standardisation Organisation Internationale De Normalisation, ISO/IEC JTC1/SC29/WG11, Coding of Moving Pictures and Audio, ISO/IEC JTC1/SC29/WG11 MPEG2014/M35841, Feb. 2015, 23 pages.
Pytlarz "Over of ICtCp" Joint Collaborative Team on Video Coding (JCT-VC) of ITU-T SG 16 WP 3 and ISO/IEC JTC 1/SC 29/WG 11, Feb. 19-26, 2016, JCTVC-W0050, 6 pages.
Applied Vision Science Group, Dolby Laboratories "Versatile Color Space for Large Color Volumes", Feb. 24, 2016, 33 pages.
Rusanovskyy et al. "Single layer non-normative (category 3a) NCL and CL responses to the Call for Evidence on HDR/WCG" International Organisation for Standardisation Organisation Internationale De Normalisation, ISO/IEC JTC1/SC29/WG11, Coding of Moving Pictures and Audio, ISO/IEC JTC1/SC29/G11 M36256, Jun. 2015, 165 pages.

* cited by examiner

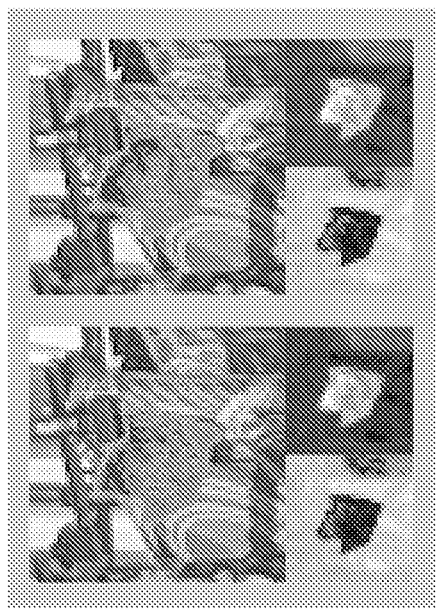
Fig. 5
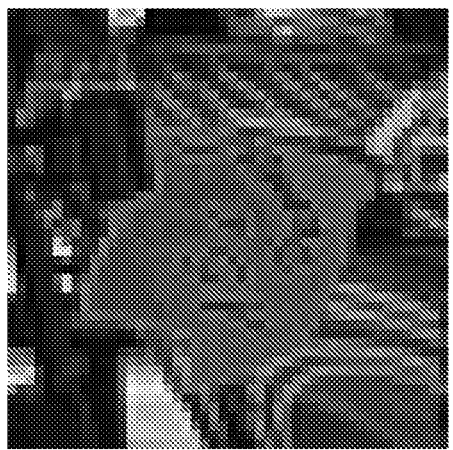
Fig. 4

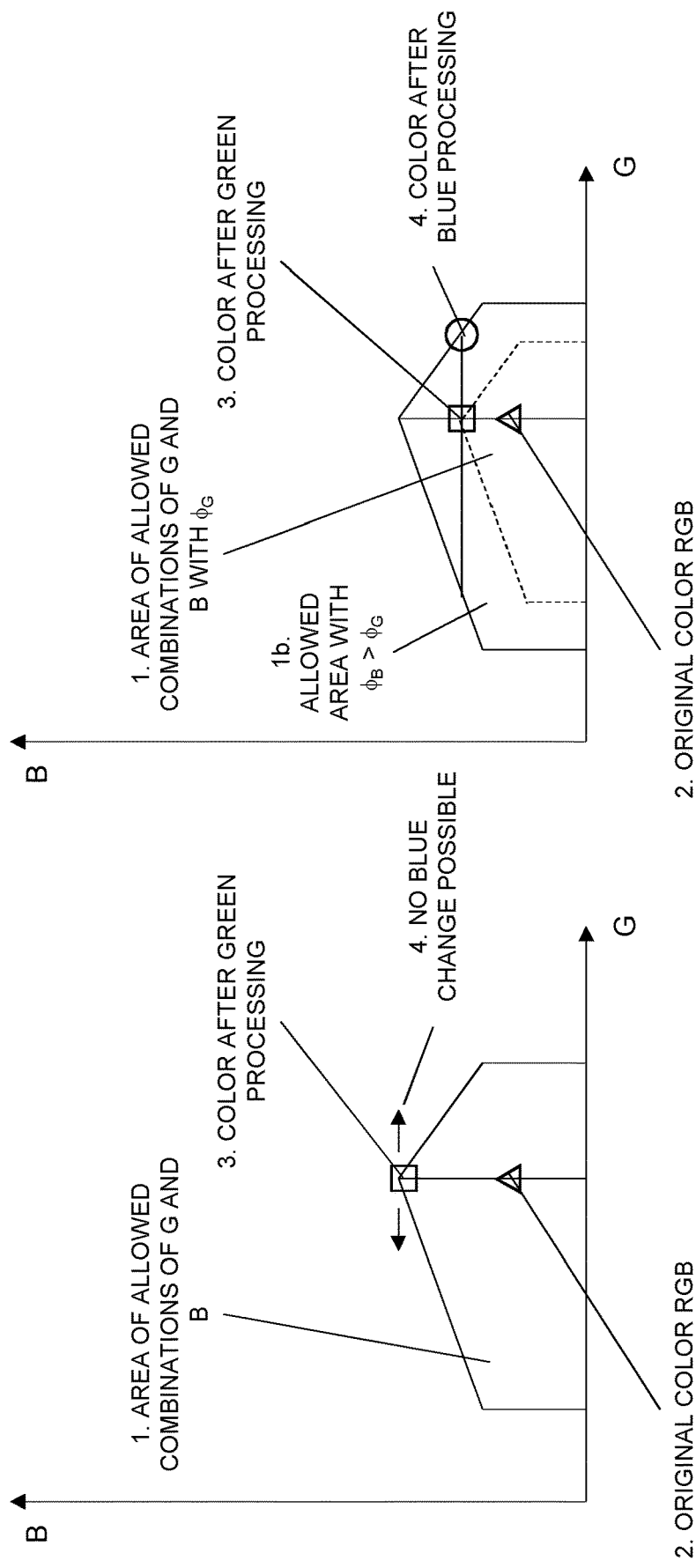

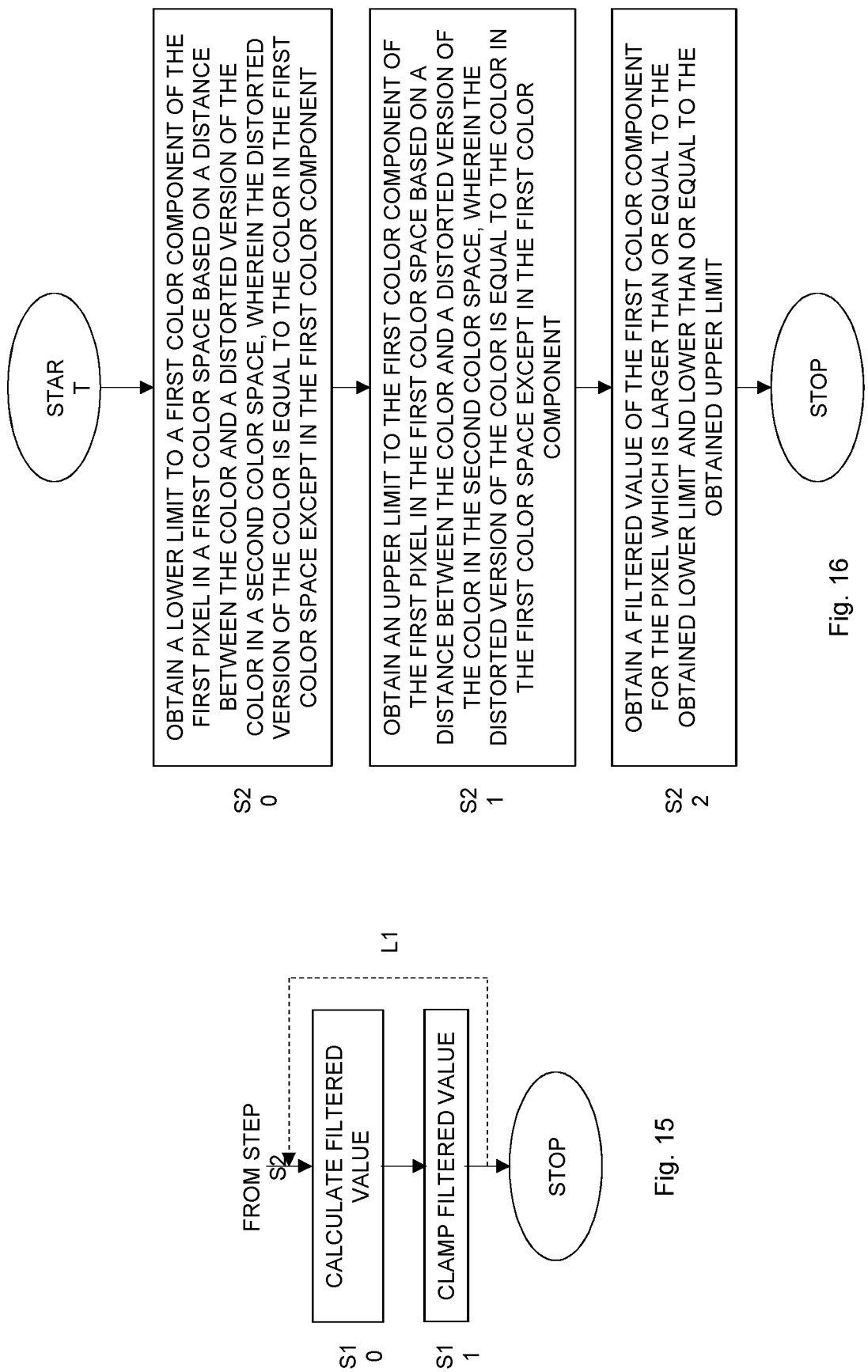

CHROMA ADJUSTMENT WITH COLOR COMPONENTS IN COLOR SPACES IN VIDEO CODING

CROSS REFERENCE TO RELATED APPLICATION(S)

This application is a 35 U.S.C. § 371 National Phase Entry Application from PCT/SE2017/051292, filed Dec. 18, 2017, designating the United States, and also claims the benefit of U.S. Provisional Application No. 62/438,786, filed Dec. 23, 2016, the disclosures of which are incorporated herein by reference in their entirety.

TECHNICAL FIELD

The present embodiments generally relate to video coding, and in particular to processing of pixels in connection to video coding to improve chroma values of pixels.

BACKGROUND

In the art of video coding, a combination of a nonlinear transfer function, 4:2:0 subsampling and non-constant luminance (Y) can give rise to severe artifacts in saturated colors. An example is described in an MPEG contribution [1], where changes between two colors of similar luminance can result in a reconstructed image with very different luminances.

In video coding, a luma value Y' is different from the luminance value Y. The luma value Y' is together with the chroma values Cb' and Cr' first converted to R'G'B' through a linear color transform, then to RGB (R=red, G=green, B=blue) via a nonlinear transfer function, and finally to XYZ via a color transform. The resulting Y is the luminance, and will be different from the luma value Y'.

One way to get around the problem of severe artifacts in saturated colors is to not use luma (Y') and chroma (Cb' and Cr') for encoding, but instead some other representation. However, there are indications that color representations other than Y'Cb'Cr' do not compress well. As an example, MPEG tried YdZdX but the compression efficiency was not competitive against Y'Cb'Cr'. There is also a lot of legacy equipment using Y'Cb'Cr', and for that reason it may be desirable to keep using Y'Cb'Cr'.

Furthermore, many systems already use Y'Cb'Cr' or R'G'B' for the last step of the signal to the display. As an example, the High-Definition Multimedia Interface (HDMI) standard has recently adopted the use of Y'Cb'Cr' 4:2:0 using ST 2084 [2] for transmission of images from the set-top box to the TV as specified in CEA-861.3 [3]. This means that even if the encoding is done in some other representation, after decoding it still needs to be converted to Y'Cb'Cr' 4:2:0, which will give rise to artifacts. Doing this conversion correctly, such as using luma adjustment disclosed in [4], can be quite complex when compared to the rest of the decoding chain, whereas doing the same thing in the encoder is, relatively speaking, not so expensive. This is due to the fact that encoding is typically so much more complex than decoding. It is therefore better to do a high-quality conversion to Y'Cb'Cr' already in the encoder. Due to these reasons it is advantageous to be able to use the Y'Cb'Cr' representation for encoding of High Dynamic Range (HDR) data.

Another solution to the problem is to use a transfer function with lower steepness, i.e., less nonlinear, such as BT.1886 [5]. However, the problem with this approach is that many bits would be required for representing each pixel component in order to avoid banding. Such artifacts may also arise for Standard Dynamic Range (SDR) when using a less nonlinear transfer function.

For these reasons, the best prior art is typically to use non-constant luminance Y'Cb'Cr' in combination with luma adjustment to transmit the data. Luma adjustment is described in [4], where the luma value Y' in every pixel is adjusted so that the resulting luminance Y is closer to its correct value. It is therefore possible to compensate for the fact that some of the luminance is also carried in the chroma components Cb' and Cr'.

After having corrected the luma value Y' using luma adjustment, it is possible to obtain the desired luminance Y. However, if Cb' and Cr' vary considerably, a quite large correction in Y' may be necessary. This variation in Cb', Cr' and the resulting variation in Y' may be expensive to encode, since signals with high variance is typically costlier to encode than smooth signals in terms of bit rate.

SUMMARY

It is a general objective to provide a processing of pixels in connection to video coding to improve chroma values of pixels.

This and other objectives are met by embodiments as disclosed herein.

An aspect of the embodiments relates to a method for processing a first pixel in a picture. The first pixel has a color that is represented in a first color space. The method comprises setting an upper limit of a first color component of the first pixel in the first color space to a first fixed value if a maximum value of the first color component in the first color space results in a color component in a second color space that is below a first value of the color component in the second color space and above a second value of the color component in the second color space. The method also comprises setting a lower limit of the first color component in the first color space to a second fixed value if a minimum value of the first color component in the first color space results in the color component in the second color space being below the first value of the color component in the second color space and above the second value of the color component in the second color space. The method further comprises obtaining a filtered value of the first color component for the first pixel which is larger than or equal to the lower limit and lower than or equal to the upper limit.

Another aspect of the embodiments relates to a device for processing a first pixel in a picture. The first pixel has a color that is represented in a first color space. The device is configured to set an upper limit of a first color component of the first pixel in the first color space to a first fixed value if a maximum value of the first color component in the first color space results in a color component in a second color space that is below a first value of the color component in the second color space and above a second value of the color component in the second color space. The device is also configured to set a lower limit of the first color component in the first color space to a second fixed value if a minimum value of the first color component in the first color space results in the color component in the second color space being below the first value of the color component in the second color space and above the second value of the color component in the second color space. The device is further configured to obtain a filtered value of the first color component for the first pixel which is larger than or equal to the lower limit and lower than or equal to the upper limit.

A further aspect of the embodiments relates to a device for processing a first pixel in a picture according to yet another embodiment. The first pixel has a color that is represented in a first color space. The device comprises an upper limit setting module for setting an upper limit of a first color component of the first pixel in the first color space to a first fixed value if a maximum value of the first color component in the first color space results in a color component in a second color space that is below a first value of the color component in the second color space and above a second value of the color component in the second color space. The device also comprises a lower limit setting module for setting a lower limit of the first color component in the first color space to a second fixed value if a minimum value of the first color component in the first color space results in the color component in the second color space being below the first value of the color component in the second color space and above the second value of the color component in the second color space. The device further comprises a filtered value obtaining module for obtaining a filtered value of the first color component for the first pixel which is larger than or equal to the lower limit and lower than or equal to the upper limit.

Yet another aspect of the embodiments relates to a device for encoding a first pixel having a color in a first color space in a picture. The device comprises a processor and a memory comprising instructions executable by the processor. The processor is operative to set an upper limit of a first color component of the first pixel in the first color space to a first fixed value if a maximum value of the first color component in the first color space results in a color component in a second color space that is below a first value of the color component in the second color space and above a second value of the color component in the second color space. The processor is also operative to set a lower limit of the first color component in the first color space to a second fixed value if a minimum value of the first color component in the first color space results in the color component in the second color space being below the first value of the color component in the second color space and above the second value of the color component in the second color space. The processor is further operative to obtain a filtered value of the first color component for the first pixel which is larger than or equal to the lower limit and lower than or equal to the upper limit. The processor is additionally operative to calculate a luma component value and chroma component values for the first pixel based on a smoothed value of the color in the first color space comprising a value of the first color component in the color in the first color space replaced by the filtered value of the first color component. The processor is also operative to encode the luma component value and subsampled chroma component values.

Yet another aspect of the embodiments relates to a computer program comprising instructions, which when executed by a processor, cause the processor to set, for a first pixel in a picture having a color that is represented in a first color space, an upper limit of a first color component of the first pixel in the first color space to a first fixed value if a maximum value of the first color component in the first color space results in a color component in a second color space that is below a first value of the color component in the second color space and above a second value of the color component in the second color space. The at least one processor is also caused to set a lower limit of the first color component in the first color space to a second fixed value if a minimum value of the first color component in the first color space results in the color component in the second color space being below the first value of the color component in the second color space and above the second value of the color component in the second color space. The at least one processor is further caused to obtain a filtered value of the first color component for the first pixel which is larger than or equal to the lower limit and lower than or equal to the upper limit.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The processing of the embodiments changes at least one color component of at least one pixel so that the color of the pixel is cheaper to encode and/or result in reduced artifacts while keeping the change sufficiently small so that it is not visible for the human visual system.

BRIEF DESCRIPTION OF THE DRAWINGS

The embodiments, together with further objects and advantages thereof, may best be understood by making reference to the following description taken together with the accompanying drawings, in which:

FIG. 4 illustrates two consecutive frames in a video sequence;

FIG. 5 illustrates a Y'CbCr 4:2:0 shot of detail of two consecutive frames;

FIG. 11A illustrates how processing with the same value of it, may restrict the processing for one of the colors;

FIG. 11B shows how using a smaller it, in the first processing (green in this case) makes it possible to also allow changes in the second color channel (blue in this case);

FIG. 15 is a flow chart illustrating an embodiment of step S3 in FIG. 14;

FIG. 16 is a flow chart illustrating a method for processing a first pixel according to another embodiment;

DETAILED DESCRIPTION

Figure 1:
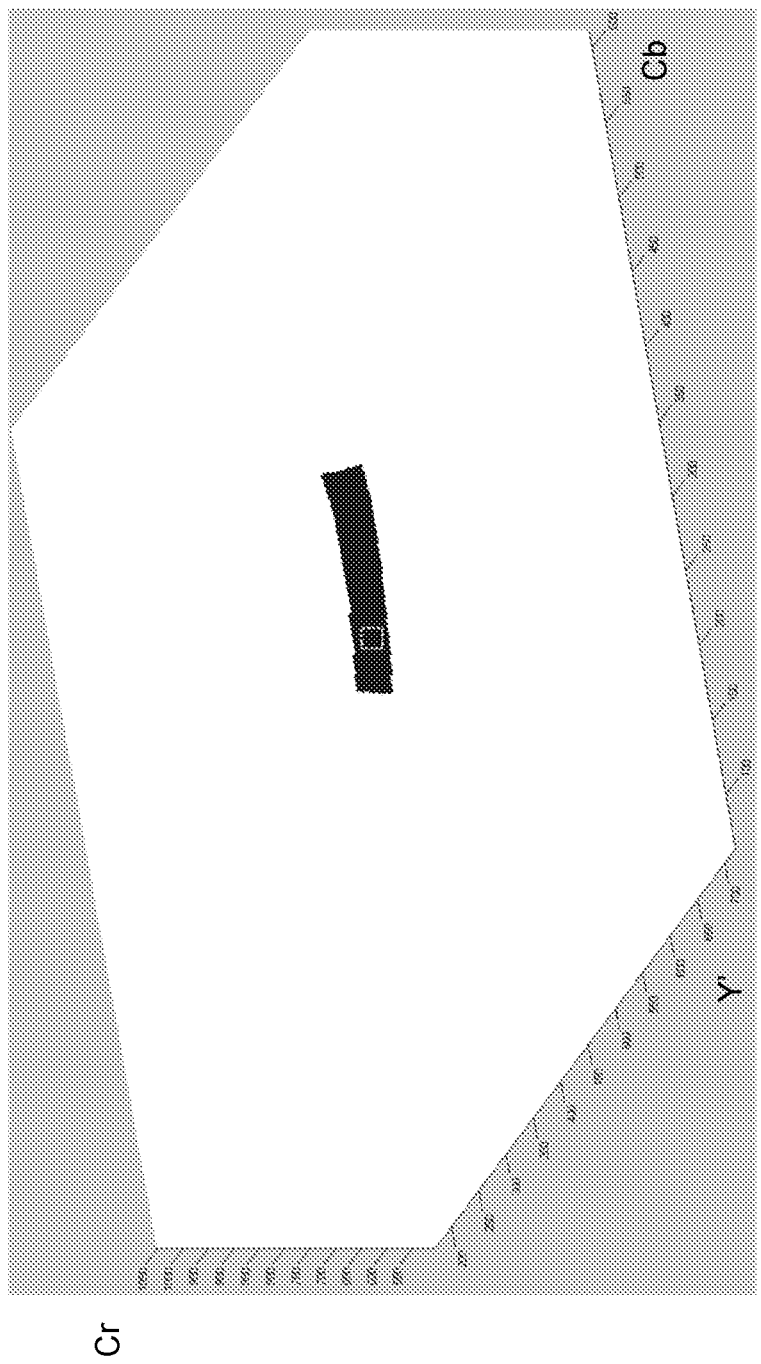
FIG. 1 illustrates all the colors in a 10 bit Y'CbCr10 color space (marked in black) that are equivalent to a given color (marked as a hatched square)

Throughout the drawings, the same reference numbers are used for similar or corresponding elements.

The present embodiments generally relate to video coding, and in particular to processing of pixels in connection to video coding to improve chroma values of pixels.

In the art of video coding and as mentioned in the background section, luma (Y') and chroma (Cb' and Cr') are used to represent the original colors in the pictures of a video sequence. In such a case, luma adjustment as described in [4] may be used to adjust the luminance and thereby compensate for artifacts introduced by the usage of a highly non-linear transfer function, 4:2:0 subsampling and non-constant luminance.

After luma adjustment, the luminance will be consistent between pictures, also denoted frames herein, of the video sequence. Accordingly, the luma signal will typically also be more consistent across frames than prior to luma adjustment. However, the luma signal may still vary substantially from frame to frame in problem areas. This complicates the prediction between frames. Also, even if the luma signal is more consistent across frames after luma adjustment than before luma adjustment, the chroma channels, which are not changed by luma adjustment, can differ substantially from frame to frame in problem areas. This means that it will sometimes be hard to predict the Cb' or Cr' component in one frame from the Cb' or Cr' component in a nearby frame of the video sequence, even if the colors appear similar to the human eye.

The above mentioned problem can be solved by finding a way of filtering the data that is invisible to the human visual system, yet which provides a benefit in terms of compression or encoding efficiency and/or artifact reduction. This is achieved according to an embodiment by changing the value of at least one color component, such as red (R), green (G) and/or blue (B) component, of a pixel so that it is as similar as possible to the color components of neighboring pixels while keeping the change sufficiently small so that it is not visible.

This may be done by changing the color in, for instance, a linear domain or color space, while keeping track of how big the changes are in a more perceptually relevant domain, such as the Yu'v' domain or color space (CIELUV). Only changes that are small enough for the resulting color to be regarded as equivalent to the original color are preferably allowed.

A color space or domain is the type and number of colors that originate from the combinations of color components of a color model. A color model is an abstract configuration describing the way colors can be represented as tuples of numbers, i.e., color components. The color components have several distinguishing features such as the component type, e.g., hue, and its unit, e.g., degrees or percentage, or the type of scale, e.g., linear or nonlinear, and its intended number of values referred to as the color depth or bit depth.

Non-limiting, but illustrative, examples of color spaces that are commonly used for pixels in pictures and videos include the red, green, blue (RGB) color space, the luma, chroma blue and chroma red (Y'Cb'Cr', sometimes denoted Y'CbCr, $Y'C_BC_R$ or $Y'C_B'C_R'$) color space, the luminance and chrominances (XYZ) color space, the luminance and chromaticity (Yu'v' or Yxy) color spaces, the intensity and chroma ($IC_TC_R$) color space, etc.

A problem that may arise according to the prior art is when the upsampling filters for the Cb' and Cr' channels in the video decoder or display are not known for the video encoder. For instance, if the upsampling filters used in the luma adjustment processing [4] differs from those used in the video decoder or display, luma adjustment may not reduce all luminance artifacts fully for that video decoder or display.

The processing according to the embodiments will also lessen these problems associated with possibly mismatching filters in the luma adjustment processing and the video decoder. Since the chroma will be much smoother according to the embodiments, the type of filters used in the upsampling process will matter much less, and any possible artifacts due to possibly mismatching filters will be eliminated or substantially reduced.

Another problem can happen if the tone mapping or other processing in the video decoder or display is not done in a luminance-preserving way. What this means is that two pixels that have the same luminance in the input data may get different luminance when displayed. In that case luminance artifacts may creep back even though luma adjustment [4] has been used. The processing according to the embodiments will reduce artifacts for video decoders or displays that are doing a non-luminance preserving tone mapping or other processing during the decoding or display. The reason for this is that neighboring colors after this processing often not only get the same luminance, but even the same color. This means that any video decoder or display that just maps similar colors to similar colors will give a reasonable picture out. For this reason the creeping back of luminance artifacts due to non-luminance preserving processing in the video decoder or display is eliminated or substantially reduced.

Yet another problem is that while luma adjustment can provide a perfect luminance on uncompressed video data, compression will lower its efficiency, and artifacts may creep back. The reason for this is that luma adjustment makes sure that the luma Y' exactly matches the upsampled chroma Cb' and Cr' so that the resulting luminance is correct. But when the chroma signal changes due to compression, and when the luma signal also changes due to compression, they will no longer match perfectly, making it possible for artifacts to creep back.

The video data after being processed according to the may be compressed much harder without luminance artifacts creeping back. The reason for this is that prediction works much better both in luma and chroma. This means that the luma and chroma signals can be preserved much better and, hence, they are matching each other better, lowering luminance artifacts. The effect can be as large as 10 quantization parameter (QP) steps, i.e., a sequence compressed using the processing proposed in this invention may at a QP of X may look similar or even better to a sequence compressed without this invention at a QP of X−10.

This technique helps not only with compression of 4:2:0 and 4:2:2 material, but also when the video encoder and video decoder operate in 4:4:4. The reason is that the resulting Y'Cb'Cr' 4:4:4 signals will be smoother and also more consistent between frames or pictures, both of which helps compression.

The processing of pixels in pictures, such as of a video sequence, may also be used in other applications than video encoding. For instance, the embodiments can be used as a processing that is applied before transferring video over an interface, such as HDMI, DisplayPort or Thunderbolt. For example, in HDMI 2.0a the only way to convey 4K resolution at 50 or 60 frames per second (fps) is to use 4:2:0 or 4:2:2 Y'Cb'Cr' subsampling. If the video data is in full chroma sampling format (4:4:4) then a subsampling step must be applied before sending the video data over the HDMI cable. The 4:2:0 or 4:2:2 video data is then transferred over the interface without further compression. By applying the processing of the embodiments, the video quality is improved compared to conventional 4:2:0 or 4:2:2 subsampling without any correction of chroma components.

Various implementation examples and embodiments now follow. Note that even though some of the examples will be for the BT.709 color space [6], the method is intended to work also in other color spaces, such as in the BT.2020 color space [7] and the DCI-P3 color space [8, 9].

Assume that you have a specific color in BT.709:

$$RGB1=(4000,14.984375,0.155762), \quad (1)$$

and that you convert this first to non-linear coordinates using a non-linear transfer function, such as SMPTE ST 2084 [2], $$R'G'B'1=(0.9026,0.3325,0.0749) \quad (2)$$

and then further to Y'CbCr $$Y'CbCr1=(0.4351,-0.1941,0.2968), \quad (3)$$

which after quantization to 10 bits becomes $$Y'CbCr10bit1=(445,338,778). \quad (4)$$

One would now assume that if we changed the Y'CbCr10bit representation by one code level, we would get a value that is sufficiently different for our eyes to see a difference. However, consider the value $$Y'CbCr10bit2=(422,315,793). \quad (5)$$

This differs by much more than one code level from the representation in Equation (4). When unquantized this becomes $$Y'CbCr2=(0.4087,-0.2199,0.3136), \quad (6)$$

which converts to $$R'G'B'2=(0.9026,0.3031,0.0007) \quad (7)$$

and further to $$RGB2=(3999.480037,10.432831,0.000022). \quad (8)$$

The question now is whether RGB1 and RGB2 are different enough to be seen as two different colors by the human visual system. To evaluate this, we convert both colors to the Yu'v' space:

$$Yu'v'1=(860.297966\ 0.446926\ 0.523330) \quad (9)$$

$$Yu'v'2=(857.906674\ 0.448070\ 0.523208). \quad (10)$$

Here the u' and v' coordinates denote chromaticity. The u'v' space is constructed so that a difference in u' or v' should be roughly equally visible no matter what chromaticity the pixel has. As a general rule of thumb, these coordinates can be quantized to 8 or 9 bits without any visual degradation. Since they can vary between 0 and 0.62, quantizing to 8 bits is equivalent of multiplying by (255/0.62)=410 and rounding. The maximum rounding error is therefore 0.5/410, and such a small error in either u' or v' should thus not be possible to see. Multiplying the difference between the u' coordinates with 410 we get $$|(0.448070-0.446926)*410|=|0.4690|=0.4690<0.5, \quad (11)$$

where |x| denotes the absolute value of x. Hence, the change in the u' coordinate should not be visible. Likewise for v' gives $$|(0.523208-0.523330)*410|=|-0.0500|=0.0500<0.5 \quad (12)$$

which means that the difference in v' is not visible either. To see whether the luminance Y differs, as a rule of thumb we cannot tell the difference if it is smaller than half a quantization step after the inverse of the transfer function PQ, i.e., SMPTE ST 2084, has been employed. We now calculate $$tf\_inv(Y1)=tf\_inv(860.297966)=0.735433,\ \text{and} \quad (13)$$

$$tf\_inv(Y2)=tf\_inv(857.906674)=0.735130, \quad (14)$$

where tf(x) is the transfer function defined in Equation 4.1 in the SMPTE document [2] and tf_inv(x) or $tf^{-1}(x)$ is the inverse of tf(x). By multiplying the difference between these results by 1023 and comparing against 0.5, we can see whether the difference of tf_inv(Y1) and tf_inv(Y2) is similar to an error when quantized to 10 bits. As we can see, $$|(0.735130-0.735433)*1023|=|-0.3100|=0.3100<0.5. \quad (15)$$

This means that it will not be possible to tell the difference between the two colors in luminance either. Effectively, for the human visual system, these two colors are therefore indistinguishable, or equivalent. Even though the two colors are indistinguishable, they are very different in the Y'CbCr10bit representation:

$$Y'CbCr10bit1=(445,338,778) \quad (16)$$

$$Y'CbCr10bit2=(422,315,793). \quad (17)$$

The difference is 23 code levels in both Y' and Cb, and 15 code levels in Cr. However, this does not mean that any change in Cb that is smaller than 23 code levels will generate a color similar to the first—we must also change Y' and Cr in the right direction and the right amount. The 3D plot in FIG. 1 shows all the colors in 10 bit Y'CbCr10 that are equivalent to the first color. Note that the black region, which we can call the equivalency region, spans almost 150 code levels in Cb. The first color is marked with a hatched square.

Figure 2:
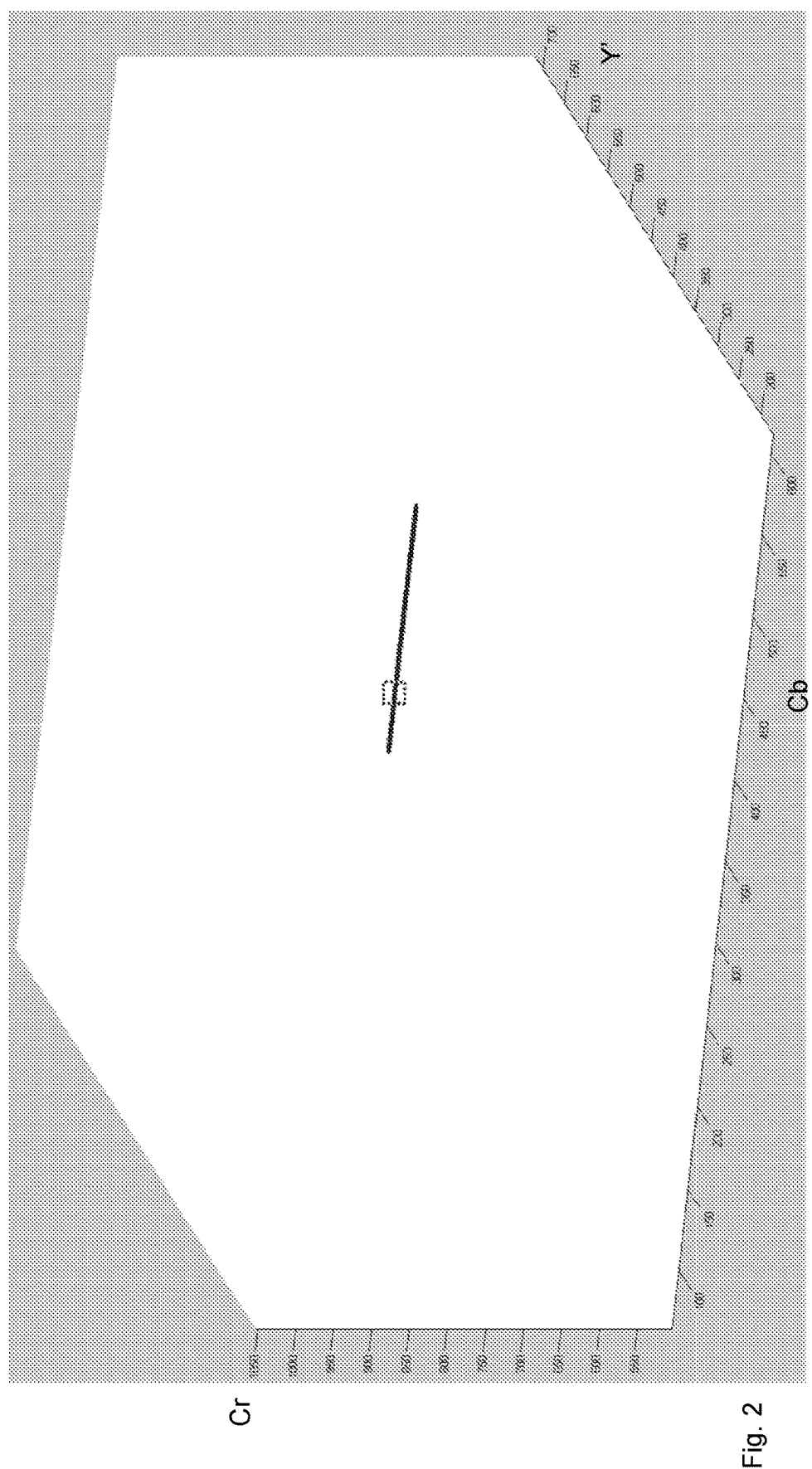
FIG. 2 illustrates the same scenario as the one in FIG. 1, but from another viewpoint.

Seen from another angle, we can see that this region of equivalent color, or equivalency region, is very thin in one direction—it is essentially a part of a plane in the 3-dimensional Y'CbCr-space, as shown in FIG. 2.

We therefore see that it is quite important to change Y', Cb and Cr in sync with each other. Changing just one of them will take us outside of the (planar) region, and thus make a visible difference.

Given that the change is biggest in Cb, and given the fact that Cb influences B' the most out of the three components R', G' and B', it is reasonable to assume that it is mostly changes in the blue coordinate in RGB that are responsible for the shape of the equivalency region. The blue value in the original RGB color has a small value (0.155762). It is known that the function tf_inv(x) has a large slope for small values of x. This means that a small change in B will give rise to a large change in B'=tf_inv(x), which in turn will affect Y'CbCr a lot.

Figure 3:
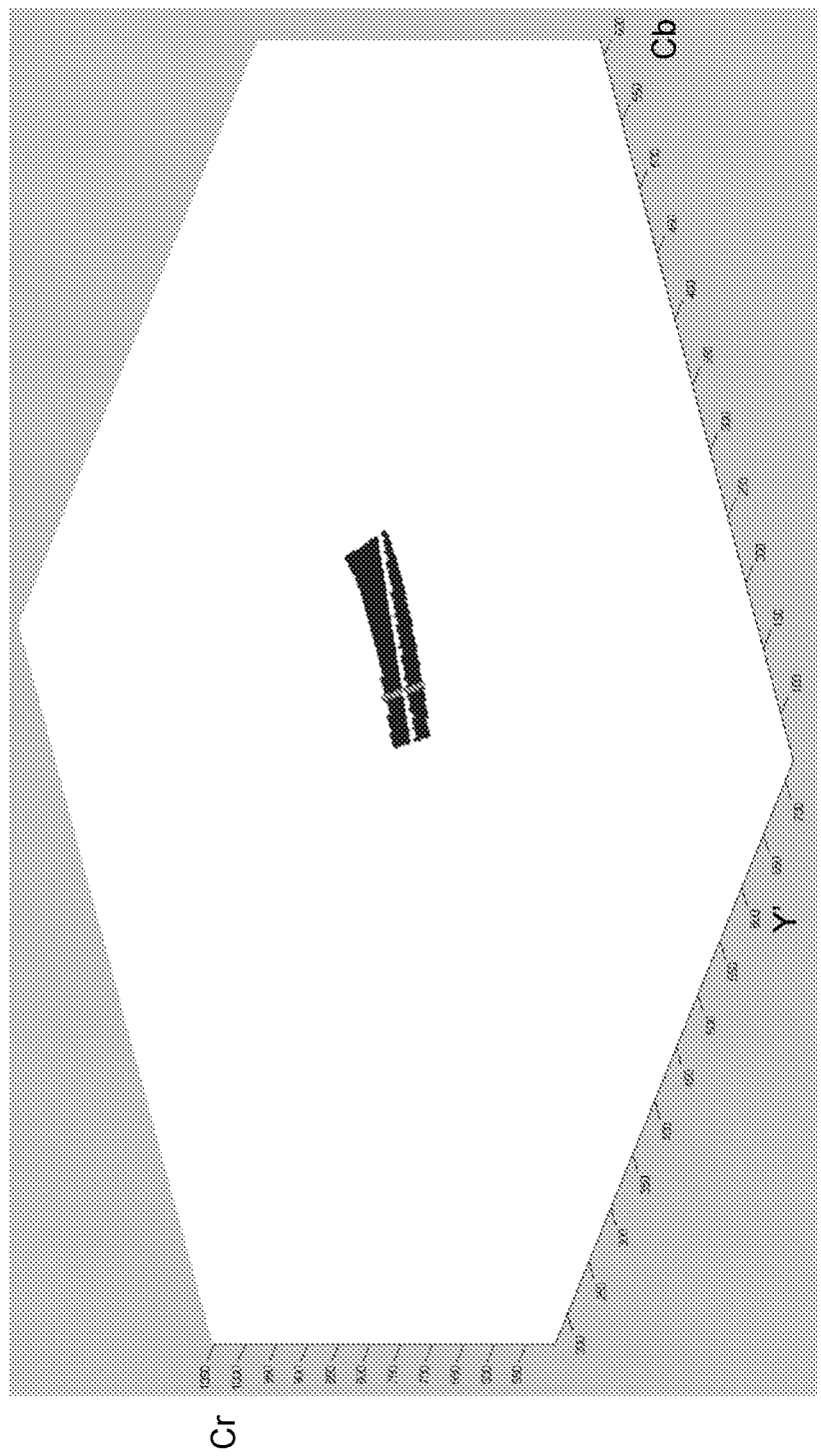
FIG. 3 illustrates all the possibilities for a blue color component that give a color equivalent to a given color.

We can see this by holding the red and green components constant in the color RGB1=(4000, 14.984375, 0.155762), but vary the blue, and plot the values that fall inside the allowed area, the equivalency region, with white in FIG. 3.

Also, keeping the red and blue components constant and varying green, and plotting the values that fall inside the allowed area with green gives the gray line in FIG. 3. It can be seen that changes in blue and green more or less spans the region. Changing red would be going orthogonal to the plane depicted in FIG. 2, and therefore red cannot be changed much without influencing the color as perceived by the human eye.

It makes sense that the green and the blue colors are the ones that we can change without influencing the perception of the color much. For instance, the color (4000, 14.984, 0) is different from the color (4000, 14.984, 0.15), but the difference will not be noticeable, since the red component drowns out the blue. Still, the difference is 65 code levels in B', going from B'=tf(0.0)*(940-64)+64=64 to B'=tf_inv(0.15)*(940-64)+64=128.62. Here we have mapped the value of B' to a value between 64, representing 0.0, and 940, representing 1.0. Therefore, the change in B will influence the R'G'B' representation quite a lot and therefore also the Y'CbCr representation, since Y'CbCr is just a linear mapping away from R'G'B.

Note that this means that if we have noise in the blue component between 0 and 0.15, we will not be able to see the noise, but it will change the Y'CbCr representation quite a bit. Since noise is different from frame to frame, the Y'CbCr representation will change quite a bit from frame to frame, and predicting between two frames may become hard. This noise, which is invisible, will therefore make it harder to compress the video in an efficient manner.

It should also be noted that for some colors, indeed most colors, this effect is not there or at least not as strong. As an example, if we have a perfectly gray color, such as RGB= (290, 290, 290), there will be very few 10-bit Y'CbCr colors that are deemed equivalent to that gray color. Furthermore, a small noise of +/−0.15 in the blue component of such a color will not change the Y'CbCr representation much and thus predicting between frames will not be a problem. For saturated colors though, this problem exists and in the following we will concentrate on such colors for which the problem exists.

The solution presented herein is to make the color of each pixel more similar to that of its neighbor, for instance using filtering. The key insight is that we should never change the color of a pixel so much that it can be seen as a different color by a human observer.

In an embodiment, we only filter one of the components R, G, and B. As an example, we may want to filter the green channel. This may be because it happens to be the most noisy for a particular sequence. Also, it can be seen that the green channel influences the luminance more than the other three color components, at least partly since the weight wG is larger than the weights wR and wB in the equations Y'=wR*R'+wG*G'+wB*B' and Y=wR*R+wG*G+wB*B.

Starting with the original color of a pixel origRGB=(R, G, B), we determine two values Gmin and Gmax. Gmin is determined to be the limit for how low the green component color can become without breaking a perceptual similarity measure sm(RGB1, RGB2):

$$Gmin \text{ is determined such that} \quad (18)$$
$$\begin{cases} sm[(R, G, B), (R, Gm, B)] < \phi & \text{if } Gm > Gmin \\ sm[(R, G, B), (R, Gm, B)] > \phi & \text{if } Gm < Gmin \end{cases}$$

If sm(RGB1, RGB2)<φ, we say that the colors are equivalent, whereas if sm(RGB1, RGB2)>φ, we say that the colors are different. Gmin is therefore the smallest value of G we can use while still regarding the colors as being equivalent, if keeping R and B constant.

An example of sm(RGB1, RGB2) can be $$sm=\max\{|u1'-u2'|*410, |v1'-v2'|*410, |tf\_inv(Y1)-tf\_inv(Y2)|*1023\} \quad (19)$$

where |x| is the absolute value of x, and where φ is set to φ=0.5. This has the effect of declaring the colors equivalent if their chromaticity does not differ more than the error created when quantizing u' and v' to eight bits. Also, the luminances would not differ more than the error created when quantizing the tf_inv( ) of the luminance to 10 bits. An alternative similarity measure can be $$sm=\max\{|u1'-u2'|*410, |v1'-v2'|*410, |tf\_inv(Y1)-tf\_inv(Y2)|*(1023/50)\} \quad (20)$$

where a considerably larger error in luminance is allowed. Since the luminance typically does not change much when adding a tiny value to G if R or B are much bigger than G, another alternative similarity measure can be $$sm=\max\{|u1'-u2'|*410, |v1'-v2'|*410\} \quad (20.1)$$

We also determine Gmax in a similar way. Gmax is determined such that $$\begin{cases} sm[(R, G, B), (R, Gm, B)] < \phi & \text{if } Gm < Gmax \\ sm[(R, G, B), (R, Gm, B)] > \phi & \text{if } Gm > Gmax \end{cases} \quad (21)$$

This means that as long as the green component Gm in the color (R, Gm, B) is between Gmin and Gmax, i.e., Gm∈ [Gmin, Gmax], then the color (R, Gm, B) is equivalent to the color (R, G, B) as seen by a human observer.

One way to determine Gmax is to try all possible values of Gm and see which the largest Gm that satisfies the similarity measure is. As an example, one could use the pseudo code

```
for Gm = 0:0.00005:10000
    if( sm[(R, G, B), (R, Gm, B)] < 0.5 )
        Gmax = Gm;
    end;
end;
```

Here, Gm is incremented in steps of 0.00005 since the smallest change allowed in green is pq_inv(1/(940−64))−pq_inv(0/(940−64))=0.000053. This is 10000/0.00005=200000000 steps, which makes the above pseudo-code very slow. Therefore, a better choice may be to step in G' instead:

```
for Gmp = 0:(940−64)
    Gm = tf(Gmp/(940−64))
        if( sm[(R, G, B), (R, Gm, B)] < 0.5 )
            Gpmax = Gmp;
        end;
    end;
Gmax = tf(Gpmax/(940−64));
```

This is only 940−64=876 steps, which is much better. If we assume that sm[,] is a distance metric, we know that the distance will have a single global minimum, and sm[(R, Gm, B), (R, G, B)] will be monotoneously increasing away from (R, G, B). Therefore, we can use interval halving, also known as binary search, to find Gmin and Gmax, or equivalently, find Gpmin and Gpmax, where Gpmin=tf_inv(Gmin) and Gpmax=tf_inv(Gmax). We know in advance that Gpmax must be between Gp=tf_inv(G) and the largest allowed value of Gp, for instance 1.0. We therefore set the starting interval to [Gp, 1.0]. We can now try a value in the middle of this interval, at GpTest=(Gp+1.0)/2. If this produces a color that is equivalent to (R, G, B), we know that Gpmax must be in the interval [GpTest, 1.0]. Otherwise it must be in the interval [Gp, GpTest]. We can now create a new test value GpTest as the average of the end points of the new interval and iterate. Since the resolution of Gp is in steps of 1/(940−64) it is sufficient with ten step to find a suitable Gpmax. To be on the safe side it is possible to increase this, for instance to twelve iterations. This can be implemented using the following pseudo code:

```
GpLo = (940−64)*tf_inv(G);
GpHi = (940−64);
for qq = 1:12
    GpTest = ((GpLo + GpHi)/2);
    Gtest = tf(GpTest/(940−64))
    if( sm( [R, G, B], [R, Gtest,B]) < 0.5 )
        GpLo = GpTest;
    else
        GpHi = GpTest;
    end;
end;
GpMax = (GpHi + GpLo)/2;
Gmax = tf(GpMax/(940−64));
```

It is also possible to set the starting interval to [0.0, 1.0], or in the pseudo code GpLo=0, GpHi=876.

Gmin can now be found in a similar way.

The similarity measures defined above treat errors in u' and v' individually. An error of 0.5/410 in u' and an error of 0 in v' is assumed to be equally good as an error of 0.5/410 in u' and an error of 0.5/410 in v'. An alternate similarity measure would be to take the distance to the correct coordinates in u', v'-space. As an example, we can use $$sm = \max\{410\sqrt{(u1'-u2')^2+(v1'-v2')^2}, |tf\_inv(Y1)-tf\_inv(Y2)|*1023\}. \quad (21.1)$$

This measure would say that an error of 0.5/410 in only one of u', v' would be preferable to the same error in both. Another possibility is to include the luminance into the distance metric;

$$sm = \sqrt{\begin{array}{l} 410^2(u1'-u2')^2 + 410^2(v1'-v2')^2 + \\ 1023^2(tf^{-1}(Y1)-tf^{-1}(Y2))^2 \end{array}} \quad (21.2)$$

Another possibility is to avoid the square root. This means that the measure is no longer a metric but it does not matter for the calculations we are interested in here:

$$sm = 410^2(u1'-u2')^2 + 410^2(v1'-v2')^2 + 1023^2(tf^{-1}(Y1)-tf^{-1}(Y2))^2. \quad (21.3)$$

However, one advantage of keeping the error in u' and v' independent as in (19), (20) and (20.1) is that we can calculate it analytically. To see how this is done, it is first noted that u' and v' can be calculated from linear R, G and B in two steps. In the first step we calculate XYZ from RGB, and in the second step we calculate u' v' from XYZ:

$$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R \\ G \\ B \end{bmatrix}. \quad (21.4)$$

As an example, the matrix coefficients for doing this if the RGB color is in BT.2020 is $$T = \begin{bmatrix} t_{11} & t_{12} & t_{13} \\ t_{21} & t_{22} & t_{23} \\ t_{31} & t_{32} & t_{33} \end{bmatrix} = \begin{bmatrix} 0.636958 & 0.144617 & 0.168881 \\ 0.262700 & 0.677998 & 0.059302 \\ 0.000000 & 0.028073 & 1.060985 \end{bmatrix}. \quad (21.5)$$

The second step calculates u' and v' from XYZ:

$$u' = \frac{4X}{X + 15Y + 3Z} \quad (21.6)$$

$$v' = \frac{9Y}{X + 15Y + 3Z} \quad (21.7)$$

We can now see what happens when we add ΔG to the green component. The first step will then become $$\begin{bmatrix} X_2 \\ Y_2 \\ Z_2 \end{bmatrix} = T \begin{bmatrix} R \\ G + \Delta G \\ B \end{bmatrix} = \quad (21.8)$$

$$T \begin{bmatrix} R \\ G \\ B \end{bmatrix} + T \begin{bmatrix} 0 \\ \Delta G \\ 0 \end{bmatrix} = \begin{bmatrix} X \\ Y \\ Z \end{bmatrix} + T \begin{bmatrix} 0 \\ \Delta G \\ 0 \end{bmatrix} = \begin{bmatrix} X \\ Y \\ Z \end{bmatrix} + \begin{bmatrix} t_{12} \\ t_{22} \\ t_{32} \end{bmatrix} \Delta G.$$

This means that the new u'-coordinate $u'_2$, which is the result of adding $\Delta G$ to RGB, will become $$u'_2 = \frac{4X_2}{X_2 + 15Y_2 + 3Z_2}. \quad (21.9)$$

Now, if we insert (21.8) into (21.9) and use $\Delta u'=u'_2-u'$ we get $$u' + \Delta u' = \frac{4(X + t_{12}\Delta G)}{(X + t_{12}\Delta G) + 15(Y + t_{22}\Delta G) + 3(Z + t_{32}\Delta G)}. \quad (21.10)$$

Now gathering all terms containing $\Delta G$ in both the nominator and the denominator we get $$u' + \Delta u' = \frac{4X + 4t_{12}\Delta G}{(X + 15Y + 3Z) + (t_{12} + 15t_{22} + 3t_{32})\Delta G}. \quad (21.11)$$

or $$u' + \Delta u' = \frac{4X + 4t_{12}\Delta G}{D + (t_{12} + 15t_{22} + 3t_{32})\Delta G}. \quad (21.12)$$

where $D=X+15Y+3Z$, i.e., the denominator of (21.6). Also note that $t_{12}+15t_{22}+3t_{32}$ is a constant, so we can replace it with $K_2$. Multiplying both sides with the denominator gives $$(u'+\Delta u')(D+K_2\Delta G)=4X+4t_{12}\Delta G. \quad (21.13)$$

Gathering terms gives $$(u'+\Delta u')K_2\Delta G - 4t_{12}\Delta G = 4X - (u'+\Delta u')D \quad (21.14)$$

which is equivalent to $$[(u'+\Delta u')K_2 - 4t_{12}]\Delta G = 4X - (u'+\Delta u')D. \quad (21.15)$$

We can now solve for $\Delta G$:

$$\Delta G = \frac{4X - (u'+\Delta u')D}{(u'+\Delta u')K_2 - 4t_{12}}. \quad (21.16)$$

If we want to find the allowed values of $\Delta G$ that will still keep the u' coordinate within the range [u'-$\Delta$u', u'+$\Delta$u'], we can simply calculate the two values $\Delta G_1$ and $\Delta G_2$:

$$\Delta G_1 = \frac{4X - (u' - \Delta u')D}{(u' - \Delta u')K_2 - 4t_{12}} \text{ and} \quad (21.17)$$

$$\Delta G_2 = \frac{4X - (u' + \Delta u')D}{(u' + \Delta u')K_2 - 4t_{12}}. \quad (21.18)$$

The smallest allowed $\Delta G$ is now $\Delta G\min_{u'}=\min\{\Delta G_1, \Delta G_2\}$, and the largest allowed $\Delta G$ is $\Delta G\max_{u'}=\max\{\Delta G_1, \Delta G_2\}$, This means that if we have a color (R, G2, B) where G2 belongs to the interval [G+$\Delta G\min_{u'}$, G+$\Delta G\max_{u'}$], then the color (R, G2, B) will have a u' coordinate that differs from the u' coordinate of the original pixel with less than $\Delta$u'.

In the same way, we can start with Equation (21.7) and calculate how far we can move the green component when we subtract and add $\Delta$v' from v':

$$\Delta G_3 = \frac{9Y - (v' - \Delta v')D}{(v' - \Delta v')K_2 - 9t_{22}} \text{ and} \quad (21.18b)$$

$$\Delta G_4 = \frac{9Y - (v'' + \Delta v')D}{(v' + \Delta v')K_2 - 9t_{22}}. \quad (21.18c)$$

Analogously with the case for u', we can now calculate the lowest and highest value for green as determined by the v' variables:

$$\Delta G\min_{v'}=\min\{\Delta G_3, \Delta G_4\}, \text{ and} \quad (21.19)$$

$$\Delta G\max_{v'}=\max\{\Delta G_3, \Delta G_4\}. \quad (21.20)$$

The correct value for $G\min$ is now $$G\min=G+\max\{\Delta G\min_{u'}, \Delta G\min_{v'}\}, \quad (21.21)$$

$$G\max=G+\min\{\Delta G\max_{u'}, \Delta G\max_{v'}\}. \quad (21.22)$$

We can also find an analytical way of calculating the largest difference in the green component that is allowed while keeping the error in tf_inv(Y)*1023 smaller than a certain threshold. Assume we have an original color (R, G, B), and we want to know how much we can change this in the green component before it becomes too different to be regarded to be an equivalent color by the human visual system. Let us call the new color $(R_1, G_1, B_1)=(R, G+\Delta G, B)$. The luminance for the original color is $$Y=w_R R+w_G G+w_B B, \quad (21.23)$$

and hence the $tf\_inv(Y)$ for the original equals $$tf^{-1}(Y)=tf^{-1}(w_R R+w_G G+w_B B). \quad (21.24)$$

Likewise, the $tf\_inv(Y)$ for the changed color becomes $$tf^{-1}(Y_1)=tf^{-1}(w_R R+w_G(G+\Delta G)+w_B B). \quad (21.25)$$

The constraint in Equation (19) is that $1023|tf^{-1}(Y)-tf^{-1}(Y_1)|<\phi$. We can change the order inside the absolute value $|\cdot|$ giving $1023|tf^{-1}(Y)-tf^{-1}(Y)|<\phi$. If we first consider positive values of $\Delta G$, we know that $Y_1$ must be larger than Y and since $tf^{-1}(\cdot)$ is monotonously increasing this means that $tf^{-1}(Y_1)$ is larger than $tf^{-1}(Y)$ and we can remove the absolute value. Replacing $\phi$ with $\phi_2=\phi/1023$ we can rewrite the condition as $$tf^{-1}(Y_1)-tf^{-1}(Y)<\phi_2. \quad (21.26)$$

We are interested in the place where we are exactly on the border of this condition, so we are more interested in the equality than in the inequality. This can be written $$tf^{-1}(Y_1)=tf^{-1}(Y)+\phi_2. \quad (21.27)$$

Taking $tf(\cdot)$ of both sides gives $$Y_1=tf(tf^{-1}(Y)+\phi_2), \quad (21.28)$$

which equals $$w_R R+w_G(G+\Delta G)+w_B B=tf(tf^{-1}(Y)+\phi_2), \quad (21.29)$$

which can be written as $$w_G \Delta G=tf(tf^{-1}(Y)+\phi_2)-w_R R-w_G G-w_B B \quad (21.30)$$

and we can therefore solve for $\Delta G$:

$$\Delta G\max_Y = \frac{tf(tf^{-1}(Y)+\phi_2)-Y}{w_G}. \quad (21.31)$$

In the last step we have taken advantage of the fact that $w_R R + w_G G + w_B B = Y$. A similar formula can be derived when $\Delta G$ is negative:

$$\Delta G\min_Y = \frac{tf(tf^{-1}(Y)-\phi_2)-Y}{w_G}. \quad (21.32)$$

We can now change Equations (21.21) and (21.22) to also take these values into consideration:

$$G\min = G + \max\{\Delta G\min_u, \Delta G\min_v, \Delta G\min_Y\}, \text{ and} \quad (21.33)$$

$$G\max = G + \min\{\Delta G\max_u, \Delta G\max_v, \Delta G\max_Y\}. \quad (21.34)$$

This way we have implemented the similarity measure described in Equation (19) rather than the one in Equation (20.1).

After having determined Gmin and Gmax for every pixel in the image, the second step takes place. Here we make the green component in a pixel more similar to the green component of its neighbors. Assume that G(x,y) is the linear value of the pixel at position (x,y) in the image. We can then find a smoothed value of G by taking the average of all its 9-neighbors, i.e., its 8-neighbors including itself:

$$G\text{smooth}(x,y) = (G(x-1,y-1)+G(x-1,y)+G(x-1,y+1)+G(x,y-1)+G(x,y)+G(x,y+1)+G(x+1,y-1)+G(x+1,y)+G(x+1,y+1))/9; \quad (22)$$

Alternative ways of averaging are also possible. One can use a filter that only takes in the neighbors directly above or below using $$G\text{smooth}(x,y) = (G(x-1,y)+G(x,y-1)+G(x,y)+G(x,y+1)+G(x+1,y))/5. \quad (22.1)$$

It is also possible to have a larger area covering more pixels, for instance a 5×5 area instead of a 3×3 area as in Equation (22):

$$G\text{smooth}(x,y) = (G(x-2,y-2)+G(x-2,y-1)+G(x-2,y)+G(x-2,y+1)+G(x-2,y+2)+G(x-1,y-2)+G(x-1,y-1)+G(x-1,y)+G(x-1,y+1)+G(x-1,y+2)+G(x,y-2)+G(x,y-1)+G(x,y)+G(x,y+1)+G(x,y+2)+G(x+1,y-2)+G(x+1,y-1)+G(x+1,y)+G(x+1,y+1)+G(x+1,y+2)+G(x+2,y-2)+G(x+2,y-1)+G(x+2,y)+G(x+2,y+1)+G(x+2,y+2))/25.$$

It is also possible to have different weights in front of each term, such as w1*G(x−2, y−2)+w2*G(x−2, y−2)+ . . . and divide by the sum of the weights (w1+w2+ . . . ) instead of dividing by 25.

Another possibility is to use bilateral filtering of the values. In that case it may make sense to only use the neighbors directly above or below to keep complexity down.

After having obtained a smoothed value Gsmooth(x,y) for the green component, it is possible that using this new, smoothed value could change the pixel so much that it is no longer equivalent with the previous pixel, as seen by a human observer. However, we also know that if we make sure to set it to a value in the interval [Gmin(x,y), Gmax(x,y)] we are certain that we will not change it to a non-equivalent color. Therefore, instead of setting G(x,y)=Gsmooth(x,y), we set it to $$G(x,y) = \text{clamp}(G\text{smooth}(x,y), G\min(x,y), G\max(x,y)), \quad (23)$$

where clamp(x,a,b) sets the value to a if x<a and to b if x>b and x otherwise.

In this manner we can be sure that we never change the color (R, G, B) of a pixel to something that is different enough to be seen.

However, since all the green values have changed, it is now possible that another round of smoothing will provide a new value. Hence we once again do $$G\text{smooth}(x,y) = (G(x-1,y-1)+G(x-1,y)+G(x-1,y+1)+G(x,y-1)+G(x,y)+G(x,y+1)+G(x+1,y-1)+G(x+1,y)+G(x+1,y+1))/9; \quad (24)$$

followed by $$G(x,y) = \text{clamp}(G\text{smooth}(x,y), G\min(x,y), G\max(x,y)); \quad (25)$$

It is now possible to continue doing averaging followed by clamping until convergence, i.e., until G(x,y) does not change between iterations. Another possibility is to continue until the biggest change in G(x,y) is smaller than a threshold value θ, such as θ=0.00005. It is also possible to continue until the biggest change in tf_inv(G(x,y)) is smaller than another threshold value φ, such as φ=1/(940−64). In an embodiment we continue until the biggest change in G(x,y) is smaller than 0.00005 or until 10000 iterations have happened.

Note that Gmin(x,y) and Gmax(x,y) for a pixel is not updated during the iterations. This means that we can be sure that whatever number of iterations we do, the result will be a pixel that is indistinguishable from the original pixel.

An example is shown in FIG. 4, which depicts two consecutive frames from a sequence. They are quite similar to each other, so one would assume it should be simple to use one frame to predict the other.

However, their Y'CbCr representations are quite different, as is shown in FIG. 5. The top row shows the luma (Y') samples of the uncompressed material, and the bottom row shows the downsampled Cb and Cr samples. As can be seen in the top part of the price tag in the middle, there is a dark area that is very different between the two frames, and it is very possible that the prediction will fail. Furthermore, the changes in the black area are very sharp, meaning it will cost a lot of bits to describe. It is this big variability in luma and chroma that gives the luminance artifacts that are adjusted for with luma adjustment.

If we apply luma adjustment (see [4]) on the luma component, the luma will become less random. This is shown in FIG. 6.

Figure 6:
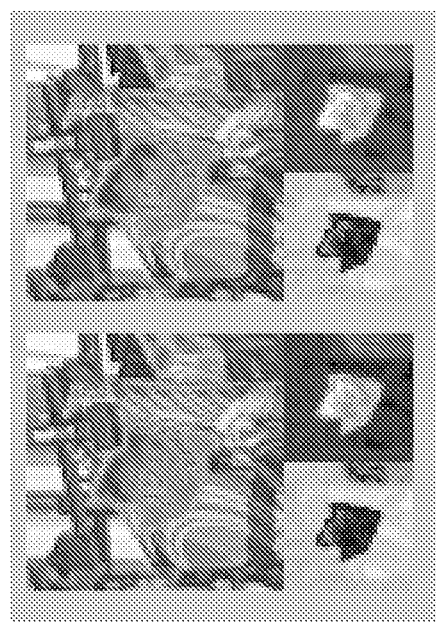
FIG. 6 illustrates a Y'CbCr 4:2:0 shot of detail of two consecutive frames after luma adjustment.

As can be seen in FIG. 6, the luma is smoother but still very different between the two frames. Furthermore, the chroma is unchanged by the luma adjustment process and is still very different between frames, making prediction difficult.

Figure 7:
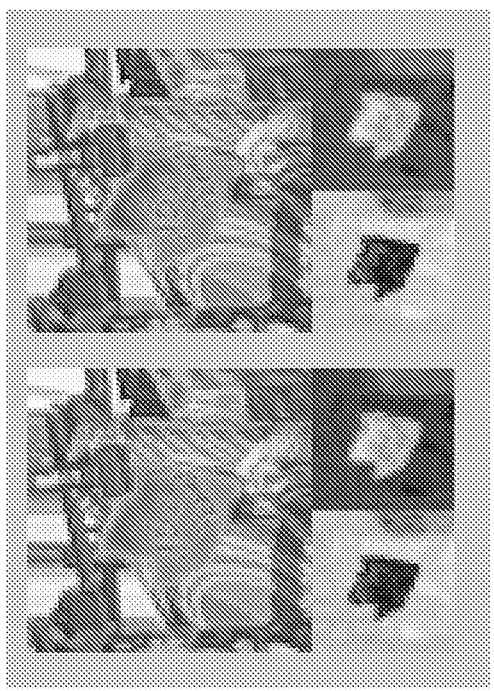
FIG. 7 illustrates a Y'CbCr 4:2:0 shot of detail of two consecutive frames after one iteration of chroma adjustment on a green color component, according to an embodiment of the present invention.

In FIG. 7 we show the result of applying the embodiment above where we have corrected the green component only, and used the similarity measure as described in Equation 19 with φ=0.5. Only one iteration is performed.

As can be seen in the figure, the dark area at the top of the price tag is much smoother. This will make it easier to encode the content in an I-frame. Also, since the dark areas in the two frames have become smoother, they have also become much more similar to each other. This means that it will be easier to predict between them. Also the chroma components are less sharp and more similar to each other.

Figure 8:
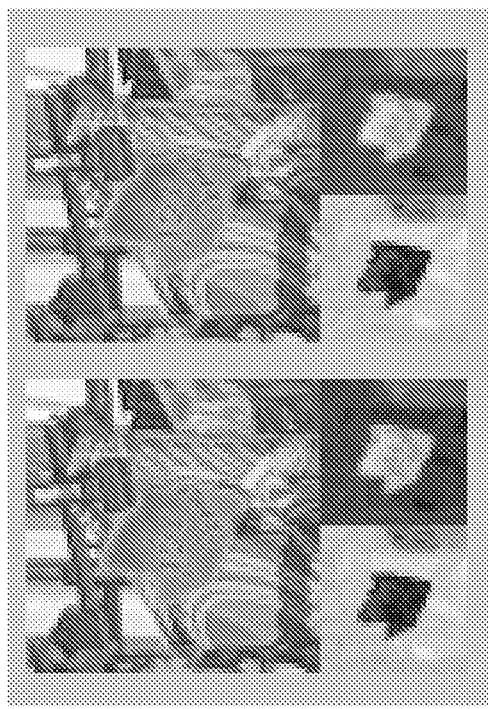
FIG. 8 illustrates a Y'CbCr 4:2:0 shot of detail of two consecutive frames after about twenty iterations of chroma adjustment on a green color component, according to an embodiment of the present invention.

If we continue iterating until the largest difference in linear green (G) is smaller than 0.00005, which will take 21 iterations in the left image and 22 iterations in the right image, we arrive at FIG. 8.

As can be seen in FIG. 8, the components are now very similar to each other and therefore easy to predict. Also, the change in the area that was previously black is now smooth and therefore simpler to compress in the I-frame. Note also that the chroma signals are very similar to each other.

The similarity measure from Equation 19 that we used guarantees that the image after processing is indistinguishable from the original if only the parameter $\phi$ is set to be small enough. However, in some circumstances it may be beneficial to allow some distortion of the color, and get an even smoother output after conversion to Y'CbCr. If the bit rate can go down substantially with a higher value for $\phi$, it may be worth it even if the color is somewhat distorted.

Figure 9:
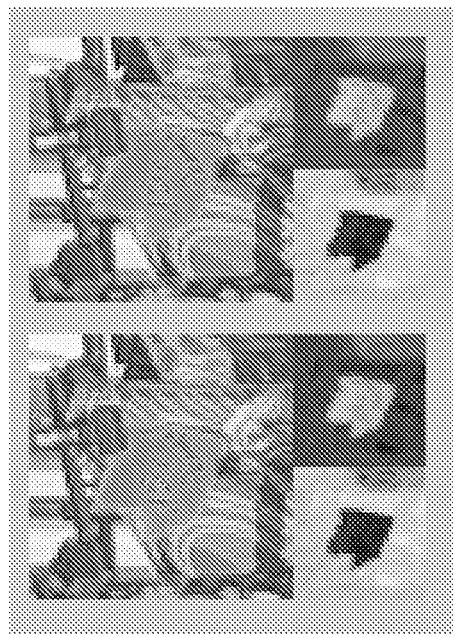
FIG. 9 illustrates a Y'CbCr 4:2:0 shot of detail of two consecutive frames after using Equation 20 and setting $\phi$ to 2.0.

One example is shown in FIG. 9, where we have used the definition of sm{ } from Equation 20, and a value for $\phi$ of $\phi=2.0$. As can be seen the interior of the price tag is even smoother and more similar to the other frame.

Figure 10:
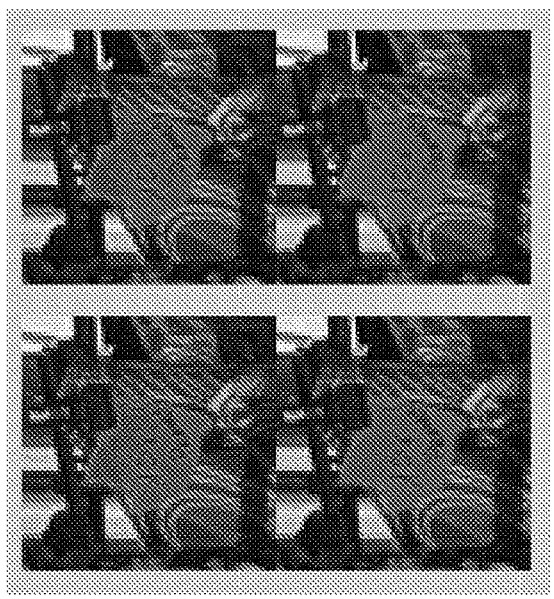
FIG. 10 shows an original image (top row) and the 4:4:4 image after processing, according to an embodiment of the present invention.

To see that we have indeed not changed the picture, see FIG. 10. On the top row, we have the original 444 images. On the bottom row, we have the 444 images after the processing. As can be seen in the figure, it is very difficult to see any difference whatsoever between the two frames, yet their Y'CbCr representations are very different; the top row produces difficult-to-compress Y'CbCr values, whereas the bottom row produces easy-to-compress Y'CbCr values.

One problem with using a larger $\phi$ value such as 2.0 is that the luminance may become compromised. This can be seen as a smoothing effect making the texture of the image appear less sharp. One way to avoid this can be to use a smaller multiplier than 1023 in the similarity measure in Equation (19) or (20). However, it may be faster to use the similarity measure from Equation (20.1) not involving the luminance than a similarity measure such as Equation (19), since this means that we do not need to calculate the bounds $Gmin_Y$ and $Gmax_Y$ at all. This may mean that we get luminance smoothing. However, we can compensate for this error in luminance after having performed the chroma adjustment steps. As an example it is possible to do the following:

1. Starting with the original RGB image "origRGB" in 4:4:4, calculate Gmin and Gmax for every pixel using the similarity measure in Equation (20.1).
2. Do a number of smoothing iterations (as few as one iteration). This will produce a new RGB image in 4:4:4 which we can call "CAgRGB" since it has been undergoing chroma adjustment on the green component.
3. The new image CAgRGB now has a chrominance that matches the one in the original image but the luminance may have become too smooth. We can now lift the luminance from the original. To do so we obtain the original luminance by converting origRGB to XYZ using $$\begin{bmatrix} X \\ Y \\ Z \end{bmatrix} = T \begin{bmatrix} R \\ G \\ B \end{bmatrix}.$$

In practice we are only interested in the luminance Y so the X and Z components do not need to be calculated. We also convert the image CAgRGB to XYZ using $$\begin{bmatrix} X_2 \\ Y_2 \\ Z_2 \end{bmatrix} = T \begin{bmatrix} R_2 \\ G_2 \\ B_2 \end{bmatrix}$$

for every pixel $(R_2, G_2, B_2)$ in CAgRGB and then further from $X_2Y_2Z_2$ to $X_2y_2$ using $$x_2 = \frac{X_2}{X_2 + Y_2 + Z_2} \text{ and}$$

$$y_2 = \frac{Y_2}{X_2 + Y_2 + Z_2}.$$

The $x_2$ and $y_2$ now contains the chromaticity information of CAgRGB and $Y_2$ the luminance. We now replace the luminance $Y_2$ with the luminance of the original pixel Y and convert back to RGB:

$$X_3 = \frac{Y}{y_2} x_2$$

$$Y_3 = Y$$

$$Z_3 = \frac{Y}{y_2}(1 - x_2 - y_2)$$

The pixel $(X_3Y_3Z_3)$ is then converted back to RGB using $$\begin{bmatrix} R_3 \\ G_3 \\ B_3 \end{bmatrix} = T^{-1} \begin{bmatrix} X_3 \\ Y_3 \\ Z_3 \end{bmatrix}.$$

The resulting pixels $(R_3G_3B_3)$ now constitute a picture which will effectively have the same smooth chrominance as the CAgRGB image, but the correct luminance. We can therefore call this image CAgRGB_corrY.

In practice it is most often the case that we will need to subsample the image to 4:2:2 or 4:2:0. In those cases we will often anyway perform luma adjustment as part of that conversion. Since luma adjustment has the ability to change the luminance in each pixel to any value we can put back the luminance at that stage instead. Therefore, instead of doing step 3 above, we can replace it with this alternative step or complement step 3 with step 3b:

3b. The new image CAgRGB is in 4:4:4. If we denote a pixel in CAgRGB with $(R_2, G_2, B_2)$, we first convert it to $(R_2', G_2', B_2')$ using $$R_2' = tf^{-1}(R_2)$$

$$G_2' = tf^{-1}(G_2)$$

$$B_2' = tf^{-1}(B_2)$$

We then convert from $(R_2', G_2', B_2')$ to Y'CbCr using $$\begin{bmatrix} Y_2' \\ Cb_2 \\ Cr_2 \end{bmatrix} = A \begin{bmatrix} R_2' \\ G_2' \\ B_2' \end{bmatrix},$$

where A is a transformation matrix that depends on what color space we are using. We then subsample the Cb and Cr components to half resolution. After that, we again upsample the Cb and Cr components so that we get one Cb value per pixel, and one Cr value per pixel. Since they would likely be different from $Cb_2$ and $Cr_2$, we call them $\widehat{Cb}_2$ and $\widehat{Cr}_2$.

Ordinary luma adjustment would then find the Y' that would bring back the same luminance that CAgRGB had, i.e., it would find Ŷ'=luma_adjustment(Y$_2$, $\widehat{Cb}_1$, $\widehat{Cr}_2$) where Y$_2$ is obtained using $$\begin{bmatrix} X_2 \\ Y_2 \\ Z_2 \end{bmatrix} = T \begin{bmatrix} R_2 \\ G_2 \\ B_2 \end{bmatrix}.$$

However, we can instead use the luminance Y of the original image origRGB, obtained using $$\begin{bmatrix} X \\ Y \\ Z \end{bmatrix} = T \begin{bmatrix} R \\ G \\ B \end{bmatrix},$$

i.e., Ŷ'=luma_adjustment(Y, $\widehat{Cb}_1$, $\widehat{Cr}_2$).

This step would therefore avoid the computations needed for luminance transfer in step 3 above. Additionally, we avoid the possibility that the luminance transfer would lessen the effect of chroma adjustment, resulting in worse subsampled Cb and Cr values.

In yet another embodiment we may want to make the Cb and Cr channels even smoother. It is then possible to apply a smoothing filter after subsampling to Cb and Cr in step 3b above. Alternatively, and likely better, would be to use a different subsampling filter that is more lowpass, i.e., attenuates higher frequencies more. As an example, we have noticed that when moving from a subsampling filter of the form {1, 6, 1}/8 to {1, 2, 1}/4 we get a better result in terms of reduction of luminance artifacts.

Instead of smoothing the Cb and Cr channels it is possible to do smoothing on the (R$_2$, G$_2$, B$_2$) samples instead. Since the luminance is anyway transferred back, either using step 3 or step 3b, it is only the chrominance that will be smoothed; the luminance will stay intact.

In a preferred embodiment a different form of subsampling is used to obtain Cb and Cr. This type of subsampling is described in AJUSTC [10], but is differently used here since we are not putting back the luminance of the image, but rather the luminance of the original. Instead of step 3 or step 3b above, we instead use step 3c:

3c. The new image CAgRGB is in 4:4:4. If we denote a pixel in CAgRGB with (R$_2$, G$_2$, B$_2$), we downsample each component in both the x- and y-dimension (if we want to go to 4:2:2, only one dimension is downsampled), preferably using a {1, 2, 1}/4 filter. The downsampling happens in the linear domain. We call the downsampled values (R$_3$, G$_3$, B$_3$). We then convert these downsampled values to the nonlinear domain resulting in (R$_3$', G$_3$', B$_3$') using $R_3' = tf^{-1}(R_3)$ $G_3' = tf^{-1}(G_3)$ $B_3' = tf^{-1}(B_3)$.

We then convert from (R$_3$', G$_3$', B$_3$') to Y'CbCr using $$\begin{bmatrix} Y_3' \\ Cb_3 \\ Cr_3 \end{bmatrix} = A \begin{bmatrix} R_3' \\ G_3' \\ B_3' \end{bmatrix},$$

where A is a transformation matrix that depends on what color space we are using. We then upsample the Cb and Cr components to the original resolution. We call the upsampled values $\widehat{Cb}_3$ and $\widehat{Cr}_3$.

Ordinary AJUSTC treatment [10] would then find the Y' that would bring back the same luminance that CAgRGB had, i.e., it would find Ŷ'=luma_adjustment(Y$_2$, $\widehat{Cb}_3$, $\widehat{Cr}_3$) where Y$_2$ is obtained using $$\begin{bmatrix} X_2 \\ Y_2 \\ Z_2 \end{bmatrix} = T \begin{bmatrix} R_2 \\ G_2 \\ B_2 \end{bmatrix}.$$

However, we can instead use the luminance Y of the original image origRGB, obtained using $$\begin{bmatrix} X \\ Y \\ Z \end{bmatrix} = T \begin{bmatrix} R \\ G \\ B \end{bmatrix},$$

i.e., Ŷ'=luma_adjustment(Y, $\widehat{Cb}_3$, $\widehat{Cr}_3$).

The processing as proposed in step 3c here will result in superior chrominance. Other ways of converting to Y'CbCr will sometimes have a propensity to make the colors overly saturated. This is due to the fact that dark colors will have an disproportionate effect on the subsampled values. With the method in 3c this is avoided, and the result is a better color reproduction. Also in the 3c case it is possible to smooth the image a bit to further soften the chroma channels. This can be done by convoluting the (R$_2$, G$_2$, B$_2$) samples with a low pass filter such as {1 6 1}/8 or {1, 2, 1}/4 before the subsampling. Alternatively, it can be done as part of the subsampling (when going from (R$_2$, G$_2$, B$_2$) to (R$_3$, G$_3$, B$_3$)) by using a stronger low-pass filter than usual, for instance {1, 12, 38, 12, 1}/64 or {1, 4, 6, 4, 1}/16 or even {1, 2, 1}/4 rather than {1, 6, 1}/8. Alternatively, it can be done after the subsampling.

In this document the example images have been obtained using step 3c and a subsampling filter of {1, 2, 1}/4.

In another embodiment of the invention it is possible to have different values of φ for different pixels. The reason for this is that for a pixel with a very saturated color, it may be more difficult to see color shifts. Furthermore, it is pixels with saturated colors that experience the greatest problems with the variability seen in FIG. 5. Therefore, it may be a good idea to allow for a larger φ for those pixels. At the same time, for a completely white or gray pixel, i.e., a completely desaturated pixel, even a slight shift in chrominance towards, e.g., cyan or pink can be clearly visible. Therefore, it may be a good idea to use a smaller φ for those pixels.

One way can be to set the φ parameter automatically based on the original color of the pixel. First, the chromaticity u' v' is calculated for the pixel. Then the distance to the white point (u'=0.1978 v'=0.4683) is calculated as d=$\sqrt{(u'-0.1978)^2 + (v'-0.4683)^2}$. Using Equation 19, we can now set the parameter φ using the value d:

If d=0, we use φ=0.25. If d>0.3112, we use φ=2. If we have a value of d between 0 and 0.3112, we may use $$\phi = \frac{d}{0.3112} 1.75 + 0.25. \tag{26}$$

This way, if we are on the edge of the color gamut, we will be far from the white point, and get a value close to 2. However, if we are close to the white point, d will be small and we will get a φ of 0.25. As an example, the blue primary is right on the gamut edge. It has coordinates u'=0.1754, v'=0.1579, and will therefore get d= $\sqrt{(0.1755-0.1978)^2+(0.1579-0.4683)^2}=0.3112$, and it will therefore get φ=2. The white point itself on the other hand has d=0 and gets φ=0.25. It may also be possible to take the luminance of the pixel into account. For instance, it may be desirable to have a larger value of φ for dark colors, since it may anyway be difficult to see color shifts in dark colors, whereas it may be desirable to have a smaller value of φ for bright colors.

In another embodiment, we base the value of φ not only on the color of pixel itself but also on the color of surrounding pixels. As an example, if the green (or blue, or red) component in the local area surrounding the pixel is very noisy, we may choose a larger value of φ, whereas if the surrounding is very flat, we may choose a very small value of φ. This way it is possible to preserve very saturated colors if the particular channel is very noise free, such as in the case of synthetically produced images. One example could be to measure the variance in the green component G, or in another component such as R or B. If the variance is very low, a smaller value of φ is chosen. If the variance is very high, a larger value of φ is chosen. In another embodiment we look at the variance in $G'=tf^{-1}(G)$. We can also look the variance of the smallest component of R, G and B.

As an example, assume that for a certain pixel the green component is the smallest of R, G and B. We then measure the variance in the 3×3 or 5×5 neighborhood of the pixel. If we do it in the linear domain, a variance of 0.002 may be considered to be a small value, and a variance of 1000 may be considered to be a large value. Hence we may use a value of φ of $$\phi = \frac{\text{var}\{G\}}{(1000-0.02)}1.95+0.05 \quad (26.1)$$

if the var{G} is between 0.02 and 1000. If the variance is smaller than 0.02, we use φ=0.05, and if the variance is larger than 1000, we use φ=2.0.

It we instead measure the variance on the primed coordinates, we could use a value for φ of $$\phi = \frac{\text{var}\{G'\}}{(0.02-0.0002)}1.95+0.05. \quad (26.2)$$

if var{G'} is between 0.0002 and 0.02. If the variance is smaller than 0.0002, we can use φ=0.05, and if the variance is larger than 0.02, we can use φ=2.0. There are of course other ways to map the variance to the value φ. For instance, it may be better to look at the standard deviation rather than the variance, or use an activity measure other than variance, or use other constants and cutoff values.

It is also possible to base φ both on the activity in surrounding pixels and on the chromaticity/luminance of the pixel. For instance, we could use $\phi=k\phi_c\phi_s$, where $\phi_c$ is the value obtained from the chromaticity analysis and $\phi_s$ is the value obtained from the analysis of the activity in the local surrounding of the pixel, and k is a constant.

In another embodiment, we may want to correct more than one component. As an example, we may want to correct both the blue and the green channel. It is then possible to first do a correction in green, and then another correction in blue. One may then take the output of the green correction process and use it as the input to the blue correction process. One way is to use the output of the green correction process as a "new original" that is corrected using the blue correction process. The limits Bmin(x,y) and Bmax(x,y) can be calculated from this "new original". Alternatively, they can be calculated from the original image.

Let [Gmin, Gmax]=findGminAndGmax(image1, image2 phiG) be a function that finds for each pixel how much one can vary G in image2 before image2 is different from image1. In other words, for pixel (x,y), Gmin(x,y) will be the smallest value of Gm so that $$sm\{[R1(x,y),G1(x,y),B1(x,y)],[R2(x,y)Gm,B2(x,y)]\} \text{ is smaller than } phiG(x,y), \quad (27)$$

where R1(x,y) is the red component of pixel (x,y) in image1, $G_1$(x,y) is the green component of pixel (x,y) in image1, and B1(x,y) is the blue component of pixel (x,y) in image1. Likewise, R2(x,y) is the red component of pixel (x,y) in image2, and B2(x,y) is the blue component of pixel (x,y) in image2. Similarly, Gmax(x,y) will be the largest value of Gm so that $$sm\{[R1(x,y),G1(x,y),B1(x,y)],[R2(x,y)Gm,B2(x,y)]\} \text{ is smaller than } phiG(x,y). \quad (28)$$

Furthermore, let doIterationsAndClampingGreen(image1, Gmin, Gmax) be a function that creates a new value Gsmooth for the green channel using some filtering, clamps this value using clamp(Gsmooth, Gmin, Gmax) and iterates until convergence. Here Gmin and Gmax are defined for every pixel in the image. Let doIterationsAndClampingBlue (image1, Bmin, Bmax) do the same for the blue channel, etc. We can now write different embodiments expressed using these functions:

One Embodiment origRGB; // this is the original image
[Gmin, Gmax]=findGminAndGmax(origRGB, origRGB, phiG);
CAgRGB=doIterationsAndClampingGreen(origRGB, Gmin, Gmax);
[Bmin, Bmax]=findBminAndBmax(CAgRGB, CAgRGB, phiB);
CAgbRGB=doIterationsAndClampingBlue(CAgRGB, Bmin, Bmax);

Note that even if it is not possible for the human eye to distinguish between the original origRGB and the output of the green correcting process CAgRGB, and it is not possible to distinguish between the output of the green correcting process CAgRGB and the output of the blue correcting process CAgbRGB, it may be possible that the error between origRGB and CAgbRGB is big enough to be discernable. Therefore one may use a value of φ that is so small that cumulative changes are not visible. For instance, it may be possible to set the φ value in the green process (phiG in the pseudo code above) to 0.25 and the φ value in the blue process (phiG in the pseudo code above) to 0.25. This means that the worst case is that the similarity measure between origRGB and CAgbRGB is smaller than 0.5: sm[origRGB, CAgbRGB]<sm[orig(RGB), CAgRGB]+sm[CAgRGB, CAgbRGB]<0.25+0.25=0.5, where the first inequality is due to the triangle inequality.

In an alternative embodiment, we do not simply take the output from the previous step as input to the next step. Instead we always compare against the original image origRGB when calculating the bounds Gmin and Gmax:

origRGB; // this is the original image
[Gmin, Gmax]=findGminAndGmax(origRGB, origRGB, phiG);
CAgRGB=doIterationsAndClampingGreen(origRGB, Gmin, Gmax);
[Bmin, Bmax]=findBminAndBmax(origRGB, CAgRGB, phiB);
CAgbRGB=doIterationsAndClampingBlue(CAgRGB, Bmin, Bmax);

Note that in some circumstances it may be the case that we cannot change the second component B at all. As an example, consider the diagram in FIGS. 11A and 11B.

In the diagram in FIG. 11A, we have plotted the green component of a pixel on the x-coordinate axis and the blue component of the same pixel on the y-coordinate. If we use a certain value of $\phi$, say $\phi=0.5$, and plot all the values Gtry, Btry for which the similarity measure $$sm\{[R,G,B],[R,Gtry,Btry]\}<\phi \quad (29)$$

where R, G, and B are the original color components of the pixel, we get the region (1) shown in the left part of the figure. The original color R, G, B is marked with a triangle (2) in the middle of this region. Now if we correct the green component so to make it more similar to its neighbors, it may end up on the border of this region, as marked with a square (3). If we now want to change the blue component, we cannot move it at all without going outside the allowed area, as shown (4).

This can be solved by having different values of $\phi$ for the two stages. This is shown in the diagram of FIG. 11B. Here we use a smaller value $\phi_g$ for the first correction. This means that the allowed area is smaller, as marked with the dotted line in the diagram (1). Now, the green processing can only move the color to the edge of this area, and if it lands on the edge it may end up as marked with the square (3). Now if we use a larger value $\phi_b$ for the second correction, we can see that we can change the blue component so that the pixel ends up at the circle (4). It is hence possible to change both the green and the blue coordinate if $\phi_g<\phi_b$.

In yet another embodiment, we may want to correct all three components R, G and B. For example, we can use the embodiment origRGB; // this is the original image
[Gmin, Gmax]=findGminAndGmax(origRGB, origRGB, phiG);
CAgRGB=doIterationsAndClampingGreen(origRGB, Gmin, Gmax);
[Bmin, Bmax]=findBminAndBmax(origRGB, CAgRGB, phiB);
CAgbRGB=doIterationsAndClampingBlue(CAgRGB, Bmin, Bmax);
[Rmin, Rmax]=findRminAndRmax(origRGB, CAgbRGB, phiR);
CAgbrRGB=doIterationsAndClampingRed(CAgbRGB, Rmin, Rmax);

Again, it may be desirable to use phiR>phiB>phiG.

The order to do the processing can of course change. It may be desirable to have the most troublesome component either first or last. If it is first, one may be sure to have at least some room for maneuver, since we have not already moved the pixel away from its original position. On the other hand, it may also be desirable to have it last, if the $\phi$ of the last correcting stage is sufficiently larger than the $\phi$ or the first and second correcting stage. It may also be desirable to have it in the middle.

Likewise, when processing all three color components using the embodiment where we simply use the output of the previous stage as a new original, one may set all three $\phi$ values to 0.5/3.

Above we have iterated until our convergence criterion is fulfilled in doIterationsAndClampingX on the first color component before proceeding to the next color component. However, in another embodiment we only iterate one step, as illustrated by the following pseudo code:

```
origRGB; // this is the original image
bestSoFarRGB = origRGB;
notConverted = 1;
while notConverted
    [Gmin, Gmax] = findGminAndGmax(origRGB, bestSoFarRGB, phiG);
    CAgRGB = doOneIterationAndClampGreen(bestSoFarRGB, Gmin, Gmax);
    [Bmin, Bmax] = findBminAndBmax(origRGB, CAgRGB, phiB);
    CAgbRGB = doOneIterationAndClampBlue(CAgRGB, Bmin, Bmax);
    [Rmin, Rmax] = findRminAndRmax(origRGB, CAgbRGB, phiR);
    CAgbrRGB = doOneIterationAndClampRed(CAgbRGB, Rmin, Rmax);
    if( difference(bestSoFarRGB, CAgbrRGB) < threshold )
        notConverted = 0;
    end;
    bestSoFarRGB = CAgbrRGB
end;
```

In this case, we first change G, then B, then R and then G again etc. until convergence. This may make it less important which color component is processed first, since they are intertwined. It may also be advantageous to change phiG, phiB and phiR over time. In one embodiment they start being quite small and slowly grows. However, if speedy convergence is of interest it may be desirable to instead lower them gradually.

Analytic Expressions for the Similarity Function when One of the Colors is not the Original In the above examples, we have used the function [Gmin, Gmax]=findGminAndGmaxGreen(RGB, $R_2G_2B_2$, phiG) to find out the allowed interval for $G_2$=[Gmin, Gmax], i.e., which values of green can we use without becoming too different from RGB. However, we have above only provided example implementations for the case when $R_2G_2B_2$=RGB.

Thankfully we can arrive at an analytic solution even for the general case when $R_2G_2B_2 \neq$ RGB, for example for the case when the similarity function is equal to Equation (20.1).

We want to solve the problem of what values of green $G_2$ will make the color ($R_2$, $G_2$, $B_2$) similar enough to the original color (R, G, B) in the sense that its $u_2'$ coordinate will not differ from that of the original u' with more than $\Delta u'$, and its $v_2'$ coordinate will not differ from that of the original v' with more than $\Delta v'$. Starting with the u' coordinate, we can write the color ($R_2$, $G_2$, $B_2$) as the original color (R, G, B) plus a difference ($\delta R$, $\delta G$, $\delta B$):

$$(R_2, G_2, B_2)=(R,G,B)+(\delta R, \delta G, \delta B). \quad (30)$$

We can convert the original color (R, G, B) to XYZ using $$\begin{bmatrix} X \\ Y \\ Z \end{bmatrix} = T \begin{bmatrix} R \\ G \\ B \end{bmatrix}, \quad (30.1)$$

and the original u' coordinate is thus $$u' = \frac{4X}{X + 15Y + 3Z}. \tag{31}$$

Likewise, the u' coordinate for the color $(R_2, G_2, B_2)$, which we call $u'_2$, can be written as $u'_2 = u' + \Delta u'$, and can be calculated using $$u'_2 = u' + \Delta u' = \frac{4X_2}{X_2 + 15Y_2 + 3Z_2}. \tag{32}$$

Here $$\begin{bmatrix} X_2 \\ Y_2 \\ Z_2 \end{bmatrix} = T \begin{bmatrix} R_2 \\ G_2 \\ B_2 \end{bmatrix} = T \left( \begin{bmatrix} R \\ G \\ B \end{bmatrix} + \begin{bmatrix} \delta R \\ \delta G \\ \delta B \end{bmatrix} \right) = T \begin{bmatrix} R \\ G \\ B \end{bmatrix} + \tag{33}$$

$$T \begin{bmatrix} \delta R \\ \delta G \\ \delta B \end{bmatrix} = \begin{bmatrix} X \\ Y \\ Z \end{bmatrix} + T \begin{bmatrix} \delta R \\ \delta G \\ \delta B \end{bmatrix} = \begin{bmatrix} X + t_{11}\delta R + t_{12}\delta G + t_{13}\delta B \\ Y + t_{21}\delta R + t_{22}\delta G + t_{23}\delta B \\ Z + t_{31}\delta R + t_{32}\delta G + t_{33}\delta B \end{bmatrix}.$$

Hence we can write rewrite Equation (32) as $$u' + \Delta u' = \tag{34}$$

$$\frac{4(X + t_{11}\delta R + t_{12}\delta G + t_{13}\delta B)}{X + t_{11}\delta R + t_{12}\delta G + t_{13}\delta B + 15(Y + t_{21}\delta R + t_{22}\delta G + t_{23}\delta B) + 3(Z + t_{31}\delta R + t_{32}\delta G + t_{33}\delta B)}$$

which equals $$u' + \Delta u' = \frac{4X + 4t_{11}\delta R + 4t_{12}\delta G + 4t_{13}\delta B}{X + 15Y + 3Z + (t_{11} + 15t_{21} + 3t_{31})\delta R + (t_{12} + 15t_{22} + 3t_{32})\delta G + (t_{13} + 15t_{23} + 3t_{33})\delta B}. \tag{35}$$

Now if we set $$K_1 = t_{11} + 15t_{21} + 3t_{31} = [1 \ 15 \ 3]T \begin{bmatrix} 1 \\ 0 \\ 0 \end{bmatrix},$$

$$K_2 = t_{12} + 15t_{22} + 3t_{32} = [1 \ 15 \ 3]T \begin{bmatrix} 0 \\ 1 \\ 0 \end{bmatrix}$$

as previously, $$K_2 = t_{13} + 15t_{23} + 3t_{33} = [1 \ 15 \ 3]T \begin{bmatrix} 0 \\ 0 \\ 1 \end{bmatrix}$$

and $D = X + 15Y + 3Z$ as previously, we get $$u' + \Delta u' = \frac{4X + 4t_{11}\delta R + 4t_{12}\delta G + 4t_{13}\delta B}{D + K_1\delta R + K_2\delta G + K_3\delta B}. \tag{36}$$

It is now possible to solve for $\delta G$, giving $$\delta G = \frac{4(X + t_{11}\delta R + t_{13}\delta B) - (u' + \Delta u')(D + K_1\delta R - K_3\delta B)}{(u' + \Delta u')K_2 - 4t_{12}} \tag{37}$$

Note that this is a generalization of the formula in Equation (21.16), where $\delta R = \delta B = 0$ and $\delta G = \Delta G$. Just as in that special case, we can find the allowed values of green by calculating $\delta G$ for a positive and a negative deviation from u':

$$\delta G_1 = \frac{4(X + t_{11}\delta R + t_{13}\delta B) - (u' + \Delta u')(D + K_1\delta R - K_3\delta B)}{(u' - \Delta u')K_2 - 4t_{12}} \tag{38}$$

The value $$G\min_{u'} = G + \min\{\delta G_1, \delta G_2\} \tag{39.1}$$

is now the smallest value of green that will make the u' coordinate in the allowed range, and $$G\max_{u'} = G + \max\{\delta G_1, \delta G_2\} \tag{39.2}$$

is the largest value of green that will make the u' coordinate land in the allowed range. We can now do the same derivation for the v' component, and calculate $$\delta G_2 = \frac{4(X + t_{11}\delta R + t_{13}\delta B) - (u' + \Delta u')(D + K_1\delta R - K_3\delta B)}{(u' + \Delta u')K_2 - 4t_{12}} \tag{39}$$

The value $$G\min_{v'} = G + \min\{\delta G_3, \delta G_4\} \tag{41.1}$$

is now the smallest value of green that will make the v' coordinate in the allowed range, and $$G\max_{v'} = G + \max\{\delta G_3, \delta G_4\} \tag{41.2}$$

is the largest value of green that will make the v' coordinate land in the allowed range. When calculating Gmin and Gmax we must take the most conservative value, hence $$G\min = \max\{G\min_{u'}, G\min_{v'}\}, \text{ and} \tag{42}$$

$$G\max = \min\{G\max_{u'}, G\max_{v'}\}. \tag{43}$$

Note that in the simpler case of Equation (21.16) where $\delta R = \delta B = 0$, we were guaranteed that there would be at least one value that would satisfy both u' and v', namely the value $\delta G = 0$. In that case $(R_2, G_2, B_2)$ equals $(R, G, B)$ which makes their u' and v' coordinates the same. However, in the general case it is not certain that it is possible to find a solution. This can be the case if the color $(R_2, G_2, B_2)$ is already outside the similarity zone of $(R, G, B)$, and changing G may not always make it possible to reach the zone. In these cases one may therefore end up with the situation that the constraint from u' demands green to be higher than, say 10, but the constraint from v' demands the green to be lower than 8. This will result in a Gmin that is higher than Gmax, a negative interval.

Figure 12:
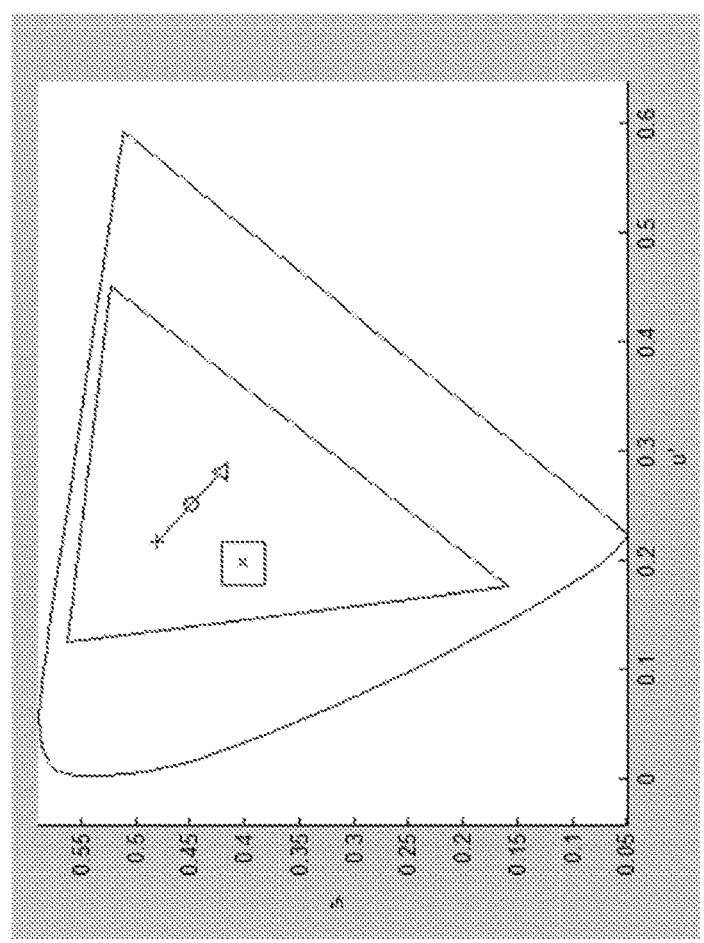
FIG. 12 shows how, if the colors (the cross and the circle) are too different from each other, there may be no way to set the green component so that the circle comes into the allowed range marked by the box. Adding green, i.e., moving towards the plus, makes the u' coordinate better, but worsens the v' coordinate, and vice versa.

Such a situation is shown in FIG. 12. In this case the original color RGB=(10, 9, 21) in BT.709. This gives the u'v' coordinates u'=0.197 v'=0.401, which is marked with a cross in the diagram. Assume we are OK to deviate 8/410 in either direction from u' and v', that means that any color within the box surrounding the cross is going to be regarded to be similar. This is typically a much higher tolerance that would be realistic but is used here for illustrational purposes.

Now assume we have (R2, G2, B2)=(19, 7 12). This will generate u'v' coordinates of u'=0.251 v'=0.448, marked with a circle in the diagram.

Now, by adding green to this second color, we can make its u' coordinate smaller. If we set the green component to 13.61, we will get a u' coordinate that is just in the accepted range. This color is marked with the plus in the figure. However, this moves us in the wrong direction with respect to the v' coordinate. Similarly, we can get the v' coordinate to the accepted range by setting the green component to 3.64. This color is marked with a triangle in the figure. However, that makes the u' coordinate move in the wrong direction. There is no value of green that satisfy both u' and v', and the method would find the allowed range of green to be [13.61, 3.64], i.e., a negative interval that does not contain a single point.

Ideally such a situation should never occur, since we should always start with a value inside the allowed range (circle being inside the box), but if it does occur it may be a good idea to set the interval to a single value, for instance the current green color: [7.0, 7.0].

Thus, one way to implement findGminAndGmax(RGB, $R_2G_2B_2$, phiG) is to perform the following steps:

Calculate $\delta R$ and $\delta B$ using $(\delta R, \delta G, \delta B)=(R_2, G_2, B_2)-(R, G, B)$. The result for the green pixel is not needed.

Calculate (X Y Z) from RGB using Equation (30.1).

Calculate u' from (X, Y, Z) using Equation (21.6) and v' using Equation (21.7).

Set $\Delta u'$=phiG and calculate $\delta G_1$ and $\delta G_2$ using Equation (38) and (39).

Set $\Delta v'$=phiG and calculate $\delta G_3$ and $\delta G_4$ using Equation (38) and (39).

Calculate $Gmin_{u'}$ using Equation (39.1) and $Gmin_{u'}$ using Equation (39.2).

Calculate $Gmin_{v'}$ using Equation (41.1) and $Gmax_{v'}$ using Equation (41.2).

Calculate Gmin and Gmax using Equation (42) and (43). Now if Gmin≤Gmax, the interval is [Gmin, Gmax] and we return this. Otherwise we set Gmin=Gmax=$G_2$ and return this.

In the same way as we generalized the similarity measure for the chromaticity u'v', we can generalize the similarity measure for the luminance. Assume we want to find the limits for the green component of the color $(R_2, G_2, B_2)$ when compared to an original color (R, G, B).

The tfi_inv(Y) for the original is again $$tf^{-1}(Y)=tf^{-1}(w_R R+w_G G+w_B B). \quad (43.1)$$

We can write $(R_2, G_2, B_2)=(R, G, B)+(\delta R, \delta G, \delta B)$. This means that we can write the tf_inv(Y) for the changed color as $$tf^{-1}(Y_2)=tf^{-1}(w_R R+\delta R)+w_G(G+\delta G)+w_B(B+\delta B)), \quad (44)$$

which we can write as $$tf^{-1}(Y_2)=tf^{-1}(w_R(R+\delta R)+w_G G+w_B(B+\delta B)+w_G \delta G). \quad (44a)$$

We now introduce the helper variable $Y_h=w_R(R+\delta R)+w_G G+w_B(B+\delta B)$ which helps us rewrite the equation as $$tf^{-1}(Y_2)=tf^{-1}(Y_h+w_G \delta G). \quad (45)$$

The constraint in Equation (19) is that $1023|tf^{-1}(Y)-tf^{-1}(Y_2)|<\phi$. We can change the order inside the absolute value $|\bullet|$ giving $1023|tf^{-1}(Y_2)-tf^{-1}(Y)|<\phi$. If we first consider the case when $Y_h>Y$ and where $\delta G$ is positive, $Y_2$ must be larger than Y and since $tf^{-1}(\bullet)$ is monotonously increasing this means that $tf^{-1}(Y_2)$ is larger than $tf^{-1}(Y)$ and we can remove the absolute value. Replacing $\phi$ with $\phi_2=\phi/1023$ we can rewrite the condition as $$tf^{-1}(Y_2)-tf^{-1}(Y)<\phi_2. \quad (46)$$

We are interested in the place where we are exactly on the border of this condition, so we are more interested in the equality than in the inequality. This can be written $$tf^{-1}(Y_2)=tf^{-1}(Y)+\phi_2. \quad (47)$$

Taking $tf(\bullet)$ of both sides gives $$Y_2=tf(tf^{-1}(Y)+\phi_2), \quad (48)$$

which equals $$Y_h+w_G \delta G=tf(tf^{-1}(Y)+\phi_2), \quad (49)$$

which can be written as $$w_G \delta G=tf(tf^{-1}(Y)+\phi_2)-Y_h \quad (50)$$

We can therefore solve for $\delta G$:

$$\delta G_3 = \frac{9(Y + t_{21}\delta R + t_{23}\delta B) - (v' - \Delta v')(D + K_1 \delta R - K_3 \delta B)}{(v' - \Delta v')K_2 - 9t_{22}} \quad (40)$$

$$\delta G_4 = \frac{9(Y + t_{21}\delta R + t_{23}\delta B) - (v' + \Delta v')(D + K_1 \delta R - K_3 \delta B)}{(v' + \Delta v')K_2 - 9t_{22}} \quad (41)$$

A similar formula can be derived when $Y_h<Y$ and when $\Delta G$ is negative:

$$\delta Gmin_Y = \frac{tf(tf^{-1}(Y) - \phi_2) - Y_h}{w_G}. \quad (52)$$

The case when $Y_h<Y$ but at the same time dG>0 is a bit trickier. Here it should be noted that since the helper luminance $Y_h=w_R(R+\delta R)+w_G G+w_B(B+\delta B)$=is too low, increasing $\delta G$, i.e., moving $G_2$ away from the original value of the green channel G, actually helps making the luminances get closer. This is true up to the point where we have added a value of $\delta G$ that makes the luminances equal, namely where $Y_h+w_G \delta G=Y$. Let us call the value of $\delta G$ where this happens $\delta G_1$. We can thus calculate this value as $$\delta G_1 = \frac{Y - Y_h}{w_G}. \quad (53)$$

For $\delta G=\delta G_1$ we thus get the luminance Y. For higher values of $\delta G$ we get a luminance of $Y+w_G(\delta G-\delta G_1)$. Setting dG2=dG-dG1 we get a luminance of $Y+w_G \delta G_2$. We can thus reuse Equation (49) with $Y_h$ replaced by Y and $\delta G$ replaced by $\delta G_2$. This means that we can write $$\delta G_2 = \frac{tf(tf^{-1}(Y) + \phi_2) - Y}{w_G}, \quad (54)$$

and hence $$\delta G = \delta G_1 + \frac{tf(tf^{-1}(Y) + \phi_2) - Y}{w_G}. \quad (55)$$

Thus if Yh<Y, the way to calculate $\delta Gmax_{Y1}$ is $$\delta G = \frac{Y - Y_h}{w_G} + \frac{tf(tf^{-1}(Y) + \phi_2) - Y}{w_G}. \quad (56)$$

But the observant reader notices that this can be rewritten as $$\delta G = \frac{tf(tf^{-1}(Y) + \phi_2) - Y_h}{w_G}. \quad (57)$$

Therefore, no special care needs to be taken whether $Y_h$<Y or not when calculating $\delta Gmax_{Y1}$. The same applies for $\delta Gmin_{Y1}$. We can therefore calculate $Gmin_Y$ and $Gmin_Y$ as $$Gmax_Y = G + \frac{tf(tf^{-1}(Y) + \phi_2) - Y_h}{w_G}. \quad (58)$$

$$Gmin_Y = G + \frac{tf(tf^{-1}(Y) - \phi_2) - Y_h}{w_G}. \quad (59)$$

We can now change Equations (42) and (43) to also take these values into consideration:

$$Gmin = \max\{Gmin_u, Gmin_v, Gmin_Y\}, \text{ and} \quad (60)$$

$$Gmax = \min\{Gmax_u, Gmax_v, Gmax_Y\}. \quad (61)$$

Embodiment Operating in CIELUV u'v'

In another embodiment, we do not do the processing in RGB. Instead, the processing is performed in u'v'-space. This has the advantage of making it unnecessary to calculate Gmin and Gmax, since u'min will always be the original u'-value for the pixel minus the tolerance of, say, 0.5/410, and u'max will always be the original u'-value for the pixel plus 0.5/410. Alternatively a smaller or bigger value can be used, and can be made dependent on, e.g., the color of the pixel and/or the activity of its surrounding.

Such an implementation is illustrated using the following pseudo code:

```
origRGB; // This is the original image in linear RGB
orig_up_vp_Y = convertFromRGBToupvpY(origRGB); // This is the
original image in linear u'v'Y
orig_up_vp = orig_up_vp_Y(:,:,1:2); // This is only the chromaticity
```

-continued

```
u' v' of the original
best_so_far_up_vp = orig_up_vp;
notConverted = 1;
while notConverted
    smoothed_up_vp = doSmothingr(best_so_far_up_vp);
    clamped_up_vp(:,:,) = clamp(smoothed_up_vp(:,:,1:2),
orig_up_vp(:,:,1:2)-α, orig_up_vp(:,:,1:2)+α);
    if( difference(best_so_far_up_vp, clamped_up_vp) < threshold)
        notConverted = 0;
    end;
    best_so_far_up_vp = clamped_up_vp;
end;
copy_up_vp_Y(:,:,1:2) = best_so_far_up_vp;
copy_up_vp_Y(:,:,3) = orig_up_vp_Y(:,:,3);
copyRGB = convertFromupvpYtoRGB(copy_up_vp_Y);
```

Here we have used Matlab notation where origRGB(:,:,1) is the first (red) component of the image origRGB, origRGB(:,:,2) is the second (green) component etc. The function clamp(X, A, B) operates on u'v'-images, which means that the X(i, j, 1) is the u' component of the pixel in position i, j, and X(i, j, 2) is the v' component. C=clamp(X, A, B) returns a u' value u' C(i, j, 1) in every position (i,j) that is the clamped value of X(i, j, 1) against A(i, j, 1) and B(i, j, 1), and a v' value C(i, j, 2) in every position (i,j) that is the clamped value of X(i, j, 2) against A(i, j, 2) and B(i, j, 2).

Advantages with this solution is that no calculation of Gmin and Gmax is necessary, saving computational complexity. Also, we do not have to choose between processing, say, green first, blue second and, say, red last, and red first, green second and blue last. This is due to the fact that u' and v' are processed together. However, it is our experience that processing in u' v' in the manner described above will not always produce as perfectly smooth a result as when processing in RGB.

Figure 13A:
FIG. 13A shows Y' (top) and Cb and Cr (bottom) components with RGB processing.
Figure 13B:
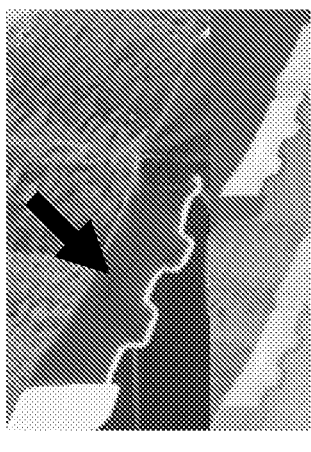
FIG. 13B shows Y' (top) and Cb and Cr (bottom) components with u'v' processing.

As an example, see FIGS. 13A and 13B, where the picture in FIG. 13A, processed using RGB, provides a completely smooth surface on the side of the tent, whereas the picture in FIG. 13B, which shows the Y'CbCr that is the result of processing using uv, has some dark spots, such as the one marked with an arrow.

It should be noted, that if we can process the original image in a way so that when we convert it to YCbCr, subsample Cb and Cr and upsample Cb and Cr we get the same image back, then we are going to be having no luminance artifacts at all. The reason the luminance artifacts come up during subsampling is that they change the chroma so that it no longer fits with the luma. If we can come up with an image that doesn't change its chroma during subsampling and upsampling, the chroma cannot become out of synch with the luma.

Therefore, in an alternative embodiment, we perform the following steps:

1. We start with the original RGB image origRGB, which have samples (R, G, B).

2. We convert it to (R', G', B') using $$R' = tf^{-1}(R)$$

$$G' = tf^{-1}(G)$$

$$B' = tf^{-1}(B).$$

We then convert from (R', G', B') to Y'CbCr using $$\begin{bmatrix} Y' \\ Cb \\ Cr \end{bmatrix} = A \begin{bmatrix} R' \\ G' \\ B' \end{bmatrix},$$

where A is a transformation matrix that depends on what color space we are using. We then subsample the Cb and Cr components to half resolution. After that, we again upsample the Cb and Cr components so that we get one Cb value per pixel, and one Cr value per pixel. Since they would likely be different from Cb and Cr, we call them $\widetilde{Cb}$ and $\widetilde{Cr}$.

3. Note that both Cb, Cr as well as $\widetilde{Cb}$ and $\widetilde{Cr}$ are in full resolution. From $$\begin{bmatrix} Y' \\ Cb \\ Cr \end{bmatrix}$$

it is possible to go back to the original pixel color, but if we replace Cb and Cr with $\widetilde{Cb}$ and $\widetilde{Cr}$ we will get another pixel. What we now do is to see if replacing Cb and Cr will give a pixel that is similar enough to the original pixel, i.e., if the pixel $$\begin{bmatrix} Y' \\ \widetilde{Cb} \\ \widetilde{Cr} \end{bmatrix}$$

is so close to $$\begin{bmatrix} Y' \\ Cb \\ Cr \end{bmatrix}$$

so that a human observer would not be able to tell the difference. However, since we have changed Cb and Cr, we may now have an erroneous luminance in the pixel. We must therefore first select a Y', which we denote $\hat{Y}'$, so that the pixel $$\begin{bmatrix} \hat{Y}' \\ \widetilde{Cb} \\ \widetilde{Cr} \end{bmatrix}$$

has the correct luminance. We can do that with luma adjustment as $\hat{Y}'$=luma_adjustment(Y, $\widetilde{Cb}$, $\widetilde{Cr}$), where Y is the original luminance obtained using $$\begin{bmatrix} X \\ Y \\ Z \end{bmatrix} = T \begin{bmatrix} R \\ G \\ B \end{bmatrix}.$$

Now, if the similarity measure determines that $$\begin{bmatrix} \hat{Y}' \\ \widetilde{Cb} \\ \widetilde{Cr} \end{bmatrix}$$

is sufficiently close to $$\begin{bmatrix} Y' \\ Cb \\ Cr \end{bmatrix},$$

we replace Y', Cb and Cr with $\hat{Y}'$, $\widetilde{Cb}$ and $\widetilde{Cr}$. Note that we may have to convert back to RGB to evaluate the similarity measure. However, if the similarity measure determines that the colors are not similar, we try a Cb value that lies halfway between Cb and $\widetilde{Cb}$:

$$\widehat{Cb}_{k+1} = \frac{1}{2}(Cb + \widehat{Cb}_k),$$

where $\widehat{Cb}_1 = \widetilde{Cb}$. We do likewise for Cr, and recalculate Y' using luma adjustment. The new $$\begin{bmatrix} \hat{Y}'_{k+1} \\ \widehat{Cb}_{k+1} \\ \widehat{Cr}_{k+1} \end{bmatrix}$$

is again tried against $$\begin{bmatrix} Y' \\ Cb \\ Cr \end{bmatrix}$$

using the similarity measure. If it passes the test, we replace Y', Cb and Cr with $\hat{Y}'_{k+1}$, $\widehat{Cb}_{k+1}$ and $\widehat{Cr}_{k+1}$. Otherwise we halve the distance again. After a fixed number of iterations, for instance 10, we give up and just use $$\begin{bmatrix} Y' \\ Cb \\ Cr \end{bmatrix}$$

for that pixel. But in many cases we have moved Cb and Cr closer to their subsampled and then upsampled variants.

4. We now subsample the new Y'CbCr image again and upsample it, creating new $\widetilde{Cb}$ and $\widetilde{Cr}$ values in every pixel. We now perform step 3 again. However, we always compare against the $$\begin{bmatrix} Y' \\ Cb \\ Cr \end{bmatrix}$$

-values obtained in step 2. We iterate until convergence or until we have executed step 3 a fixed number of steps, for instance 64 steps.

In yet an alternate embodiment, we do the same but perform the subsampling not in the Cb Cr domain but in the RGB domain:

1. We denote a pixel in the original image origRGB with ($R_2$, $G_2$, $B_2$).

2. We then downsample each component in both the x- and y-dimension (if we want to go to 4:2:2, only one dimension is downsampled), preferrably using a {1, 2, 1}/4 filter. The downsampling happens in the linear domain. We call the downsampled values ($R_3$, $G_3$, $B_3$). We then convert these downsampled values to the nonlinear domain resulting in ($R_3'$, $G_3'$, $B_3'$) using $$R_3'=tf^{-1}(R_3)$$

$$G_3'=tf^{-1}(G_3)$$

$$B_3'=tf^{-1}(B_3).$$

2. We then convert from ($R_3'$, $G_3'$, $B_3'$) to Y'CbCr using $$\begin{bmatrix} Y' \\ Cb_3 \\ Cr_3 \end{bmatrix} = A \begin{bmatrix} R_3' \\ G_3' \\ B_3' \end{bmatrix},$$

where A is a transformation matrix that depends on what color space we are using. We then upsample the $Cb_3$ and $Cr_3$ components to the original resolution. We call the upsampled values $\widehat{Cb}$ and $\widehat{Cr}$. We then find the Y' that brings back the same luminance that the origRGB image had, i.e., it we find $\hat{Y}'$=luma_adjustment($Y_2$, $\widehat{Cb}$, $\widehat{Cr}$) where $Y_2$ is obtained using $$\begin{bmatrix} X_2 \\ Y_2 \\ Z_2 \end{bmatrix} = T \begin{bmatrix} R_2 \\ G_2 \\ B_2 \end{bmatrix}.$$

We also calculate Y'CbCr the regular way, i.e., the same way as in step 2 in the previous section. This means we take the RGB of the original color, convert to R'G'B' and then to Y'CbCr. It is this Y'CbCr that will be used as a reference in the next step.

3. Note that both Cb, Cr as well as $\widehat{Cb}$ and $\widehat{Cr}$ are in full resolution. From $$\begin{bmatrix} Y' \\ Cb \\ Cr \end{bmatrix}$$

it is possible to go back to the original pixel color, but if we replace Cb and Cr with $\widehat{Cb}$ and $\widehat{Cr}$ we will get another pixel color. What we now do is to see if replacing Cb and Cr will give a pixel color that is similar enough to the original pixel, i.e., if the pixel color $$\begin{bmatrix} \hat{Y}' \\ \widehat{Cb} \\ \widehat{Cr} \end{bmatrix}$$

is so close to $$\begin{bmatrix} Y' \\ Cb \\ Cr \end{bmatrix}$$

so that a human observer would not be able to tell the difference. Now, if the similarity measure determines that $$\begin{bmatrix} \hat{Y}' \\ \widehat{Cb} \\ \widehat{Cr} \end{bmatrix}$$

is sufficiently close to $$\begin{bmatrix} Y' \\ Cb \\ Cr \end{bmatrix},$$

we replace Y', Cb and Cr with $\hat{Y}'$, $\widehat{Cb}$ and $\widehat{Cr}$. Note that we may have to convert back to RGB to evaluate the similarity measure. However, if the similarity measure determines that the colors are not similar, we try a Cb value that lies halfway between Cb and $\widehat{Cb}$:

$$\widehat{Cb}_{k+1}=\tfrac{1}{2}(Cb+\widehat{Cb}_k),$$

where $\widehat{Cb}_1=\widehat{Cb}$. We do likewise for Cr, and recalculate Y' using luma adjustment. The new $$\begin{bmatrix} \hat{Y}'_{k+1} \\ \widehat{Cb}_{k+1} \\ \widehat{Cr}_{k+1} \end{bmatrix}$$

is again tried against $$\begin{bmatrix} Y' \\ Cb \\ Cr \end{bmatrix},$$

using the similarity measure. If it passes the test, we replace Y', Cb and Cr with $\hat{Y}'_{k+1}$, $\widehat{Cb}_{k+1}$ and $\widehat{Cr}_{k+1}$. Otherwise we halve the distance again. After a fixed number of iterations, for instance 10, we give up and just use $$\begin{bmatrix} Y' \\ Cb \\ Cr \end{bmatrix}$$

for that pixel. But in many cases we have moved Cb and Cr closer to $\widehat{Cb}$ and $\widehat{Cr}$.

4. We now subsample the new Y'CbCr image again by converting back to linear RGB and subsampling the RGB values, converting to Y'CbCr and upsample the chroma, creating new $\widehat{Cb}$ and $\widehat{Cr}$ values in every pixel. We now perform step 3 again. However, we always compare against the $$\begin{bmatrix} Y' \\ Cb \\ Cr \end{bmatrix}$$

-values obtained in step 2. We iterate until convergence or until we have executed step 3 a fixed number of steps, for instance 32 steps.

In another embodiment we use chroma adjustment followed by conversion to a color space other than non-constant luminance Y'CbCr. One example is constant-luminance YCbCr, as described in the MPEG contribution document m36256 [11], where it is denoted CL. Another example is ICtCp, as described in the MPEG contribution document m38148 [12].

In another embodiment it is possible to use xyY instead of u'v'Y in the similarity measure. For instance, it is possible to use a similarity measure between two colors RGB1 and RGB2 where both colors are converted to XYZ using $$\begin{bmatrix} X_1 \\ Y_1 \\ Z_1 \end{bmatrix} = T \begin{bmatrix} R_1 \\ G_1 \\ B_1 \end{bmatrix} \text{ and } \begin{bmatrix} X_2 \\ Y_2 \\ Z_2 \end{bmatrix} = T \begin{bmatrix} R_2 \\ G_2 \\ B_2 \end{bmatrix},$$

and x and y coordinates are calculated using $$x_1 = \frac{X_1}{X_1+Y_1+Z_1}, \text{ and } y_1 = \frac{Y_1}{X_1+Y_1+Z_1},$$

and ditto for $x_2$ $y_2$. The colors can now be deemed similar if $|x_2-x_1|<\phi_1$ and $|y_2-y_1|<\phi_2$ and $|tf\_inv(Y_2)-tfi\_inv(Y_1)|<\phi_3$.

In another embodiment, the threshold function f is additionally made dependent on the coding. One approach is to also make the threshold function dependent on the quantization parameter (QP) used for coding the transform coefficients of the intra and/or inter prediction error. The threshold can be larger when coarse quantization of transform coefficients is used and goes towards the visual perceptually threshold (threshold used in other embodiments) for very fine quantization. If relatively coarse quantization is used as part of the coding, the threshold can be more relaxed than if the quantization is very fine grained. This can be viewed as having the threshold function additively dependent on the quantization parameter as fnew=f+f(QP). f(QP) can be computed or looked up from a table. The values in the table can for example be constructed to relate the smallest change of a sample in the spatial domain for respective QP.

One key aspect of the embodiments is to see how much it is possible to change one of the color components, such as the green component, without affecting, for instance, the u' component too much. Above, this has been done by calculating the smallest and largest values for green as a function of the largest allowed difference in u', which we call au', see Equations 38 and 39, which are repeated here for the convenience of the reader:

$$\delta G_1 = \frac{4(X+t_{11}\delta R+t_{13}\delta B)-(u'-\Delta u')(D+K_1\delta R-K_3\delta B)}{(u'-\Delta u')K_2-4t_{12}} \quad (38)$$

$$\delta G_2 = \frac{4(X+t_{11}\delta R+t_{13}\delta B)-(u'-\Delta u')(D+K_1\delta R-K_3\delta B)}{(u'+\Delta u')K_2-4t_{12}} \quad (39)$$

The value $$G\min_{u'}=G+\min\{\delta G_1,\delta G_2\} \quad (39.1)$$

is now the smallest value of green that will make the u' coordinate in the allowed range, and $$G\max_{u'}=G+\max\{\delta G_1,\delta G_2\} \quad (39.2)$$

is the largest one.

However, it may be the case that the green channel does not influence u' very much at all. Assume that u' increases with increasing G, and that the maximum possible G=10000 will generate a u' that is still smaller than the allowed value. In other words, $u'_{G=10000}<u'-\Delta u'$. If this is the case Equation 39 may give an erroneous value. Therefore, before using Equation 39, it is preferred to make sure that the allowed range for u', namely [u'−Δu', u'−Δu'], does not exceed the range of u' that is obtained by setting G to 0 or 10000. If u' increases with increasing G, this range is [$u'_{G=0}$, $u'_{G=10000}$], and if u' decreases with increasing G, this range is instead [$u'_{G=10000}$, $u'_{G=0}$].

Therefore, an aspect of the embodiment is to check whether maximizing or minimizing the component of interest, the green component G in this case, gives values that are still inside the allowed range. If so, $G\max_{u'}$ can be set to 10000, or $G\min_{u'}$ can be set to 0, or both.

Another corner case happens when the color we want to change is completely red, green or blue, such as completely green, currentRGB=(0, g, 0). Here, currentRGB can be the output of a previous processing step, or the original image. In this case, a change in G does not influence u' at all. A color (0, g+dG, 0) is also purely green, and hence will have exactly the same u', v' coordinates as (0, g, 0). This can easily be seen by calculating first the XYZ and then the u'v' coordinates for (0, g+dG, 0):

$$\begin{bmatrix} X \\ Y \\ Z \end{bmatrix} = T \begin{bmatrix} 0 \\ g+dG \\ 0 \end{bmatrix} = T \begin{bmatrix} t_{11} & t_{12} & t_{13} \\ t_{21} & t_{22} & t_{23} \\ t_{31} & t_{32} & t_{33} \end{bmatrix} \begin{bmatrix} 0 \\ g+dG \\ 0 \end{bmatrix} = \begin{bmatrix} t_{12}(g+dG) \\ t_{22}(g+dG) \\ t_{32}(g+dG) \end{bmatrix} \quad (62)$$

It is now possible to calculate u' using the following formula:

$$u' = \frac{4X}{X+15Y+3Z} \quad (63)$$

And then get $$u' = \frac{4t_{12}(g+dG)}{t_{12}(g+dG)+15t_{22}(g+dG)+3t_{32}(g+dG)} = \frac{4t_{12}}{t_{12}+15t_{22}+3t_{32}} \quad (64)$$

As can be seen in the right hand side of Equation 64, u' does not depend at all on dG. Therefore, in this case, changing dG does not affect u' at all, unless for the case when dG=−g, in which case we get a black color (0, 0, 0), which has undefined chromaticity.

In these cases, $G\min_{u'}$ can be set to the smallest allowed value $G\min_{u'}=0$ and $G\max_{u'}$ to the largest allowed value $Gmax_{u'}=10000$. Alternatively, if the boundaries of green due to luminance have already been calculated, these boundaries can be copied: $Gmin_{u'}=Gmin_Y$ and $Gmax_{u'}=Gmax_Y$.

The same thing happens mutatis mutandis for the case of v'.

Another special case happens when the original color is zero: (0, 0, 0). In this case, the original chromaticity u', v' is undefined, so it is not possible to calculate when the chromaticity of the processed pixel will be out of bounds. The allowed values can again be set to the largest possible values $Gmin_{u'}=0$ and $Gmax_{u'}=10000$ or to the same boundaries as the luminance $Gmin_{u'}=Gmin_Y$ and $Gmax_{u'}=Gmax_Y$.

The full method of finding out the bounds for the green component can be found in the following C code:

```c
void calcGminGmax(float **GminImage, float **GmaxImage, float
** currentRGB, float **origRGB, float **origXYZ, float
**orig_upvpD, double limit_upvp, double limit_tfiY, int
numPixels)
{
    // currentRGB is the picture to be processed in linear RGB
    // origRGB is the original picture in linear RGB
    // origXYZ is the original picture in XYZ coordinates
    // orig_upvpD contains u', v' and D which is equal to D = X
    // + 15*Y + 3*Z; u' is negative to flag the case when R=G=B=0
    // limit_upvp is the allowed difference in u' and v'
    // limit_tfiY is the allowed difference in pq_inv(Y)
    // Now process each pixel in the frame
    for (int i = 0; i < numPixels; i++) {
        double dR = currentRGB[0][i] − origRGB[0][i];
        double dG = currentRGB[1][i] − origRGB[1][i];
        double dB = currentRGB[2][i] − origRGB[2][i];
        // imgYh is the linear luminance of the currentRGB if we
        // set G to that of the original.
        double imgYh = wR*(origRGB[0][i]+dR) + wG*origRGB[1][i] +
wB*(origRGB[2][i]+dB);
        // imgY is the desired luminance
        double imgY = origXYZ[1][i];
        double GmaxY = clip(origRGB[1][i] + (PQ(PQ_inv(imgY) +
limit_tfiY) − imgYh)/wG, 0.0, 10000.0);
        double GminY = clip(origRGB[1][i] + (PQ(PQ_inv(imgY) −
limit_tfiY) − imgYh)/wG, 0.0, 10000.0);
        double Gmin, Gmax, Gmin2, Gmax2, dG1, dG2, dG3, dG4;
        double GisMax_upvpY[3];
        double GisMin_upvpY[3];
        bool picking_maxG_maximizes_up, picking_maxG_maximizes_vp;
        double X = origXYZ[0][i];
        double Y = origXYZ[1][i];
        double Z = origXYZ[2][i];
        double up = orig_upvpD[0][i];
        double vp = orig_upvpD[1][i];
        double D = orig_upvpD[2][i];
        if( (orig_upvpD[0][i] < 0) || (currentRGB[0][i] == 0 &&
currentRGB[2][i] == 0)) {
            // This is the case when the original color is (0,0,0)
            // or the current processed color is (0, g, 0). This is
            // a special case when we cannot calculate a limit on G
            // from u' or v'. We use the luminance bounds
            Gmin2 = GminY;
            Gmax2 = GmaxY;
        } else {
            // We cannot influence u' and v' more than if we set
            // green to 0 or 10000. Hence if the allowed change in
            // u' or v' is more than this change, we cannot calculate
            // the allowed change in G from the allowed change in u'
            // or v'.
            convertToupvpY(GisMin_upvpY, currentRGB[0][i], 0.0,
currentRGB[2][i]);
            convertToupvpY(GisMax_upvpY, currentRGB[0][i], 10000.0,
currentRGB[2][i]);
            // It is possible that maximizing G minimizes up, or that
            // maximizing G maximizes up. This variable keeps track
            // of which way it is.
            picking_maxG_maximizes_up = GisMax_upvpY[0] >
GisMin_upvpY[0];
            picking_maxG_maximizes_vp = GisMax_upvpY[1] >
GisMin_upvpY[1];
            double GtoMax_up, GtoMin_up, GtoMax_vp, GtoMin_vp;
            double max_up, max_vp, min_up, min_vp;
            double Gminup, Gmaxup, Gminvp, Gmaxvp;
            if(picking_maxG_maximizes_up) {
                max_up = GisMax_upvpY[0];
                min_up = GisMin_upvpY[0];
                GtoMax_up = 10000.0;
                GtoMin_up = 0.0;
            } else {
```

```
                    max_up = GisMin_upvpY[0];
                    min_up = GisMax_upvpY[0];
                    GtoMax_up = 0.0;
                    GtoMin_up = 10000.0;
                }
                if(picking_maxG_maximizes_vp) {
                    max_vp = GisMax_upvpY[1];
                    min_vp = GisMin_upvpY[1] ;
                    GtoMax_vp = 10000.0;
                    GtoMin_vp = 0.0;
                } else {
                    max_vp = GisMin_upvpY[1];
                    min_vp = GisMax_upvpY[1];
                    GtoMax_vp = 0.0;
                    GtoMin_vp = 10000.0;
                }
                if(upvpD[0][i] - limit_upvp < min_up) {
                    dG1 = GtoMin_up - currentRGB[1][i];
                } else {
                    dG1 = (4*(X + t11*dR + t13*dB) - (up - limit_upvp)*(D
 + K1*dR + K3*dB)) / ((up - limit_upvp)*K2 - 4*t12);
                }
                if(upvpD[0][i] + limit_upvp > max_up) {
                    dG2 = GtoMax_up - currentRGB[1][i];
                } else {
                    dG2 = (4*(X + t11*dR + t13*dB) - (up + limit_upvp)*(D
 + K1*dR + K3*dB)) / ((up + limit_upvp)*K2 - 4*t12);
                }
                if(upvpD[1][i] - limit_upvp < min_vp) {
                    dG3 = GtoMin_vp - currentRGB[1][i];
                } else {
                    dG3 = (9*(Y + t21*dR + t23*dB) - (vp - limit_upvp)*(D
 + K1*dR + K3*dB)) / ((vp - limit_upvp)*K2 - 9*t22);
                }
                if(upvpD[1][i] + limit_upvp > max_vp) {
                    dG4 = GtoMax_vp - currentRGB[1][i];
                } else {
                    dG4 = (9*(Y + t21*dR + t23*dB) - (vp + limit_upvp)*(D
 + K1*dR + K3*dB)) / ((vp + limit_upvp)*K2 - 9*t22);
                }
                Gminup = max(0.0, origRGB[1][i]+min(dG1, dG2));
                Gmaxup = min(10000.0, origRGB[1][i]+max(dG1, dG2));
                Gminvp = max(0.0, origRGB[1][i]+min(dG3, dG4));
                Gmaxvp = min(10000.0, origRGB[1][i]+max(dG3, dG4));
                Gmin2 = max(Gminup, Gminvp);
                Gmax2 = min(Gmaxup, Gmaxvp);
                Gmin = max(Gmin2, GminY);
                Gmax = min(Gmax2, GmaxY);
                // Store result
                GminImage[0][i] = Gmin;
                GmaxImage[0][i] = Gmax;
            }
        }
    }
}
void convertToupvpY(double *outPixels, double red, double
green, double blue)
{
    double X, Y, Z;
    double t11 = m_transformRGBtoX[0];
    double t12 = m_transformRGBtoX[1];
    double t13 = m_transformRGBtoX[2];
    double t21 = m_transformRGBtoY[0];
    double t22 = m_transformRGBtoY[1];
    double t23 = m_transformRGBtoY[2];
    double t31 = m_transformRGBtoZ[0];
    double t32 = m_transformRGBtoZ[1];
    double t33 = m_transformRGBtoZ[2];
    // First convert to linear XYZ
    X = (t11*red + t12*green + t13*blue);
    Y = (t21*red + t22*green + t23*blue);
    Z = (t31*red + t32*green + t33*blue);
    double denominator = X + 15*Y + 3*Z;
    if(denominator != 0)
    {
        outPixels[0] = 4*X/denominator;
        outPixels[1] = 9*Y/denominator;
        outPixels[2] = Y;
    }
    else
```

```
    {
        outPixels[0] = -0.1978; // This is the chromaticity of gray
        outPixels[1] = -0.4683; // but negative to flag division
by zero.
        outPixels[2] = 0;
    }
}
```

FIGS. 28A to 28E illustrate possible corner cases in which maximizing or minimizing a color component of interest (G in this case) gives a value of a chromaticity component (u' in this case) that is still inside the allowed range for u', i.e., [u'−Δu', u'+Δu']. FIGS. 28G and 28H illustrate two non-corner cases, i.e., maximizing and minimizing G gives a u' value outside of the allowed range for u'. In these figures, u' as a function of G is monotonically increasing (FIGS. 28A, 28C, 28E and 28G) or monotonically decreasing (FIGS. 28B, 28D, 28F and 28H).

Figure 28A:
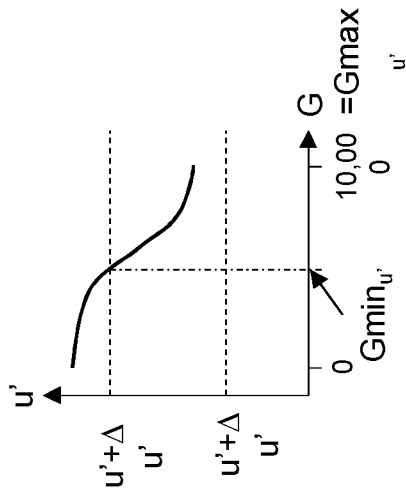
FIGS. 28A-28H are diagrams illustrating examples of dependencies of u' component on G component and determination of upper and lower limits.
Figure 28B:
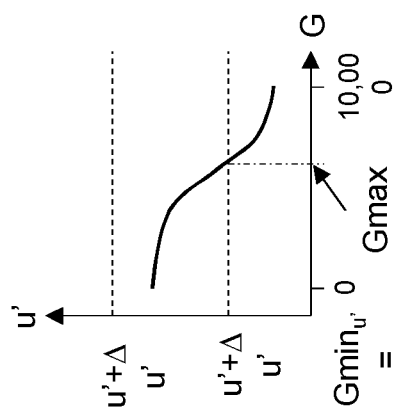

In the situation illustrated in FIG. 28A, $Gmin_{u'}$ should be set to the minimum value for the G component, i.e., 0, whereas $Gmax_{u'}$ should be calculated using equation 39. In FIG. 28B, $Gmax_{u'}$ should be set to the maximum value of the G component, i.e., 10,000, whereas $Gmin_{u'}$ should be calculated using equation 39.

Figure 28C:
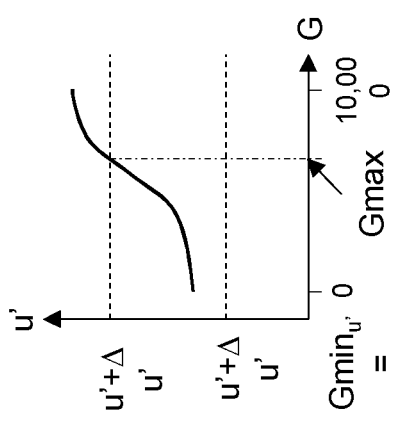
Figure 28D:
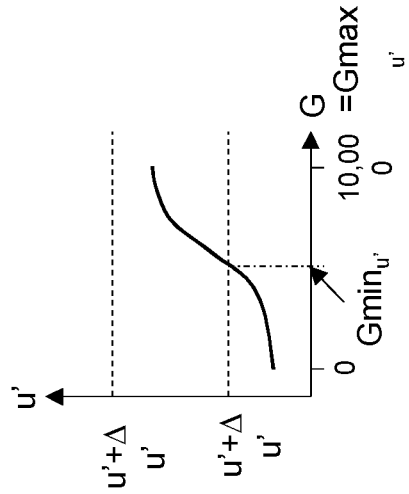

Correspondingly, in the situation illustrated in FIG. 28C, $Gmax_{u'}$ should be set to 10,000, whereas $Gmin_{u'}$ should be calculated using equation 38. In FIG. 28D, $Gmin_{u'}$ should be set to 0, whereas $Gmax_{u'}$ should be calculated using equation 38.

Figure 28E:
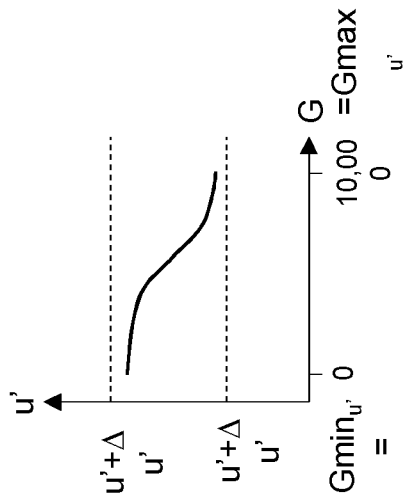
Figure 28G:
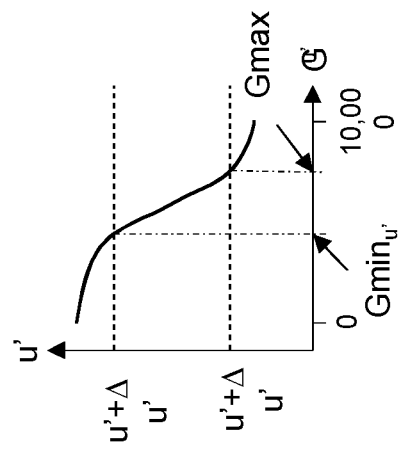
Figure 28F:
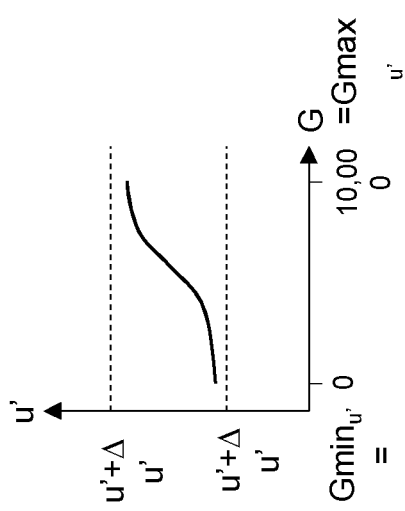
Figure 28H:
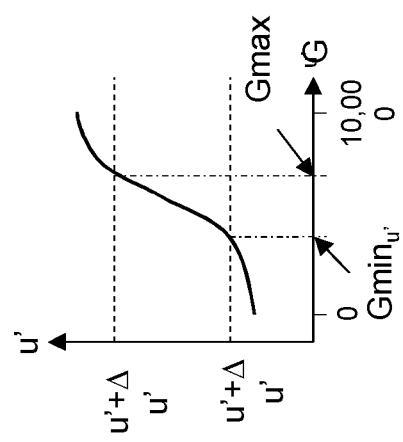

FIGS. 28E and 28F illustrate the two cases in which both $Gmin_{u'}$ and $Gmax_{u'}$ should be set to the fixed values of 0 and 10,000, respectively.

In the non-corner cases of FIGS. 28G and 28H $Gmin_{u'}$ and $Gmax_{u'}$ should be calculated as previously described herein using equations 38 and 39.

The above described and in FIGS. 28A-28H illustrated examples are correspondingly applicable to the cases of color components than green, i.e., red or blue, and/or for other chromaticity components than u', such as v'.

Figure 14:
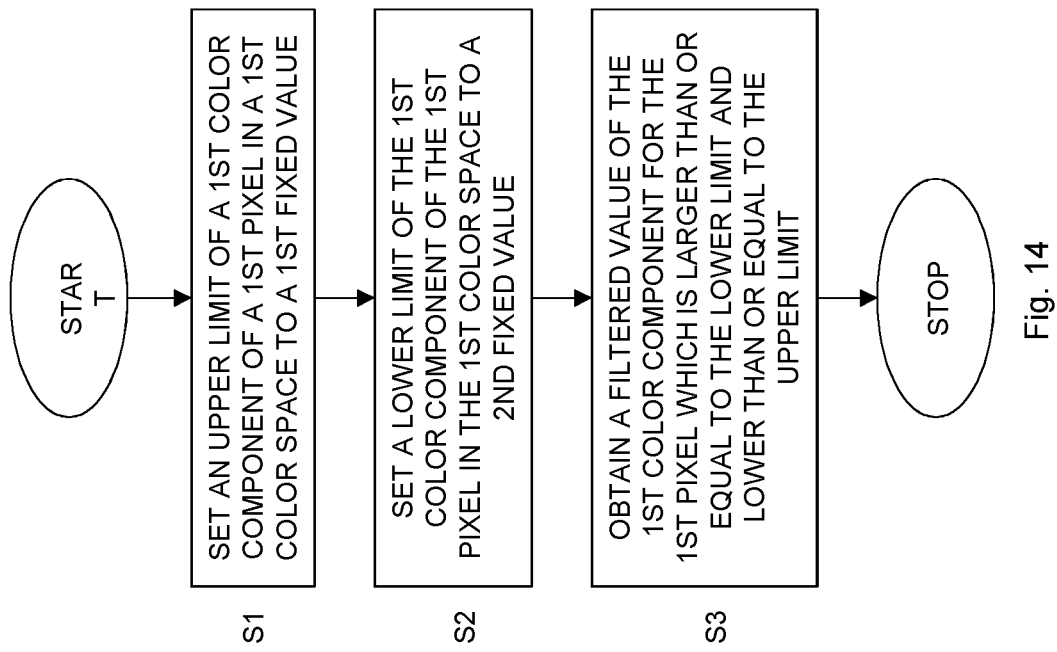
FIG. 14 is a flow chart illustrating a method for processing a first pixel according to an embodiment.

FIG. 14 is a flow chart illustrating a method of processing a first pixel in a picture. The first pixel has a color that is represented in a first color space. The method comprises setting, in step S1, an upper limit of a first color component of the first pixel in the first color space to a first fixed value if a maximum value of the first color component in the first color space results in a color component in a second color space that is below a first value of the color component in the second color space and above a second value of the color component in the second color space. The method also comprises setting, in step S2, a lower limit of the first color component in the first color space to a second fixed value if a minimum value of the first color component in the first color space results in the color component in the second color space being below the first value of the color component in the second color space and above the second value of the color component in the second color space.

Steps S1 and S2 can be performed serially in any order, i.e., step S1 followed by step S2 or step S2 followed by step S1. Alternatively, steps S1 and S2 can be performed at least partly in parallel.

A following step S3 comprises obtaining a filtered value of the first color component for the first pixel which is larger than or equal to the lower limit and lower than or equal to the upper limit.

Hence, the method for processing the first pixel described above and illustrated in FIG. 14 sets upper and/or lower limits of the first color component of the first pixel in the picture in the first color space to respective fixed values under certain conditions. The lower limit then represents the lowest value that the first color component can assume in the first color space and still achieve a color for the first pixel that is visually interpreted as the same as the original, unfiltered color of the first pixel. Correspondingly, the upper limit is the largest value that the first color component can assume in the first color space without any visual change in color for the first color. For instance, assume that the original, unfiltered color of the first pixel is represented as RGB and the first color component is a green component (G) in the RGB color space. Furthermore, assume that Gmin represents the lower limit of the first color component and Gmax represents the upper limit of the first color component. Then, any color $RG_{smooth}B$, wherein $Gmin \le G_{smooth} \le Gmax$, will appear undistinguishable to the original color RGB for the human visual system. This means that the modification of the first color component in step S3 can produce any filtered value $G_{smooth}$ for the first color component as long as this filtered value $G_{smooth}$ is equal to or larger than the lower limit Gmin but equal to or smaller than the upper limit Gmax.

A reason for replacing the value G of the first color component of the first pixel with the filtered value $G_{smooth}$ is that the filtered value might be more efficiently encoded and compressed as compared to the original value, i.e., requiring fewer bits to encode, and/or reduce any artifacts in the picture following encoding and decoding.

For instance, the modification involving replacing original values of color components of pixels in a picture with filtered values that are within respectively obtained lower and upper limits according to the embodiment may reduce invisible differences between colors of the pixels to improve the compression efficiency and/or reduce artifacts.

In an embodiment, the upper limit and/or the lower limit is set to a respective fixed value, i.e., the first fixed value and the second fixed value, respectively, under certain conditions. The condition, in which the upper limit is set to the first fixed value, corresponds to the corner case where the maximum value of the first color component in the first color space results in a color component in the second color space that is below the first value of the color component in the second space and above the second value of the color component in the second color space.

This situation is illustrated in FIGS. 28B, 28C, 28E and 28F for the case in which the maximum value of the first color component in the first color space is 10,000 for the green component in the RGB color space. Setting the green component to 10,000 for the first pixel, i.e., replacing the original color (R, G, B) of the first pixel with (R, 10000, B), and calculating the resulting u' component in the Yu'v' color space, as a representation of the color component in the second color space, give the value $u'_{G=10000}$, i.e., $u'_{G=10000}=f(R, 10000, B)$ see Equations 21.4-21.6. If this value $u'_{G=10000}$ is below $u'+\Delta u'$ as a representation of the first value of the color component in the second color space and above $u'-\Delta u'$ as a representation of the second value of the color component in the second color space, i.e., $u'-\Delta u' \leq u'_{G=10000} \leq u'+\Delta u'$, then the upper limit (Gmax$_{u'}$) of the green color component of the first pixel is set to 10,000.

If $u'_{G=10000} > u'+\Delta u'$ as shown in FIGS. 28A and 28G, the upper limit of the green component in the RGB color space is not set to any fixed value but is preferably calculated based on Equation 39, i.e., the upper limit Gmax$_{u'}$ is preferably based on G+δG$_2$.

Correspondingly, if $u'_{G=10000} < u'-\Delta u'$ as shown in FIGS. 28D and 28H, the upper limit of the green component in the RGB color space is not set to any fixed value but is preferably calculated based on Equation 38, i.e., the upper limit Gmax$_{u'}$ is preferably based on G+δG$_1$.

Correspondingly, the situation with regard to the lower limit is illustrated in FIGS. 28A, 28D, 28E and 28F in which the minimum value of the first color component in the first color space is 0 for the green component in the RGB color space. This means that by replacing the original value of the green component of the first pixel with 0, i.e., (R, 0, B), and calculating the resulting u' component in the Yu'v', see Equations 21.4-21.6, gives $u'_{G=0}$. If $u'-\Delta u' \leq u'_{G=0} \leq u'+\Delta u'$, then the lower limit (Gmin$_{u'}$) of the green color component of the first pixel is set to 0.

If $u'G=0 < u'-\Delta u'$ as shown in FIGS. 28C and 28G, the lower limit of the green component in the RGB color space is not set to any fixed value but is preferably calculated based on Equation 38, i.e., the lower limit Gmin$_{u'}$ is preferably based on G+δG$_1$.

Correspondingly, f $u'_{G=0} > u'+\Delta u'$ as shown in FIGS. 28B and 28H, the lower limit of the green component in the RGB color space is not set to any fixed value but is preferably calculated based on Equation 39, i.e., the lower limit Gmin$_{u'}$ is preferably based on G+δG$_2$.

In either case, the upper and lower limits as set or calculated according to above defines the limits for the filtered value (G$_{smooth}$) of the first color component in step S3, Gmin$_{u'}$ G$_{smooth}$ ≤Gmax$_{u'}$ in this illustrative example.

In an embodiment, the first value of the color component in the second color space is equal to a value of the color component in the second color space obtained based on the color of the first pixel in the first color space plus a delta value and the second value of the color component in the second color space is equal to the value of the color component in the second color space obtained based on the color of the first pixel in the first color space minus the delta value.

Hence, in this embodiment the first value is preferably equal to a value of the color component in the second color space obtained based on the color of the first pixel in the first color space, such as u' in the Yu'v' color space is obtained based on (R, G, B) as the color of the first pixel in the RGB color space, see Equations 21.4-21.6, plus a delta value, such as $\Delta u'$, i.e., preferably $u'+\Delta u'$ in this example.

Correspondingly, the second value is preferably equal to the value of the color component in the second color space obtained based on the color of the first pixel in the first color space minus a delta value, i.e., preferably $u'-\Delta u'$ in this example.

Generally, it is not possible to see a difference between two colors if the change in chromaticity as measured in the u'v' representation is smaller than a threshold value of 0.5/410. Thus, the u'v' components can be quantized to 8 or 9 bits without any visual degradation. Since the u'v' can vary between 0 and 0.62, quantizing to 8 bits is equivalent of multiplying by 255/0.62=410 and rounding. The maximum rounding error is therefore 0.5/410, and such a small difference in either u' or v' should thus not be possible to see. Correspondingly, as a general rule of thumb it is not possible to see any difference between two colors if the luminance Y difference of the two colors is smaller than half a quantization step after the inverse of the transfer function PQ EOTF (SMPTE ST 2084 [2]) has been employed. The range for the $tf^{-1}(Y)$ is between 0 and 1. If $tf^{-1}(Y)$ is quantized to 10 bits this would correspond to $0.5/((2^{10}-1)/1)=0.5/1023$. However, in some cases not the full 10 bit range is allowed but merely [64, 940]. This would correspond to calculating 0.5/(940−64)=0.5/876.

Hence, in an embodiment the delta value is preferably defined as $0.5/((2^A-1)/R)$, wherein A represents the number of bits used to represent in the color component in the second color space and R represents the range of the color component in the second color space or the range of the inverse of the transfer function of the color component in the second color space, i.e., R=max min where max represents the largest value of the color component in the second color space or the largest value of the inverse of the transfer function of the color component in the second color space, and min represents the smallest value of the color component in the second color space or the smallest value of the inverse of the transfer function of the color component in the second color space.

In an embodiment, step S1 of FIG. 14 comprises setting the upper limit of the first color component in the first color space to the maximum value of the first color component in the first color space if the maximum value of the first color component in the first color space results in the color component in the second color space being below the first value of the color component in the second color space and above the second value of the color component in the second color space. Correspondingly, step S2 comprises, in this embodiment, setting the lower limit of the first color component in the first color space to the minimum value of the first color component in the first color space if the minimum value of the first color component in the first color space results in the color component in the second color space being below the first value of the color component in the second color space and above the second value of the color component in the second color space.

Hence, in this embodiment, the first fixed value is the maximum value of the first color component in the first color space and the second fixed value is the minimum value of the first color component in the second color space. These maximum and minimum values are represented by 10,000 and 0 for the green color component in the RGB color space in FIGS. 28A-28H.

If the maximum value of the first color component in the first color space results in the color component in the second color space being above the first value of the color component in the second color space or below the second value of the color component in the second color space, then the method preferably comprises calculating the upper limit based on the color of the first pixel and one of the first value of the color component in the second color space and the second value of the color component in the second color space.

This situation corresponds to the one described above in connection with FIGS. 28A, 28D, 28G and 28H. This means that the upper limit is calculated based on the color of the first pixel, i.e., (R, G, B), and one of the first value and second value of the color component in the second color space, such as one of u'+Δu' and u'−Δu', see Equations 38 and 39.

Correspondingly, if the minimum value of the first color component in the first color space results in the color component in the second color space being above the first value of the color component in the second color space or below the second value of the color component in the second color space, then the method preferably comprises calculating the lower limit based on the color of the first pixel and one of the first value of the color component in the second color space and the second value of the color component in the second color space.

This situation corresponds to the one described above in connection with FIGS. 28B, 28C, 28G and 28H. This means that the lower limit is calculated based on the color of the first pixel, i.e., (R, G, B), and one of the first value and second value of the color component in the second color space, such as one of u'+Δu' and u'−Δu', see Equations 38 and 39.

In an embodiment, step S1 of FIG. 14 comprises setting the upper limit of the first color component in a RGB color space to the first fixed value if the maximum value of the first color component in the RGB color space results in a chromaticity component in a luminance and chromaticity color space that is below a first value of the chromaticity component in the luminance and chromaticity color space and above a second value of the chromaticity component in the luminance and chromaticity color space. Step S2 comprises, in this embodiment, setting the lower limit of the first color component in the RGB color space to the second fixed value if the minimum value of the first color component in the RGB color space results in the chromaticity component in the luminance and chromaticity color space being below the first value of the chromaticity component in the luminance and chromaticity color space and above the second value of the chromaticity component in the luminance and chromaticity color space.

In an embodiment, the luminance and chromaticity color space is the Yu'v' color space, in which Y denotes luminance and u'v' denote chromaticity values. In another embodiment, the luminance and chromaticity color space is the Yxy color space, in which Y denotes the luminance and xy denote the chromaticity values.

Thus, the color component in the second color space could be u', v' or Y in the Yu'v' color space or x, y or Y in the Yxy color space.

As previously described herein, it is actually possible to obtain multiple upper limits and multiple lower limits. For instance, a respective upper limit and a respective lower limit can be obtained for each chromaticity component in the Yu'v' or Yxy color space.

For instance, step S1 of FIG. 14 could comprise setting an upper u' limit of a green component in the RGB color space to a maximum value of the green component in the RGB color space if the maximum value of the green component in the RGB color space results in a u' component in a luminance and chromaticity (Yu'v') color space that is below a first value (u'+Δu') of the u' component in the Yu'v' color space and above a second value (u'−Δu') of the u' component in the Yu'v' color space and otherwise calculating the upper u' limit based on the color of the first pixel and one of the first value of the u' component in the Yu'v' color space and the second value of the u' component in the Yu'v' color space. Step S1 preferably also comprises setting an upper v' limit of the green component in the RGB color space to the maximum value of the green component in the RGB color space if the maximum value of the green component in the RGB color space results in a v' component in the Yu'v' color space that is below a first value (v'+Δv') of the v' component in the Yu'v' color space and above a second value (v'−Δv') of the v' component in the Yu'v' color space and otherwise calculating the upper v' limit based on the color of the first pixel and one of the first value of the v' component in the Yu'v' color space and the second value of the v' component in the Yu'v' color space.

In this embodiment, step S2 preferably comprises setting a lower u' limit of the green component in the RGB color space to a minimum value of the green component in the RGB color space if the minimum value of the green component in the RGB color space results in the u' component in the Yu'v' color space being below the first value of the u' component in the Yu'v' color space and above the second value of the u' component in the Yu'v' color space and otherwise calculating the lower u' limit based on the color of the first pixel and one of the first value of the u' component in the Yu'v' color space and the second value of the u' component in the Yu'v' color space. Step S2 preferably also comprises setting a lower v' limit of the green component in the RGB color space to the minimum value of the green component in the RGB color space if the minimum value of the green component in the RGB color space results in the v' component in the Yu'v' color space being below the first value of the v' component in the Yu'v' color space and above the second value of the v' component in the Yu'v' color space and otherwise calculating the lower v' limit based on the color of the first pixel and one of the first value of the v' component in the Yu'v' color space and the second value of the v' component in the Yu'v' color space.

In this embodiment, step S3 preferably comprises obtaining a filtered value of the green component for the first pixel which is larger than or equal to a largest lower limit of the lower u' limit and the lower v' limit and lower than or equal to a smallest of the upper u' limit and upper v' limit.

In the above described embodiment, the first color component of the first pixel in the first color space has been represented by the green color component in the RGB color space. In other embodiment, the first color component is instead the red color component or the blue color component in the RGB color space.

As described above, such as in connection with FIGS. 28A-28H, if the minimum or maximum value of the green component in the RGB color space results in a u' component outside of the interval [u'−Δu', u'+Δu'], the upper and/or lower value is not set to the fixed first or second value but is rather calculated according to Equations 38 or 39.

Correspondingly, if the minimum or maximum value of the green component in the RGB color space results in a v' component outside of the interval [v'−Δv', v'+Δv'], the upper and/or lower value is not set to the fixed first or second value but is rather calculated according to Equations 40 or 41.

This means that two upper limits $Gmax_{u'}$, $Gmax_{v'}$ are set or calculated in step S1 and two lower limits $Gmin_{u'}$, $Gmin_{v'}$ are set or calculated in step S2. The filtered value for the green component of the first pixel should then be larger than or equal to the largest of $Gmin_{u'}$, $Gmin_{v'}$, i.e., $\max(Gmin_{u'}, Gmin_{v'})$, and lower than or equal to the smallest of $Gmax_{u'}$, $Gmax_{v'}$, i.e., $\min(Gmax_{u'}, Gmax_{v'})$, as defined in Equations 42 and 43. In other words, the filtered value of the green component $G_{smooth}$ is $\max(Gmin_{u'}, Gmin_{v'}) \leq G_{smooth} \min(Gmax_{u'}, Gmax_{v'})$.

It is also possible to obtain three upper limits and three lower limits, i.e., one for each chromaticity component and one for the luminance component.

In such an embodiment, step S1 of FIG. 14 further comprises setting an setting an upper Y limit of the green component in the RGB color space to the maximum value of the green component in the RGB color space if the maximum value of the green component in the RGB color space results in a Y component in the Yu'v' color space for which $tf^{-1}(Y)$ is below a first value and otherwise calculating the upper Y limit based on the color of the first pixel, see Equation 58. Step S2 further comprises setting an setting a lower Y limit of the green component in the RGB color space to the minimum value of the green component in the RGB color space if the minimum value of the green component in the RGB color space results in a Y component in the Yu'v' color space for which $tf^{-1}(Y)$ is above a second value and otherwise calculating the lower Y limit based on the color of the first pixel, see Equation 59.

In a particular embodiment, setting the upper u' limit comprises setting the upper u' limit $Gmax_{u'}=10,000$ if $u'_{G=10000}<u'+\Delta u$ and $u'_{G=10000}>u'-\Delta u$ and otherwise calculating $Gmax_{u'}=G+max(\Delta G_1, \Delta G_2)$, wherein $u'_{G=10000}=4X_1/(X_1+15Y_1+3Z_1)$ and $$\begin{bmatrix} X_1 \\ Y_1 \\ Z_1 \end{bmatrix} = T \begin{bmatrix} R \\ 10.000 \\ B \end{bmatrix},$$

R denotes a red component of the first pixel in the RGB color space, B denotes a blue component of the first pixel in the RGB color space and T represents a color transformation from the RGB color space to a XYZ color space, $u'=4X_2/(X_2+15Y_2+3Z_2)$ and $$\begin{bmatrix} X_2 \\ Y_2 \\ Z_2 \end{bmatrix} = T \begin{bmatrix} R \\ G \\ B \end{bmatrix},$$

G denotes the green component of the first pixel in the RGB color space, $\Delta u'=0.31/(2^A-1)$, A denotes a number of bits of representing the u' component, $\Delta G_1=(4X_2 (u'-\Delta u')(X_2+15Y_2+3Z_2))/((u'-\Delta u')K_2-L_2)$, $K_2=[1\ 15\ 3]T$ $$\begin{bmatrix} 0 \\ 1 \\ 0 \end{bmatrix}$$

and $L_2=[0\ 9\ 0]T$ $$\begin{bmatrix} 0 \\ 1 \\ 0 \end{bmatrix}$$

and $\Delta G_2=(4X_2 (u'+\Delta u')(X_2+15Y_2+3Z_2))/((u'+\Delta u')K_2-L_2)$.

Setting the lower u' limit preferably comprises setting the lower u' limit $Gmin_{u'}=0$ if $u'_{G=0}<u'+\Delta u$ and $u'_{G=0}>u'-\Delta u$ and otherwise calculating $Gmin_{u'}=G+min(\Delta G_1, \Delta G_2)$, wherein $u'_{G=0}=4X_3/(X_3+15Y_3+3Z_3)$ and $$\begin{bmatrix} X_3 \\ Y_3 \\ Z_3 \end{bmatrix} = T \begin{bmatrix} R \\ 0 \\ B \end{bmatrix}.$$

In this particular embodiment, setting the upper v' limit comprises setting the upper v' limit $Gmax_{v'}=10,000$ if $v'_{G=10000}<v'+\Delta v$ and $v'_{G=10000}>v'-\Delta v$ and otherwise calculating $Gmax_{v'}=G+max(\Delta G_3, \Delta G_4)$, wherein $v'G=10,000=9Y_1/(X_1+15Y_1+3Z_1)$, $v'=9Y_2/(X_2+15Y_2+3Z_2)$, $v'=0.31/(2B 1)$, B denotes a number of bits of representing the v' component, $\Delta G_3=(9Y_2-(v'-\Delta v')(X_2+15Y_2+3Z_2))/((v'-\Delta v')K_2-L_2$ and $\Delta G_4=(9Y_2\ (v'+\Delta v')(X_2+15Y_2+3Z_2))/((v'+4V)K_2-L_2)$.

Setting the lower v' limit preferably comprises setting the lower v' limit $Gmin_{v'}=0$ if $v'_{G=0}<v'+4v$ and $v'_{G=0}>v'-\Delta v$ and otherwise calculating $Gmin_{v'}=G+min(\Delta G_3, \Delta G_4)$, wherein $v'_{G=0}=9Y_3/(X_3+15Y_3+3Z_3)$.

FIG. 15 is a flow chart illustrating an embodiment of step S3 in FIG. 14. The method continues from step S2 in FIG. 14. A next step S10 comprises calculating a filtered value of the first color component for the first pixel based on respective values of the first color component for the first pixel and neighboring pixels in the picture. The following step S11 comprises clamping the filtered value calculated in step S10 between the lower limit and the upper limit so that the filtered value is larger than or equal to the lower limit and lower than or equal to the upper limit.

Thus, in an embodiment, the filtered value of the first color component for the first pixel is calculated based on the value of this first color component for the first pixel and respective values of the first color component of neighboring pixels in the picture, preferably neighboring and adjacent pixels in the picture.

The relevant neighboring or adjacent pixels could be selected according to various embodiments. In a first embodiment, the neighboring pixels include the pixels directly above, below, to the right and to the left of the first pixel in the picture. This first embodiment thereby corresponds to a plus shaped filter aperture centered at the first pixel. In an embodiment, the filter aperture has a rectangular aperture or a quadratic aperture. For instance, a 3×3 or 5×5 filter aperture could be used centered at the first pixel. Such a filter aperture thereby encompasses neighboring pixels above to the left, above, above to the right, to the left, to the right, below to the left, below and below to the right of the first pixel in the first picture.

In an embodiment, step S10 comprises calculating the filtered value of the first color component for the first pixel as an average of respective values of the first color component for the pixel and neighboring pixels, preferably eight or 16 neighboring pixels of the first pixel in the picture in the case of a 3×$_3$ or 5×5 filter aperture.

Instead of average value, weighted averages could be used, in which case the weights could differ for at least two of the pixels encompassed by the filter aperture. For instance, a first weight could be used for the first pixel whereas a second, different weight is user for the neighboring pixels. Alternatively, a bilateral filter could be used to obtain the filtered value. A further alternative is to output the median value as the filtered value.

The clamping performed in step S11 thereby uses the clamping function clamp(x,a,b), which sets the value to a if x<a and to b if x>b and x otherwise. Thus, the clamping guarantees that the filtered value is within the lower and upper limits.

In an embodiment, the smoothing step, i.e., step S3 in FIG. 14 or S10 in FIG. 15, is performed as described above by letting the component be an average of its eight neighbors:

for all $x,y$: $G$smooth$(x,y)=(G(x-1,y-1)+G(x-1,y)+G(x-1,y+1)+G(x,y-1)+G(x,y)+G(x,y+1)+G(x+1,y-1)+G(x+1,y)+G(x+1,y+1))/9$;

In an alternative embodiment, different weights can be used on the different neighbors, such as for all $x,y$: $G$smooth$(x,y)=(w1*G(x-1,y-1)+w2*G(x-1,y)+w3*G(x-1,y+1)+w4*G(x,y-1)+w5*G(x,y)+w6*G(x,y+1)+w7*G(x+1,y-1)+w8*G(x+1,y)+w9*G(x+1,y+1))/9$;

For some combinations of these weights, it is possible to separate the filter into one horizontal and one vertical pass. This lowers the complexity, since every pixel only needs 3+3=6 operations instead of 9. As an example, if w1 . . . w9=1.0, it is possible to rewrite for all $x,y$: $G$smooth$(x,y)=(G(x-1,y-1)+G(x-1,y)+G(x-1,y+1)+G(x,y-1)+G(x,y)+G(x,y+1)+G(x+1,y-1)+G(x+1,y)+G(x+1,y+1))/9$;

as a first pass of for all $x,y$: $G$temp$(x,y)=(G(x,y-1)+G(x,y)+G(x,y+1))/3$;

followed by a second pass of for all $x,y$: $G$smooth$(x,y)=(G$temp$(x-1,y)+G$temp$(x,y)+G$temp$(x+1,y))/3$.

A person skilled in the art will recognize that this is just an application of the 3-tap filter [1, 1, 1]/3 in both vertical and horizontal direction.

As explained above, one iteration in the smoothing step consists of smoothing or filtering operations plus a clamping operation, see FIG. 15. In some applications it is of interest to lower the number of iterations in the smoothing step. Typically there is a trade-off that more iteration steps gives a better image quality, but takes time. As an example, performing smoothing+clamping ten times may give a better image quality than just performing it once.

In order to lower the number of iterations, it is possible to increase the filter size from 3 taps to more taps. In one embodiment, a 5-tap filter is used:

for all $x,y$: $G$temp$(x,y)=(G(x,y-2)+G(x,y-1)+G(x,y)+G(x,y+1)+G(x,y+2))/5$;

for all $x,y$: $G$smooth$(x,y)=(G$temp$(x-2,y)+G$temp$(x-1,y)+G$temp$(x,y)+G$temp$(x+1,y)+G$temp$(x+2,y))/5$.

Since this box filter can give rise to artifacts, when increasing the filter size it may be better to use filters that are more Gaussian-shaped. This can be done by convolving two box filters, such as conv([1 1 1]/3, [1 1 1]/3)=[1 2 3 2 1]/9, giving for all $x,y$: $G$temp$(x,y)=(G(x,y-2)+2*G(x,y-1)+3*G(x,y)+2*G(x,y+1)+G(x,y+2))/9$;

for all $x,y$: $G$smooth$(x,y)=(G$temp$(x-2,y)+2*G$temp$(x-1,y)+3*G$temp$(x,y)+2*G$temp$(x+1,y)+G$temp$(x+2,y))/9$.

Here conv convolves the two inputs, just like the Matlab function conv. Even longer filters are possible, such as convolving the above once again:
conv([1 2 3 2 1]/9, [1 2 3 2 1]/9)=[1 4 10 16 19 16 10 4 1]/81.

Typically, clamping of the smoothed value is done as shown below:

for all $x,y$: $G$temp$(x,y)=(G(x,y-1)+G(x,y)+G(x,y+1))/3$;

for all $x,y$: $G$smooth$(x,y)=(G$temp$(x-1,y)+G$temp$(x,y)+G$temp$(x+1,y))/3$.

for all $x,y$: $G$clamped$(x,y)=$clamp$(G$smooth$(x,y),G$min$,G$max$)$;

However, it is also possible to clamp the temporary image Gtemp:

for all $x,y$: $G$temp$(x,y)=(G(x,y-1)+G(x,y)+G(x,y+1))/3$;

for all $x,y$: $G$tempclamped$(x,y)=$clamp$(G$temp$(x,y),G$min$,G$max$)$;

for all $x,y$: $G$smooth$(x,y)=(G$tempclamped$(x-1,y)+G$tempclamped$(x,y)+G$tempclamped$(x+1,y))/3$.

for all $x,y$: $G$clamped$(x,y)=$clamp$(G$smooth$(x,y),G$min$,G$max$)$;

This may avoid artifacts by not affecting nearby areas as much. In other circumstances it may be advantageous to do the clamping last, after several iterations. Instead of doing for all $x,y$: $G$temp$(x,y)=(G(x,y-1)+G(x,y)+G(x,y+1))/3$;

for all $x,y$: $G$smooth$(x,y)=(G$temp$(x-1,y)+G$temp$(x,y)+G$temp$(x+1,y))/3$.

for all $x,y$: $G$clamped$(x,y)=$clamp$(G$smooth$(x,y),G$min$,G$max$)$;

for all $x,y$: $G$temp$(x,y)=(G$clamped$(x,y-1)+G$clamped$(x,y)+G$clamped$(x,y+1))/3$;

for all $x,y$: $G$smooth$(x,y)=(G$temp$(x-1,y)+G$temp$(x,y)+G$temp$(x+1,y))/3$.

for all $x,y$: $G$clamped$(x,y)=$clamp$(G$smooth$(x,y),G$min$,G$max$)$;

it is possible to do for all $x,y$: $G$temp$(x,y)=(G(x,y-1)+G(x,y)+G(x,y+1))/3$;

for all $x,y$: $G$smooth$(x,y)=(G$temp$(x-1,y)+G$temp$(x,y)+G$temp$(x+1,y))/3$.

for all $x,y$: $G$temp$(x,y)=(G$smooth$(x,y-1)+G$smooth$(x,y)+G$smooth$(x,y+1))/3$;

for all $x,y$: $G$smooth$(x,y)=(G$temp$(x-1,y)+G$temp$(x,y)+G$temp$(x+1,y))/3$.

for all $x,y$: $G$clamped$(x,y)=$clamp$(G$smooth$(x,y),G$min$,G$max$)$;

In the above case, two iterations are done before clamping, but it is of course possible to do three, four or any number of iterations before clamping.

In an embodiment, not only the first pixel but also the neighboring pixels in the picture are filtered to obtain a respective filtered value. In fact, the processing of the embodiments is advantageously applied to all pixels or at least a subset thereof in the picture. In such a case, respective upper and lower limits are obtained for each pixel to be processed and preferably for each color component to be filtered for each pixel to be processed.

Thus, it is generally preferred to perform the processing of the embodiments on not only a single pixel in a picture but rather on multiple, i.e., at least two, pixels or indeed all or at least a major portion of all pixels in the picture. In such a case, the filtered color component(s) of each such pixel replaces the original color component(s) of these pixels.

The calculation of filtered value and clamping in steps S10 and S11 could be performed once for the color component(s) to be filtered for the pixel or pixels that are to be processed according to the embodiments. In alternative embodiments, steps S10 and S11 are performed multiple times, which is schematically illustrated by the line L1 in FIG. 15.

Hence, in an embodiment the method comprises repeating calculating the respective filtered value in step S10 and clamping the respective filtered value in step S11 for each pixel of the first pixel and the neighboring pixel using a respective clamped filtered value of the first color component from iteration n−1 of calculating the respective filtered value and clamping the respective filtered value as input to calculating the respective filtered value for iteration n of calculating the respective filtered value and clamping the respective filtered value until N iterations have been reached.

Thus, the filtering of the color component(s) can be evermore refined by repeating steps S10 and S11 at least once. In the first iteration of steps S10 and S11, the filtered value calculated in step S10 is calculated based on, preferably as the average of, the original color component(s) of the first pixel and the neighboring pixels. In the second iteration of steps S10 and S11, the filtered value calculated in step S10 is calculated based on, preferably as the average of, the filtered and clamped color component(s) of the first pixel and the neighboring pixels as obtained after the first iteration. This process can be proceeded with a third or more iterations if desired.

However, although the color components that are used as a basis for calculating the filtered value in step S10 change for each iteration, the same lower and upper limits are preferably used for the pixel in each iteration. Hence, there is no need to recalculate the upper and lower limits for a given pixel at each iteration of steps S10 and S11. Thus, only a single set of upper and lower limits is needed for each color component for each pixel to be processed.

In the above illustrated embodiment, steps S10 and S11 are performed a fixed number of times, such as twice for each color component and each pixel to be processed. Instead of having a fixed, predefined number of iterations, the loop represented by line L1 could be repeated until the difference between a filtered and clamped value in iteration n differs from the filtered and clamped value in iteration n−1 or the original color component value for the first iteration with less than a predefined threshold value. Hence, the loop L1 is stopped once any changes in the filtered and clamped value fall below the predefined threshold value.

Instead of calculating the difference between the filtered and clamped values, the difference could be calculated between the inverse transfer function of the filtered and clamped values.

Figure 18:
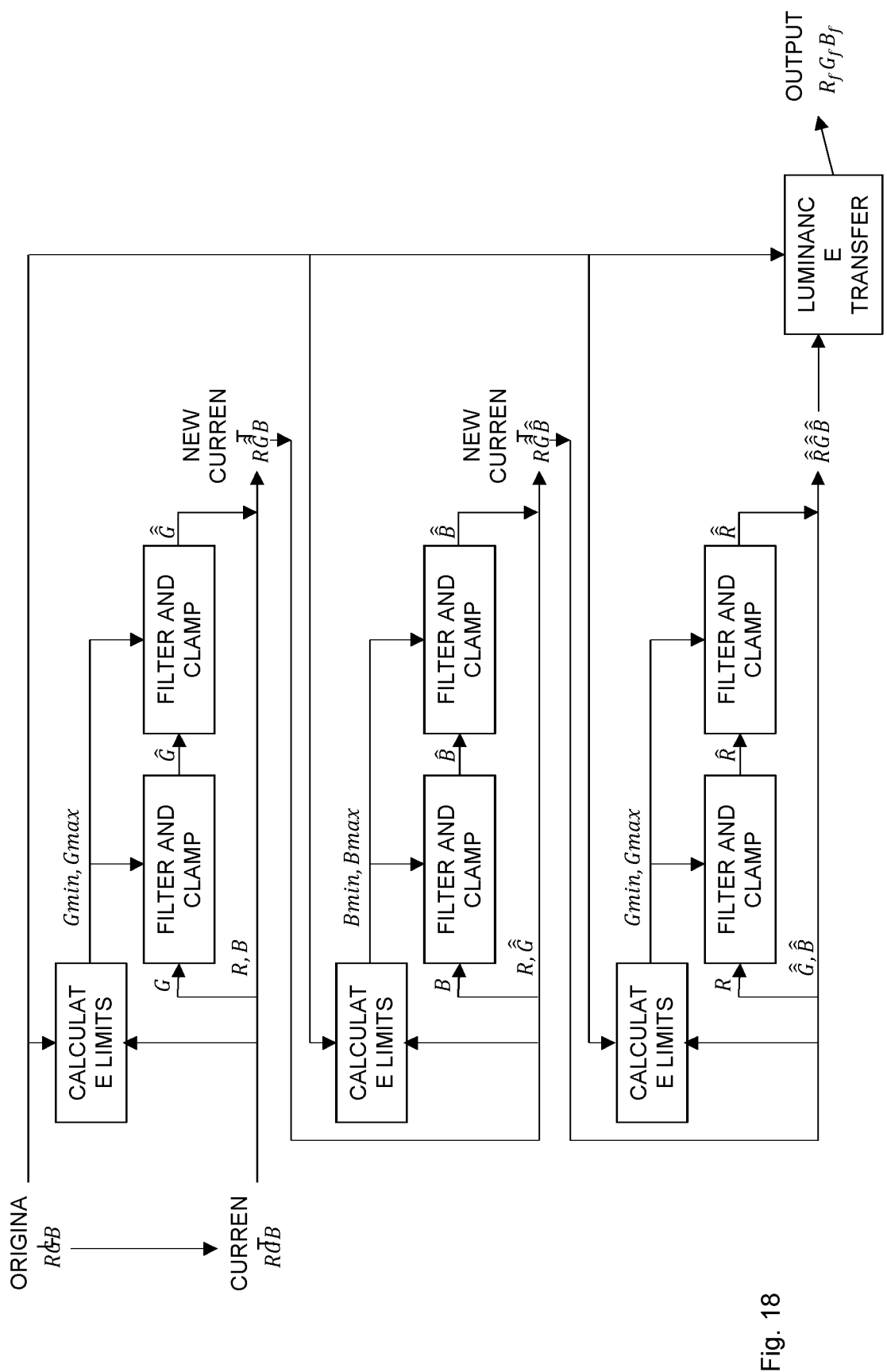
FIG. 18 is a schematic overview of a processing of a first pixel according to an embodiment.

FIG. 18 is a schematic overview of a processing of a first pixel according to an embodiment. In this embodiment, all color components of the first pixel are filtered starting with the green, followed by the red and blue components. Starting with the green component, for every pixel having an original color in the RGB color space of the picture, lower and upper limits (Gmin, Gmax) are obtained as disclosed herein.

The green component G of the first pixel is then filtered and clamped to produce a first filtered value $\hat{G}$ for the green component in the first iteration of steps S10 and S11. The filtering and clamping is then performed, in this embodiment, once more using the same lower and upper limits (Gmin, Gmax) as in the first iteration to output a second filtered value $\hat{\hat{G}}$. The new current color of the first pixel following filtering of the green component is R$\hat{\hat{G}}$B. This process is then repeated for the blue component as second color component. First, the lower and upper limits of the blue component (Bmin, Bmax) are obtained using the original RGB color of the first pixel and the new current color R$\hat{\hat{G}}$B. Hence, in this case $\delta R=0$ and $\delta G=\hat{\hat{G}}-G$. The blue component is then filtered and clamped first once to obtain $\hat{B}$ and then a second time to obtain $\hat{\hat{B}}$. The new current color of the first pixel is then at R$\hat{\hat{G}}\hat{\hat{B}}$. Finally, the process is repeated once more for the red component by first obtaining the lower and upper limits (Rmin, Rmax) based on the original color RGB of the first pixel and the new current color R$\hat{\hat{G}}\hat{\hat{B}}$ with $\delta B=\hat{\hat{B}}-B$ and $\delta G=\hat{\hat{G}}-G$. The red component is filtered and clamped twice as the other two color components to obtain $\hat{R}$ and then a second time to obtain $\hat{\hat{R}}$ and the final filtered color $\hat{\hat{R}}\hat{\hat{G}}\hat{\hat{B}}$ of the first pixel, also denoted smoothed value herein.

The order at which the color components are processed may differ from what is shown in FIG. 18, such as G, B and R; B, G and R; B, R and G; R, G and B; or R, B and G instead of G, B and R.

In an embodiment, the method additionally comprises calculating chroma or chromaticity component values for the first pixel based on a smoothed value of the color in the first color space equal to the color in the first color space but with a respective value of each color component in the color in the first color space replaced by a respective filtered value of the color component.

A luminance corrected color is then obtained based on the calculated chroma or chromaticity component values for the first pixel and a luminance component value obtained based on the color in the first color space.

In an embodiment, Cb' and Cr' chroma values are calculated based on the smoothed value of the color. In a particular embodiment, the Cb' and Cr' chroma values are calculated according to the below presented color transformation using the inverse of the transfer function of the smoothed value of the color $\hat{\hat{R}}\hat{\hat{G}}\hat{\hat{B}}$ as input. Note that it is only sufficient to calculate the Cb' and Cr' values from the color transformation and not necessarily also the luma value Y'.

$$\begin{bmatrix} Y' \\ Cb' \\ Cr' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} tf^{-1}(\hat{\hat{R}}) \\ tf^{-1}(\hat{\hat{G}}) \\ tf^{-1}(\hat{\hat{B}}) \end{bmatrix}$$

In this embodiment, the luminance corrected color for the first pixel is an Y'Cb'Cr' color in the luma and chroma color space. The luma component Y' for the first pixel is then preferably obtained according the luma adjustment disclosed in [4].

In another embodiment, chromaticity values xy in the Yxy color space are calculated from the smoothed color $\hat{R}\hat{G}\hat{B}$. In this embodiment, the original luminance $Y_O$ is preferably calculated from the original RGB color of the first pixel. The chromaticity values xy and the original luminance $Y_O$ are combined to calculate a final luminance corrected color $X_fY_fZ_f$ in the XYZ color space for the first pixel. A final luminance corrected color $R_fG_fB_f$ can then be calculated for the first pixel based on the calculated $X_fY_fZ_f$ color as indicated in FIG. 18.

In the above described calculations the following color transformations may be used:

$$\begin{bmatrix} X \\ Y \\ Z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} \hat{R} \\ \hat{G} \\ \hat{B} \end{bmatrix}$$

$$x = \frac{X}{X+Y+Z}$$

$$y = \frac{Y}{X+Y+Z}$$

$$Y_O = t_{21}R + t_{22}G + t_{23}G$$

$$X_f = \frac{xY_O}{y},\ Y_f = Y_O,\ Z_f = \frac{(1-x-y)Y_O}{y}$$

$$\begin{bmatrix} R_f \\ G_f \\ B_f \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} X_f \\ Y_f \\ Z_f \end{bmatrix}$$

$a_{11}$-$a_{33}$, $b_{11}$-$b_{33}$, $t_{11}$-$t_{33}$ are constants that depend on the type of color space used, such as BT.709 color space, BT.2020 color space, DCI-P3 color space or BT.601 color space.

For BT.709: $a_{11}$=0.212600, $a_{12}$=0.715200, $a_{13}$=0.072200, $a_{21}$=0.114572, $a_{22}$=−0.385428, $a_{23}$=0.500000, $a_{31}$=0.500000, $a_{32}$=−0.454153, $a_{33}$=−0.045847; for BT.2020: $a_{11}$=0.262700, $a_{12}$=0.678000, $a_{13}$=0.059300, $a_{21}$=−0.139630, $a_{22}$=−0.360370, $a_{23}$=0.500000, $a_{31}$=0.500000, $a_{32}$=−0.459786, $a_{33}$=−0.040214; for DCI-P3: $a_{11}$=0.2096, $a_{12}$=0.7215, $a_{13}$=0.0690, $a_{21}$=−0.1125, $a_{22}$=−0.3875, $a_{23}$=0.5000, $a_{31}$=0.5000, $a_{32}$=−0.4564, $a_{33}$=−0.0436; and for BT.601: $a_{11}$=0.299000, $a_{12}$=0.587000, $a_{13}$=0.114000, $a_{21}$=−0.168736, $a_{22}$=−0.331264, $a_{23}$=0.500000, $a_{31}$=0.500000, $a_{32}$=−0.418688, $a_{33}$=−0.081312.

For BT.709: $t_{11}$=0.412391, $t_{12}$=0.357584, $t_{13}$=0.180481, $t_{21}$=0.212639, $t_{22}$=0.715169, $t_{23}$=0.072192, $t_{31}$=0.019331, $t_{32}$=0.119195, $t_{33}$=0.950532; for BT.2020: $t_{11}$=0.636958, $t_{12}$=0.144617, $t_{13}$=0.168881, $t_{21}$=0.262700, $t_{22}$=0.677998, $t_{23}$=0.059302, $t_{31}$=0.000000, $t_{32}$=0.028073, $t_{33}$=1.060985; for DCI-P3: $t_{11}$=0.486571, $t_{12}$=0.265668, $t_{13}$=0.198217, $t_{21}$=0.228975, $t_{22}$=0.691739, $t_{23}$=0.079287, $t_{31}$=0.00000, $t_{32}$=0.045113, $t_{33}$=1.043944; and for BT. 601: $t_{11}$=0.430554, $t_{12}$=0.341550, $t_{13}$=0.178352, $t_{21}$=0.222004, $t_{22}$=0.706655, $t_{23}$=0.071341, $t_{31}$=0.020182, $t_{32}$=0.129553, $t_{33}$=0.939322.

The values of $b_{11}$-$b_{33}$ can be obtained from the values of $t_{11}$-$t_{33}$.

We can using Equations 58 and 59 below to calculate the bounds on, for instance, the green coordinate, given the luminance of the original, Y, the luminance of the pixel to be processed, $Y_h$, and the limit for change in $tf^{-1}(Y)$, which we call $\phi_2$. The equations are repeated here for the convenience of the reader:

$$Gmax_Y = G + \frac{tf(tf^{-1}(Y)+\phi_2) - Y_h}{w_G} \quad (58)$$

$$Gmin_Y = G + \frac{tf(tf^{-1}(Y)-\phi_2) - Y_h}{w_G}. \quad (59)$$

It is noted that since this involves a forward and backward transfer function calculation for every bound, this can be quite costly. If two bounds per color component are used, this means 2*2*3=12 transfer function calculations per pixel. This can be substantially reduced by implementing the transfer function tf( ) as one or several look-up tables (LUTs). However, it is possible to simplify this even further. Notice that if $\phi_2$ is fixed, $tf(tf^{-1}(Y)+\phi_2)$ is just a function of Y, $p(Y)=tf(tf^{-1}(Y)+\phi_2)$. This can be used as a look-up table instead. Note that to get sufficient accuracy in the LUT approximation of tf(.), it is often the case that several LUTs are used, one for the range [1000, 10000], another one for [100, 1000], yet another one for [10, 100], etc. These LUTs are often selected using if-statements that can slow down the execution considerably.

As it turns out, a good approximation for $tf(tf^{-1}(Y)+\phi_2)$ is $Y+\phi_2$. Therefore, in one embodiment, $tf(tf^{-1}(Y)+\phi_2)$ is replaced with $Y+\phi_2$, considerably lowering the complexity.

However, this typically brings large errors for large Y. Therefore, another possibility is to use the approximation $Y+\phi_2$ plus a correction term, which is tabulated $tf(tf^{-1}(Y)+\phi_2) \approx Y+\phi_2+\text{corrLUT}(\text{round}(Y))$.

This works well for values that do not clip, i.e., for values where $tf^{-1}(Y)+Y+\phi_2<1$. Above this value, we know that $tf(tf^{-1}(Y)+\phi_2)=10000$, so we can use that value instead. The LUT can be created using the following Matlab code:

```
limit_tfiY = 1.0*(1/876); %% This is the φ2 above
Yupper = pq_eotf(1−limit_tfiY);
for Y = 0:10000
    D2 = (pq_eotf(pq_eotf_inv(Y) + limit_tfiY));
    if Y < Yupper
        D2approx = (clampmatrix(0, Y + limit_tfiY, 10000));
        D2correction(Y+1) = D2 − D2approx;
    else
        D2approx = 10000;
        %% Not needed, but for rounding we need it for the values
        under Yupper
        D2correction(Y+1) = D2correction(Y);
    end;
end;
```

We can now approximate $tf(tf^{-1}(Y)+\phi_2)-Y_h$ with Dapprox using the following Matlab code:

```
if Y < Yupper
    D2approx = (Y + limit_tfiY) + D2correction(round(Y)+1);
else
    D2approx = 10000;
end;
Dapprox = D2approx − Yh;
```

It should be noted that values close to the upper limit are typically quite rare, so it is possible to simply skip the if statement above and just use D2approx=(Y+limit_tfiY)+D2correction(round(Y)+1) for all pixels. This can make the code considerably faster, since if statements typically can hold up processing.

If D2correction above is plotted, it becomes apparent that there is still quite a big linear component in D2correction.

This can be removed by a linear component k*Y+m. The creation of the LUT then becomes:

```
limit_tfiY = 1.0*(1/876);
Yupper = pq_eotf(1-limit_tfiY);
correctionAtYzero = (pq_eotf(pq_eotf_inv(0) + limit_tfiY)) -
clampmatrix(0, 0 + limit_tfiY, 10000);
correctionAtYupper = (pq_eotf(pq_eotf_inv(Yupper) + limit_tfiY)) -
clampmatrix(0, Yupper + limit_tfiY, 10000);
k = ((correctionAtYupper - correctionAtYzero)/Yupper);
m = correctionAtYzero;
for q = 0:10000
    Y = q;
    D2 = (pq_eotf(pq_eotf_inv(Y) + limit_tfiY));
    if Y < Yupper
        D2approx = (clampmatrix(0, Y + limit_tfiY + Y*k + m,
            10000));
        D2correction(q+1) = D2 - D2approx;
    else
        D2approx = 10000;
        %% Not needed, but for rounding we need it
        D2correction(q+1) = D2correction(q);
    end;
end;
```

Here a linear term has been added to the analytic approximation. The correction LUT now varies between −1.4 and 0.2 instead of between 0 and 150, which makes it easier to store using fewer bits if using fixed point representation. To approximate $tf(tf^{-1}(Y)+\phi_2)-Y_h$ the following Matlab code is used:

```
    if Y < Yupper
        D2approx = (Y + limit_tfiY + Y*k + m) +
            D2correction(round(Y)+1);
    else
        D2approx = 10000;
    end;
    Dapprox = D2approx - Yh;
```

It should be apparent that instead of using (Y+limit_tfiY+Y*k+m) it is possible to use (limit_ffiY+Y*k2+m), where k2=(1+k).

Above a LUT has been used without interpolation for the correction term. It is also possible to use linear interpolation and get a more accurate value with fewer table entries.

Another alternative to using a LUT for the correction term is to use a LUT for the entire approximation of $tf(tf^{-1}(Y)+\phi_2)-Y_h$. In this case it may be possible to use a LUT with or without interpolation.

In another embodiment, instead of averaging between pixels in the same image, averaging is done between pixels in different images. As an example, the true luminance can be used to make a good motion compensation between two frames. Then they are averaged followed by a clamp to make sure that the pixels never venture outside the similarity measure. This way it is possible to further increase consistency between frames, making prediction simpler.

Figure 17:
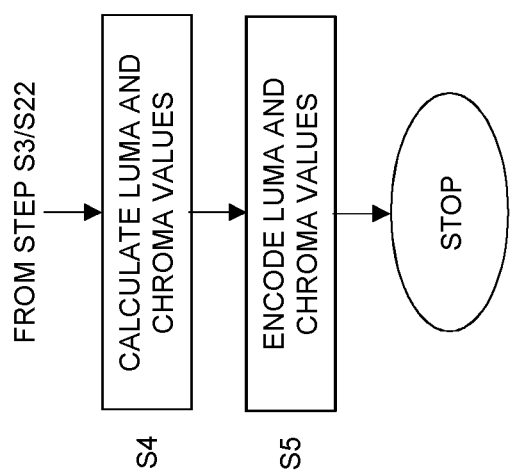
FIG. 17 is a flow chart illustrating a method for encoding a first pixel according to an embodiment.

Another aspect of the embodiments relates to a method for encoding a first pixel having a color in a first color space in a picture. The method comprises processing the first pixel according to any of the embodiments to obtain a filtered value of a first color component of the color in the first color space. The method also comprises, see FIG. 17, calculating, in step S4, a luma component value and chroma component values for the pixel based on a smoothed value of the color in the first color space comprising a value of the first color component in the color in the first color space replaced by the filtered value of the first color component. The method also comprises encoding, in step S5, the luma component value and subsampled chroma component values.

Thus, the smoothed value of the color, such as represented as $R_fG_fB_f$ in the foregoing, is used to calculate a luma Y' value and chroma Cb', Cr' values for the first pixel, such as according to $$\begin{bmatrix} Y' \\ Cb' \\ Cr' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} tf^{-1}(\hat{\hat{R}}) \\ tf^{-1}(\hat{\hat{G}}) \\ tf^{-1}(\hat{\hat{B}}) \end{bmatrix}.$$

The chroma values are preferably subsampled into 4:2:0 or 4:2:2 format. The resulting luma and subsampled chroma values are then input to a video encoder to be encoded. The output of the video encoder is a bitstream representing encoded pictures, preferably of a video sequence.

Thus, the processing of pixels can be used as an additional processing during encoding pixels of pictures, such as in connection with encoding pictures of a video sequence.

The output of the processing, i.e., the smoothed value of the color, is then converted to a Y'Cb'Cr' in the 4:2:0 or 4:2:2 format. The subsampled Y'Cb'Cr' value is then input to a video encoder, such as a H.264 video encoder, a HEVC or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g. a context-adaptive binary arithmetic coding (CABAC) encoder.

Advantageously, by processing a picture or image, according to the present invention, prior to encoding or compression, it is possible to change the picture in a way that is invisible for the human eye but gives considerable differences in its Y'Cb'Cr' representation, making the Y'Cb'Cr' representation smoother as well as more consistent across frames or pictures. This will have a great impact on encoding or compression efficiency.

An aspect of the embodiments defines a method for processing a first pixel in a picture, see FIG. 16. The first pixel having a color that is represented in a first color space. The method comprises obtaining, in step S20, a lower limit to a first color component of the first pixel in the first color space, based on a distance between the color and a distorted version of the color in a second color space. The distorted version of the color is equal to the color in the first color space except in the first color component. The method also comprises obtaining, in step S21, an upper limit to the first color component of the first pixel in the first color space, based on a distance between the color and a distorted version of the color in the second color space. The distorted version of the color is equal to the color in the first color space except in the first color component. The method further comprises obtaining, in step S22, a filtered value of the first color component for the pixel which is larger than or equal to the obtained lower limit and lower than or equal to the obtained upper limit.

A further aspect of the embodiments relates to a device for processing a first pixel in a picture. The first pixel has a color that is represented in a first color space. The device is configured to set an upper limit of a first color component of the first pixel in the first color space to a first fixed value if a maximum value of the first color component in the first color space results in a color component in a second color space that is below a first value of the color component in the second color space and above a second value of the color component in the second color space. The device is also configured to set a lower limit of the first color component in the first color space to a second fixed value if a minimum value of the first color component in the first color space results in the color component in the second color space being below the first value of the color component in the second color space and above the second value of the color component in the second color space. The device is further configured to obtain a filtered value of the first color component for the first pixel which is larger than or equal to the lower limit and lower than or equal to the upper limit.

In an embodiment, the device is configured to set the upper limit of the first color component in the first color space to the maximum value of the first color component in the first color space if the maximum value of the first color component in the first color space results in the color component in the second color space being below the first value of the color component in the second color space and above the second value of the color component in the second color space. The device is also configured to set the lower limit of the first color component in the first color space to the minimum value of the first color component in the first color space if the minimum value of the first color component in the first color space results in the color component in the second color space being below the first value of the color component in the second color space and above the second value of the color component in the second color space.

In an embodiment, the device is configured to calculate, if the maximum value of the first color component in the first color space results in the color component in the second color space being above the first value of the color component in the second color space or below the second value of the color component in the second color space, the upper limit based on the color of the first pixel and one of the first value of the color component in the second color space and the second value of the color component in the second color space. The device is also configured to calculate, if the minimum value of the first color component in the first color space results in the color component in the second color space being above the first value of the color component in the second color space or below the second value of the color component in the second color space, the lower limit based on the color of the first pixel and one of the first value of the color component in the second color space and the second value of the color component in the second color space.

In an embodiment, the device is configured to set the upper limit of the first color component in a red, green, blue (RGB) color space to the first fixed value if the maximum value of the first color component in the RGB color space results in a chromaticity component in a luminance and chromaticity color space that is below a first value of the chromaticity component in the luminance and chromaticity color space and above a second value of the chromaticity component in the luminance and chromaticity color space. The device is also configured to set the lower limit of the first color component in the RGB color space to the second fixed value if the minimum value of the first color component in the RGB color space results in the chromaticity component in the luminance and chromaticity color space being below the first value of the chromaticity component in the luminance and chromaticity color space and above the second value of the chromaticity component in the luminance and chromaticity color space.

In an embodiment, the device is configured to set an upper u' limit of a green component in the RGB color space to a maximum value of the green component in the RGB color space if the maximum value of the green component in the RGB color space results in a u' component in a luminance and chromaticity (Yu'v') color space that is below a first value of the u' component in the Yu'v' color space and above a second value of the u' component in the Yu'v' color space and otherwise calculate the upper u' limit based on the color of the first pixel and one of the first value of the u' component in the Yu'v' color space and the second value of the u' component in the Yu'v' color space. The device is also configured to set a lower u' limit of the green component in the RGB color space to a minimum value of the green component in the RGB color space if the minimum value of the green component in the RGB color space results in the u' component in the Yu'v' color space being below the first value of the u' component in the Yu'v' color space and above the second value of the u' component in the Yu'v' color space and otherwise calculate the lower u' limit based on the color of the first pixel and one of the first value of the u' component in the Yu'v' color space and the second value of the u' component in the Yu'v' color space. The device is further configured to set an upper v' limit of the green component in the RGB color space to the maximum value of the green component in the RGB color space if the maximum value of the green component in the RGB color space results in a v' component in the Yu'v' color space that is below a first value of the v' component in the Yu'v' color space and above a second value of the v' component in the Yu'v' color space and otherwise calculate the upper v' limit based on the color of the first pixel and one of the first value of the v' component in the Yu'v' color space and the second value of the v' component in the Yu'v' color space. The device is additionally configured to set a lower v' limit of the green component in the RGB color space to the minimum value of the green component in the RGB color space if the minimum value of the green component in the RGB color space results in the v' component in the Yu'v' color space being below the first value of the v' component in the Yu'v' color space and above the second value of the v' component in the Yu'v' color space and otherwise calculate the lower v' limit based on the color of the first pixel and one of the first value of the v' component in the Yu'v' color space and the second value of the v' component in the Yu'v' color space. The device is also configured to obtain a filtered value of the green component for the first pixel which is larger than or equal to a largest lower limit of the lower u' limit and the lower v' limit and lower than or equal to a smallest of the upper u' limit and upper v' limit.

In a particular embodiment, the device is configured to set the upper u' limit $Gmax_{u'}=10.000$ if $u'G=10.000<u'+\Delta u$ and $u'G=10.000>u'-\Delta u$ and otherwise calculate $Gmax_{u'}=G+max(\Delta G_1, \Delta G_2)$. The device is also configured to set the lower u' limit $Gmin_{u'}=0$ if $u'_{G=0}<u'+\Delta u$ and $u'_{G=0}>u'-\Delta u$ and otherwise calculate $Gmin_{u'}=G+min(\Delta G_1, \Delta G_2)$. The device is further configured to set the upper v' limit $Gmax_{v'}=10.000$ if $v'G=10.000<v'+\Delta v$ and $v'G=10.000>v'-\Delta v$ and otherwise calculate $Gmax_{v'}=G+max(\Delta G_3, \Delta G_4)$. In this particular embodiment, the device is also configured to set the lower v' limit $Gmin_{v'}=0$ if $v'_{G=0}<v'+\Delta v$ and $v'_{G=0}>v'-\Delta v$ and otherwise calculate $Gmin_{v'}=G+min(\Delta G_3, \Delta G_4)$.

In an embodiment, the device is configured to calculate a filtered value of the first color component for the first pixel based on respective values of the first color component for the first pixel and neighboring pixels in the picture. The device is also configured to clamp the filtered value between the obtained lower limit and the obtained upper limit so that the filtered value is larger than or equal to the obtained lower limit and lower than or equal to the obtained upper limit.

In an embodiment, the device is configured to calculate the filtered value of the first color component for the first pixel as an average of respective values of the first color component for the pixel and the neighboring pixels of the first pixel in the picture.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 19:
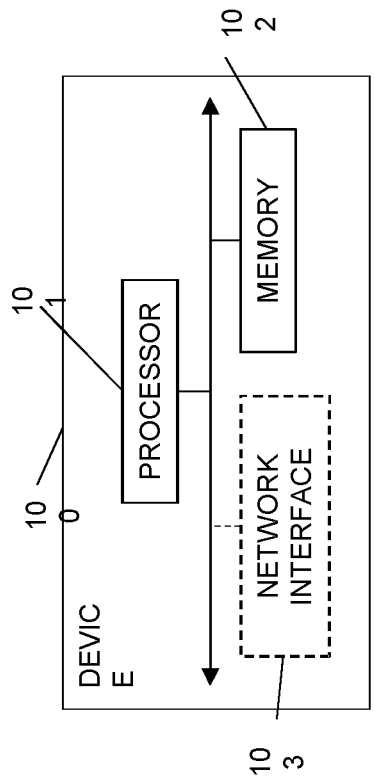
FIG. 19 is a schematic block diagram of a device for filtering according to an embodiment.

FIG. 19 is a schematic block diagram illustrating an example of a device 100 for processing a first pixel in a picture based on a processor-memory implementation according to an embodiment. In this particular example, the device 100 comprises a processor 101, such as processing circuitry, and a memory 102. The memory 102 comprises instructions executable by the processor 101.

In an embodiment, the processor 101 is operative to set the upper limit and the lower limit of the first color component and obtain the filtered value of the first color component.

In another embodiment, FIG. 19 shows a device 100 for encoding a first pixel having a color in a first color space in a picture. The device 100 comprises a processor 101 and a memory 102 comprising instructions executable by the processor 101. The processor 101 is operative to set an upper limit of a first color component of the first pixel in the first color space to a first fixed value if a maximum value of the first color component in the first color space results in a color component in a second color space that is below a first value of the color component in the second color space and above a second value of the color component in the second color space. The processor 101 is also operative to set a lower limit of the first color component in the first color space to a second fixed value if a minimum value of the first color component in the first color space results in the color component in the second color space being below the first value of the color component in the second color space and above the second value of the color component in the second color space. The processor 101 is further operative to obtain a filtered value of the first color component for the first pixel which is larger than or equal to the lower limit and lower than or equal to the upper limit. The processor 101 is additionally operative to calculate a luma component value and chroma component values for the first pixel based on a smoothed value of the color in the first color space comprising a value of the first color component in the color in the first color space replaced by the filtered value of the first color component. The processor 101 is also operative to encode the luma component value and subsampled chroma component values.

Optionally, the device 100 may also include a communication circuit, represented by a network interface 103 in FIG. 19. The network interface 103 may include functions for wired and/or wireless communication with other devices and/or network nodes in a wired or wireless communication network. In a particular example, the network interface 103 may be based on radio circuitry for communication with one or more other network devices or user equipment, including transmitting and/or receiving information. The network interface 103 may be interconnected to the processor 101 and/or memory 102. By way of example, the network interface 103 may include any of the following: a receiver, a transmitter, a transceiver, input/output (I/O) circuitry, input port(s) and/or output port(s).

Figure 20:
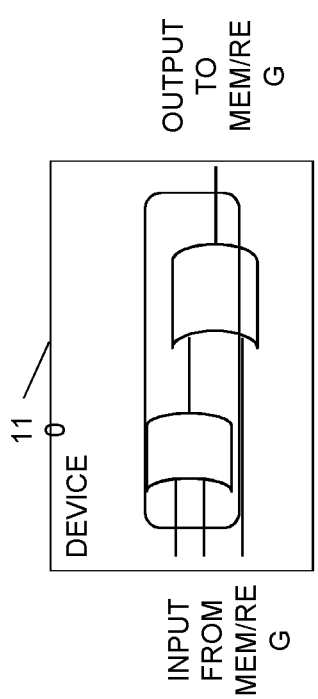
FIG. 20 is a schematic block diagram of a device for processing according to another embodiment.

FIG. 20 is a schematic block diagram illustrating another example of a device 110 for processing a first pixel in a picture based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 21:
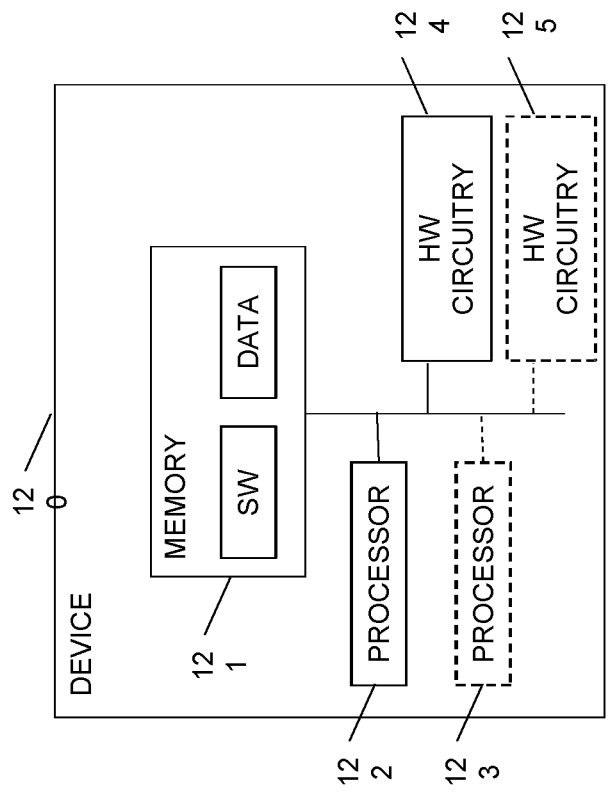
FIG. 21 is a schematic block diagram of a device for processing according to a further embodiment.

FIG. 21 is a schematic block diagram illustrating yet another example of a device 120 for processing a first pixel in a picture based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more preconfigured or possibly reconfigurable hardware circuits 124, 125. The actual hardware-software partitioning can be decided by a system designer based on a number of factors including processing speed, cost of implementation and other requirements.

Figure 22:
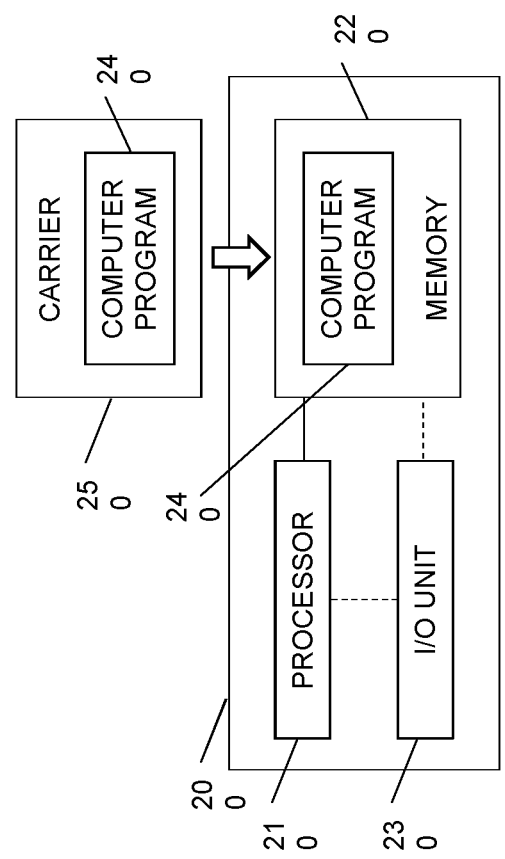
FIG. 22 is a schematic block diagram of a computer program based implementation of an embodiment.

FIG. 22 is a schematic diagram illustrating an example of a device 200 for processing a first pixel in a picture according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as a video sequence to be encoded, a bitstream of encoded pictures, and/or reconstructed or decoded pictures of a video sequence.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to set, for a first pixel in a picture having a color that is represented in a first color space, an upper limit of a first color component of the first pixel in the first color space to a first fixed value if a maximum value of the first color component in the first color space results in a color component in a second color space that is below a first value of the color component in the second color space and above a second value of the color component in the second color space. The at least one processor 210 is also caused to set a lower limit of the first color component in the first color space to a second fixed value if a minimum value of the first color component in the first color space results in the color component in the second color space being below the first value of the color component in the second color space and above the second value of the color component in the second color space. The at least one processor 210 is further caused to obtain a filtered value of the first color component for the first pixel which is larger than or equal to the lower limit and lower than or equal to the upper limit.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a device 200 for execution by the processing circuitry 210 thereof.

The flow diagram or diagrams presented herein may be regarded as a computer flow diagram or diagrams, when performed by one or more processors. A corresponding device for processing a first pixel in a picture may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 23:
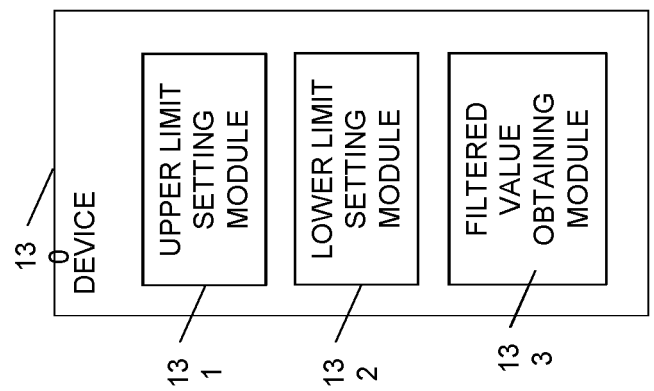
FIG. 23 is a schematic block diagram of a device for processing according to yet another embodiment.

FIG. 23 is a schematic block diagram of a device 130 for processing a first pixel in a picture according to yet another embodiment. The first pixel having a color that is represented in a first color space. The device 130 comprises an upper limit setting module 131 for setting an upper limit of a first color component of the first pixel in the first color space to a first fixed value if a maximum value of the first color component in the first color space results in a color component in a second color space that is below a first value of the color component in the second color space and above a second value of the color component in the second color space. The device 130 also comprises a lower limit setting module 132 for setting a lower limit of the first color component in the first color space to a second fixed value if a minimum value of the first color component in the first color space results in the color component in the second color space being below the first value of the color component in the second color space and above the second value of the color component in the second color space. The device 130 further comprises a filtered value obtaining module 133 for obtaining a filtered value of the first color component for the first pixel which is larger than or equal to the lower limit and lower than or equal to the upper limit.

Figure 24:
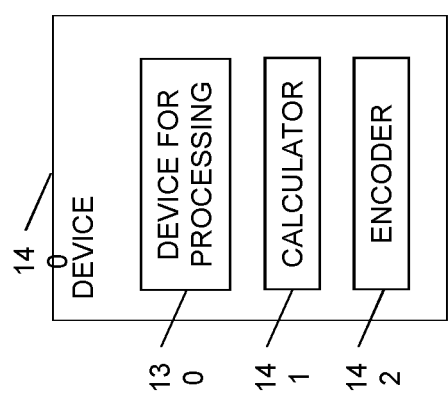
FIG. 24 is a schematic block diagram of a device for encoding according to an embodiment.
Figure 27:
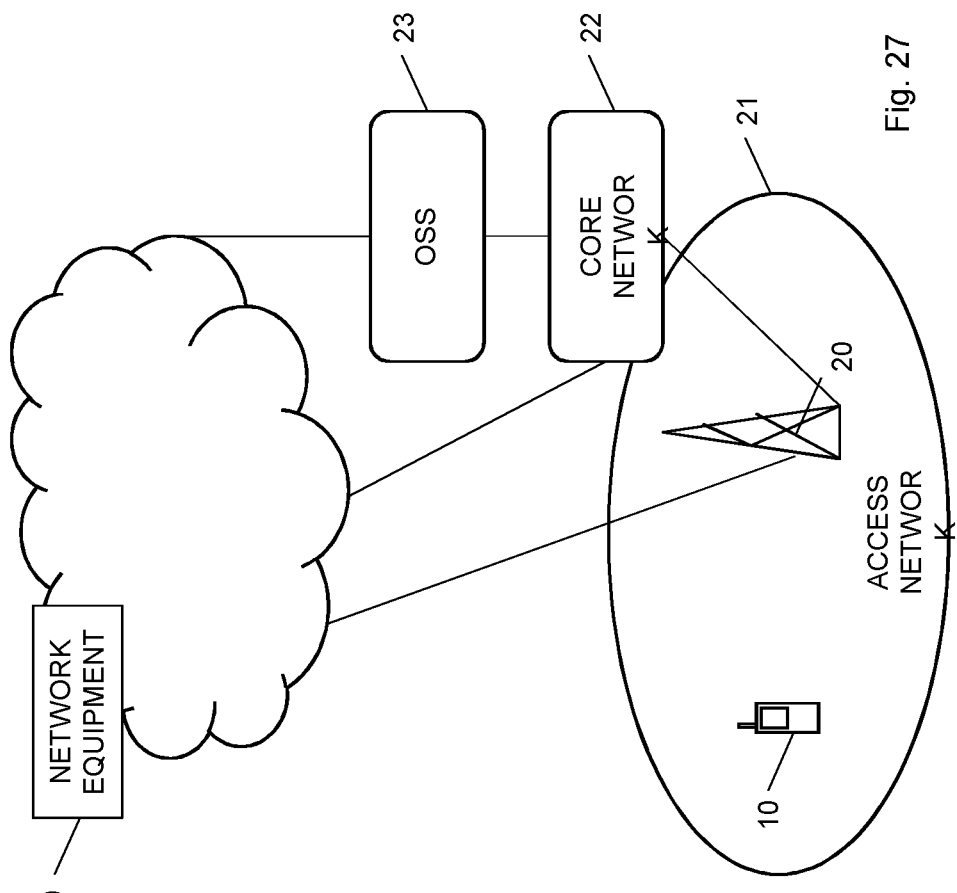
FIG. 27 is a schematic diagram of a wireless communication system according to an embodiment.

FIG. 24 is a schematic block diagram of a device 140 for encoding a first pixel having a color in a first color space in a picture according to an embodiment. The device 140 comprises a device 130 for processing the first pixel according to the embodiments to obtain a filtered value a first color component of the color in the first color space. The device 140 also comprises a calculator 141 for calculating a luma component value and chroma component values for the first pixel based on a smoothed value of the color in the first color space equal to the color in the first color space but with a value of the first color component in the color in the first color space replaced by the filtered value of the first color component. The device 140 further comprises an encoder 142 for encoding the luma component value and subsampled chroma component values.

Another aspect of the embodiments defines a processing device, for processing a first pixel in a picture. The first pixel having a color that is represented in a first color space. The processing device is configured to obtain a lower limit to a first color component of the first pixel in the first color space, based on a distance between the color and a distorted version of the color in a second color space, wherein the distorted version of the color is equal to the color in the first color space except in the first color component. The processing device is also configured to obtain an upper limit to the first color component of the first pixel in the first color space, based on a distance between the color and a distorted version of the color in the second color space, wherein the distorted version of the color is equal to the color in the first color space except in the first color component. The processing device is further configured to obtain a filtered value of the first color component for the pixel which is larger than or equal to the obtained lower limit and lower than or equal to the obtained upper limit.

Figure 25:
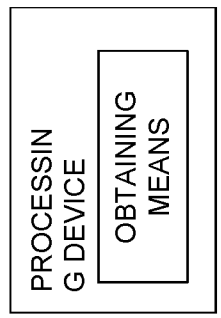
FIG. 25 illustrates a processing device according to embodiments of the present invention.

Another aspect of the embodiments defines a processing device for processing a first pixel in a picture, see FIG. 25. The first pixel having a color that is represented in a first color space. The processing device comprising an obtaining module for obtaining a lower limit to a first color component of the first pixel in the first color space, based on a distance between the color and a distorted version of the color in a second color space, wherein the distorted version of the color is equal to the color in the first color space except in the first color component. The obtaining module is also for obtaining an upper limit to the first color component of the first pixel in the first color space, based on a distance between the color and a distorted version of the color in the second color space, wherein the distorted version of the color is equal to the color in the first color space except in the first color component. The obtaining module is further for obtaining a filtered value of the first color component for the pixel which is larger than or equal to the obtained lower limit and lower than or equal to the obtained upper limit.

The processing device could also comprise an obtaining means configured to obtain a lower limit to a first color component of the first pixel in the first color space, based on a distance between the color and a distorted version of the color in a second color space, wherein the distorted version of the color is equal to the color in the first color space except in the first color component. The obtaining means is also configured to obtain an upper limit to the first color component of the first pixel in the first color space, based on a distance between the color and a distorted version of the color in the second color space, wherein the distorted version of the color is equal to the color in the first color space except in the first color component. The processing device is further configured to obtain a filtered value of the first color component for the pixel which is larger than or equal to the obtained lower limit and lower than or equal to the obtained upper limit.

The processing device may be implemented in a video encoder and a video decoder. It may be implemented in hardware, in software or a combination of hardware and software. The processing device may be implemented in, e.g. comprised in, user equipment, such as a mobile telephone, tablet, desktop, netbook, multimedia player, video streaming server, set-top box or computer.

Further, a data processing system, as illustrated in FIG. 21, can be used to implement the processing device. The data processing system includes at least one processor 101 that is further coupled to a network interface 103 via an interconnect. The at least one processor 101 is also coupled to a memory 102 via the interconnect. The memory 102 can be implemented by a hard disk drive, flash memory, or read-only memory and stores computer-readable instructions. The at least one processor 101 executes the computer-readable instructions and implements the functionality described above. The network interface 103 enables the data processing system to communicate with other nodes in a network. Alternative embodiments of the present invention may include additional components responsible for providing additional functionality, including any functionality described above and/or any functionality necessary to support the solution described herein.

A further aspect of the embodiments defines a computer program for a processing device comprising a computer program code which, when executed, causes the processing device to obtain a lower limit to a first color component of the first pixel in the first color space, based on a distance between the color and a distorted version of the color in a second color space, wherein the distorted version of the color is equal to the color in the first color space except in the first color component. The processing device is also caused to obtain an upper limit to the first color component of the first pixel in the first color space, based on a distance between the color and a distorted version of the color in the second color space, wherein the distorted version of the color is equal to the color in the first color space except in the first color component. The processing device is further caused to obtain a filtered value of the first color component for the pixel which is larger than or equal to the obtained lower limit and lower than or equal to the obtained upper limit.

A further aspect of the embodiments defines a computer program product comprising a computer program for a processing device and a computer readable means on which the computer program for a processing device is stored.

A further embodiment relates to a user equipment comprising a device for processing a first pixel in a picture or a device for encoding a first pixel having a color in a first color space in a picture according to the embodiments. In a particular embodiment, the user equipment is selected from a group consisting of a mobile telephone, a tablet, a desktop, a notebook, a multimedia player, a video streaming server, a set-top box and a computer.

The device for processing a first pixel in a picture and/or the device for encoding a first pixel having a color in a first color space in a picture according to the embodiments may alternatively be implemented in a network device or equipment being or belonging to a network node in a communication network. Such a network equipment may be a device for converting video according to one video coding standard to another video coding standard, i.e., transcoding. The network equipment can be in the form of or comprised in a radio base station, a Node-B or any other network node in a communication network, such as a radio-based network.

It is becoming increasingly popular to provide computing services, hardware and/or software, in network equipment, such as network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 26:
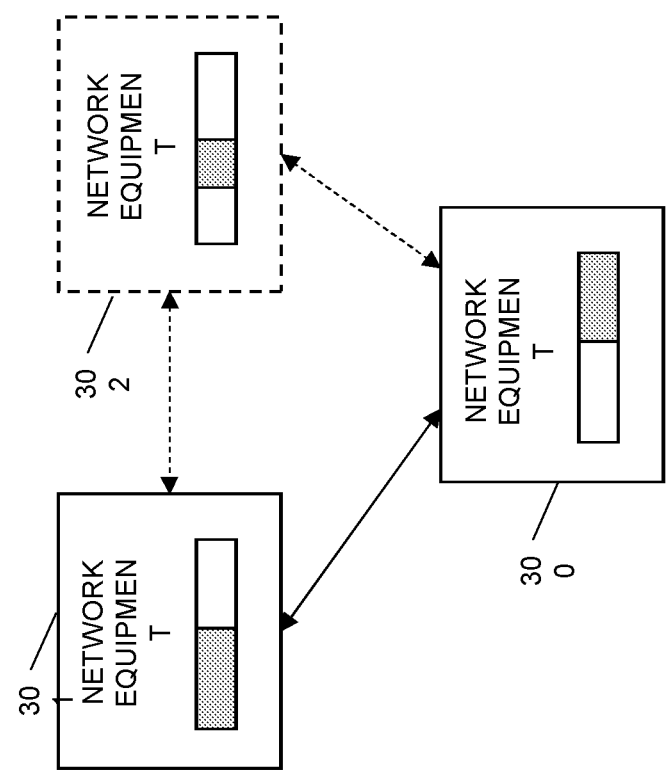
FIG. 26 a schematic diagram of a distributed implementation in network equipment according to an embodiment.

FIG. 26 is a schematic diagram illustrating an example of how functionality can be distributed or partitioned between different network equipment in a general case. In this example, there are at least two individual, but interconnected network equipment 300, 301, which may have different functionalities, or parts of the same functionality, partitioned between the network equipment 300, 301. There may be additional network devices 302 being part of such a distributed implementation. The network equipment 300, 301, 302 may be part of the same wireless or wired communication system, or one or more of the network devices may be so-called cloud-based network devices located outside of the wireless or wired communication system.

FIG. 28 is a schematic diagram illustrating an example of a wireless communication network or system, including an access network 21 and a core network 22 and optionally an operations and support system (OSS) 23 in cooperation with one or more cloud-based network equipment 300. The figure also illustrates a user equipment 10 connected to the access network 21 and capable of conducting wireless communication with a base station representing an embodiment of a network node 20.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] J. Ström, "Investigation of HDR Color Subsampling", ISO/IEC JTC1/SC29/WG11 MPEG2014/M35841, February 2015, Geneva, Switzerland
[2] Society of Motion Picture and Television Engineers (SMPTE) ST 2084:2014, High Dynamic Range Electro-Optical Transfer Function of Mastering Reference Displays
[3] CEA Standard, HDR Static Metadata Extensions, CEA-861.3, January 2015
[4] WO 2016/130066 A1
[5] ITU-R, Radiocommunication Sector of ITU, Recommendation ITU-R BT.1886, Reference electro-optical transfer function for flat panel displays used in HDTB studio production (March 2011)
[6] ITU-R, Radiocommunication Sector of ITU, Recommendation ITU-R BT.709-6, Parameter values for the HDTV standards for production and international programme exchange (June 2015)
[7] ITU-R, Radiocommunication Sector of ITU, Recommendation ITU-R BT.2020, Parameter values for ultra-high definition television systems for production and international programme exchange (August 2012)
[8] Society of Motion Picture and Television Engineers (SMPTE) EG 432-1:2010, Digital Source Processing—Color Processing For D-Cinema
[9] Society of Motion Picture and Television Engineers (SMPTE) EG 432.2:2006, Digital Source Processing—D-cinema Low Frequency Effects (lfe) Channel Audio Characteristics
[10] WO 2016/186547 A1
[11] J. Pytlarz: "Overview of ICtCp", ISO/IEC JTC1/SC29/WG11/M38148, February 2016, San Diego, USA.
[12] D. Rusanovskyy et al: "Single layer non-normative (category 3a) NCL and CL responses to the Call for Evidence on HDR/WCG", ISO/IEC JTC1/SC29/WG11/M36256, June 2015, Warsaw, Poland.

The invention claimed is:

1. A method for processing a first pixel in a picture, the first pixel having a color that is represented by a first color component, a second component, and a third component in a first color space, the method comprising:
  obtaining a value of a fourth color component in a second color space, which is generated using at least a maximum value of the first color component in the first color space;
  setting an upper limit of the first color component of the first pixel in the first color space to a first fixed value if the value of the fourth color component is below a first value of the fourth color component in the second color space and above a second value of the fourth color component in the second color space;
  obtaining another value of the fourth color component in the second color space, which is generated using at least a minimum value of the first color component in the first color space;
  setting a lower limit of the first color component in the first color space to a second fixed value if said another value of the fourth color component is below the first value of the fourth color component in the second color space and above the second value of the fourth color component in the second color space; and
  obtaining a filtered value of the first color component for the first pixel which is larger than or equal to the lower limit and lower than or equal to the upper limit.

2. The method according to claim 1, wherein the first value of the fourth color component in the second color space is equal to a value of the fourth color component in the second color space obtained based on the color of the first pixel in the first color space plus a delta value and the second value of the fourth color component in the second color space is equal to the value of the fourth color component in the second color space obtained based on the color of the first pixel in the first color space minus the delta value.

3. The method according to claim 1, wherein
  setting the upper limit comprises setting the upper limit of the first color component in the first color space to the maximum value of the first color component in the first color space if the maximum value of the first color component in the first color space results in the fourth color component in the second color space being below the first value of the fourth color component in the second color space and above the second value of the fourth color component in the second color space; and
  setting the lower limit comprises setting the lower limit of the first color component in the first color space to the minimum value of the first color component in the first color space if the minimum value of the first color component in the first color space results in the fourth color component in the second color space being below the first value of the fourth color component in the second color space and above the second value of the fourth color component in the second color space.

4. The method according to claim 1, wherein
  calculating, if the maximum value of the first color component in the first color space results in the fourth color component in the second color space being above the first value of the fourth color component in the second color space or below the second value of the fourth color component in the second color space, the upper limit based on the color of the first pixel and one of the first value of the fourth color component in the second color space and the second value of the fourth color component in the second color space; and
  calculating, if the minimum value of the first color component in the first color space results in the fourth color component in the second color space being above the first value of the fourth color component in the second color space or below the second value of the fourth color component in the second color space, the lower limit based on the color of the first pixel and one of the first value of the fourth color component in the second color space and the second value of the fourth color component in the second color space.

5. The method according to claim 1, wherein
  setting the upper limit comprises setting the upper limit of the first color component in a red, green, blue (RGB) color space to the first fixed value if the maximum value of the first color component in the RGB color space results in a chromaticity component in a luminance and chromaticity color space that is below a first value of the chromaticity component in the luminance and chromaticity color space and above a second value of the chromaticity component in the luminance and chromaticity color space; and setting the lower limit comprises setting the lower limit of the first color component in the RGB color space to the second fixed value if the minimum value of the first color component in the RGB color space results in the chromaticity component in the luminance and chromaticity color space being below the first value of the chromaticity component in the luminance and chromaticity color space and above the second value of the chromaticity component in the luminance and chromaticity color space.

6. The method according to claim 5, wherein
setting the upper limit comprises:
  setting an upper u' limit of a green component in the RGB color space to a maximum value of the green component in the RGB color space if the maximum value of the green component in the RGB color space results in a u' component in a luminance and chromaticity (Yu'v') color space that is below a first value of the u' component in the Yu'v' color space and above a second value of the u' component in the Yu'v' color space and otherwise calculating the upper u' limit based on the color of the first pixel and one of the first value of the u' component in the Yu'v' color space and the second value of the u' component in the Yu'v' color space; and
  setting an upper v' limit of the green component in the RGB color space to the maximum value of the green component in the RGB color space if the maximum value of the green component in the RGB color space results in a v' component in the Yu'v' color space that is below a first value of the v' component in the Yu'v' color space and above a second value of the v' component in the Yu'v' color space and otherwise calculating the upper v' limit based on the color of the first pixel and one of the first value of the v' component in the Yu'v' color space and the second value of the v' component in the Yu'v' color space;
setting the lower limit comprises:
  setting a lower u' limit of the green component in the RGB color space to a minimum value of the green component in the RGB color space if the minimum value of the green component in the RGB color space results in the u' component in the Yu'v' color space being below the first value of the u' component in the Yu'v' color space and above the second value of the u' component in the Yu'v' color space and otherwise calculating the lower u' limit based on the color of the first pixel and one of the first value of the u' component in the Yu'v' color space and the second value of the u' component in the Yu'v' color space; and
  setting a lower v' limit of the green component in the RGB color space to the minimum value of the green component in the RGB color space if the minimum value of the green component in the RGB color space results in the v' component in the Yu'v' color space being below the first value of the v' component in the Yu'v' color space and above the second value of the v' component in the Yu'v' color space and otherwise calculating the lower v' limit based on the color of the first pixel and one of the first value of the v' component in the Yu'v' color space and the second value of the v' component in the Yu'v' color space; and
the method comprises obtaining a filtered value of the green component for the first pixel which is larger than or equal to a largest lower limit of the lower u' limit and the lower v' limit and lower than or equal to a smallest of the upper u' limit and upper v' limit.

7. The method according to claim 1, wherein obtaining the filtered value of the first color component comprises:
  calculating the filtered value of the first color component for the first pixel based on respective values of the first color component for the first pixel and neighboring pixels in the picture; and
  clamping the filtered value between the lower limit and the upper limit so that the filtered value is larger than or equal to the lower limit and lower than or equal to the upper limit.

8. The method according to claim 7, wherein calculating the filtered value comprises calculating the filtered value of the first color component for the first pixel as an average of respective values of the first color component for the pixel and the neighboring pixels of the first pixel in the picture.

9. A device for processing a first pixel in a picture, the first pixel having a color that is represented by a first color component, a second color component, and a third color component in a first color space, the device comprising:
  a processor; and
  a memory comprising instructions executable by the processor, wherein the device is configured to:
    obtain a value of a fourth color component in a second color space, which is generated using at least a maximum value of the first color component in the first color space;
    set an upper limit of the first color component of the first pixel in the first color space to a first fixed value if the value of the fourth color component is below a first value of the fourth color component in the second color space and above a second value of the fourth color component in the second color space;
    obtain another value of the fourth color component in the second color space, which is generated using at least a minimum value of the first color component in the first color space;
    set a lower limit of the first color component in the first color space to a second fixed value if said another value of the fourth color component is below the first value of the fourth color component in the second color space and above the second value of the fourth color component in the second color space; and
    obtain a filtered value of the first color component for the first pixel which is larger than or equal to the lower limit and lower than or equal to the upper limit.

10. The device according to claim 9, wherein the device is configured to:
  set the upper limit of the first color component in the first color space to the maximum value of the first color component in the first color space if the maximum value of the first color component in the first color space results in the fourth color component in the second color space being below the first value of the fourth color component in the second color space and above the second value of the fourth color component in the second color space; and
  set the lower limit of the first color component in the first color space to the minimum value of the first color component in the first color space if the minimum value of the first color component in the first color space results in the fourth color component in the second color space being below the first value of the fourth color component in the second color space and above the second value of the fourth color component in the second color space.

11. The device according to claim 9, wherein the device is configured to:
- calculate, if the maximum value of the first color component in the first color space results in the fourth color component in the second color space being above the first value of the fourth color component in the second color space or below the second value of the fourth color component in the second color space, the upper limit based on the color of the first pixel and one of the first value of the fourth color component in the second color space and the second value of the fourth color component in the second color space; and
- calculate, if the minimum value of the first color component in the first color space results in the fourth color component in the second color space being above the first value of the fourth color component in the second color space or below the second value of the fourth color component in the second color space, the lower limit based on the color of the first pixel and one of the first value of the fourth color component in the second color space and the second value of the fourth color component in the second color space.

12. The device according to claim 9, wherein the device is configured to:
- set the upper limit of the first color component in a red, green, blue (RGB) color space to the first fixed value if the maximum value of the first color component in the RGB color space results in a chromaticity component in a luminance and chromaticity color space that is below a first value of the chromaticity component in the luminance and chromaticity color space and above a second value of the chromaticity component in the luminance and chromaticity color space; and
- set the lower limit of the first color component in the RGB color space to the second fixed value if the minimum value of the first color component in the RGB color space results in the chromaticity component in the luminance and chromaticity color space being below the first value of the chromaticity component in the luminance and chromaticity color space and above the second value of the chromaticity component in the luminance and chromaticity color space.

13. The device according to claim 12, wherein the device is configured to:
- set an upper u' limit of a green component in the RGB color space to a maximum value of the green component in the RGB color space if the maximum value of the green component in the RGB color space results in a u' component in a luminance and chromaticity (Yu'v') color space that is below a first value of the u' component in the Yu'v' color space and above a second value of the u' component in the Yu'v' color space and otherwise calculate the upper u' limit based on the color of the first pixel and one of the first value of the u' component in the Yu'v' color space and the second value of the u' component in the Yu'v' color space;
- set a lower u' limit of the green component in the RGB color space to a minimum value of the green component in the RGB color space if the minimum value of the green component in the RGB color space results in the u' component in the Yu'v' color space being below the first value of the u' component in the Yu'v' color space and above the second value of the u' component in the Yu'v' color space and otherwise calculate the lower u' limit based on the color of the first pixel and one of the first value of the u' component in the Yu'v' color space and the second value of the u' component in the Yu'v' color space;
- set an upper v' limit of the green component in the RGB color space to the maximum value of the green component in the RGB color space if the maximum value of the green component in the RGB color space results in a v' component in the Yu'v' color space that is below a first value of the v' component in the Yu'v' color space and above a second value of the v' component in the Yu'v' color space and otherwise calculate the upper v' limit based on the color of the first pixel and one of the first value of the v' component in the Yu'v' color space and the second value of the v' component in the Yu'v' color space;
- set a lower v' limit of the green component in the RGB color space to the minimum value of the green component in the RGB color space if the minimum value of the green component in the RGB color space results in the v' component in the Yu'v' color space being below the first value of the v' component in the Yu'v' color space and above the second value of the v' component in the Yu'v' color space and otherwise calculate the lower v' limit based on the color of the first pixel and one of the first value of the v' component in the Yu'v' color space and the second value of the v' component in the Yu'v' color space; and
- obtain a filtered value of the green component for the first pixel which is larger than or equal to a largest lower limit of the lower u' limit and the lower v' limit and lower than or equal to a smallest of the upper u' limit and upper v' limit.

14. The device according to claim 9, wherein the device is configured to:
- calculate the filtered value of the first color component for the first pixel based on respective values of the first color component for the first pixel and neighboring pixels in the picture; and
- clamp the filtered value between the obtained lower limit and the obtained upper limit so that the filtered value is larger than or equal to the obtained lower limit and lower than or equal to the obtained upper limit.

15. The device according to claim 14, wherein the device is configured to calculate the filtered value of the first color component for the first pixel as an average of respective values of the first color component for the pixel and the neighboring pixels of the first pixel in the picture.

16. The device according to claim 9, wherein the processor is operative to:
- set the upper limit of the first color component;
- set the lower limit of the first color component; and
- obtain the filtered value of the first color component.

17. A user equipment comprising a device according to claim 9, wherein the user equipment is selected from a group consisting of a mobile telephone, a tablet, a desktop, a notebook, a multimedia player, a video streaming server, a set-top box and a computer.

18. A device for encoding a first pixel having a color in a first color space in a picture, the first pixel having a color that is represented by a first color component, a second component, and a third component in the first color space, comprising:
- a processor; and
- a memory comprising instructions executable by the processor, wherein the processor is operative to:
- obtain a value of a fourth color component in a second color space, which is generated using at least a maximum value of the first color component in the first color space;
- set an upper limit of the first color component of the first pixel in the first color space to a first fixed value if the value of the fourth color component is below a first value of the fourth color component in the second color space and above a second value of the fourth color component in the second color space;
- obtain another value of the fourth color component in the second color space, which is generated using at least a minimum value of the first color component in the first color space;
- set a lower limit of the first color component in the first color space to a second fixed value if said another value of the fourth color component is below the first value of the fourth color component in the second color space and above the second value of the fourth color component in the second color space;
- obtain a filtered value of the first color component for the first pixel which is larger than or equal to the lower limit and lower than or equal to the upper limit;
- calculate a luma component value and chroma component values for the first pixel based on a smoothed value of the color in the first color space comprising a value of the first color component in the color in the first color space replaced by the filtered value of the first color component; and
- encode the luma component value and subsampled chroma component values.

19. A computer program product comprising a non-transitory computer readable medium storing a computer program comprising instructions, which when executed by at least one processor, cause the at least one processor to:
- set, for a first pixel in a picture having a color that is represented by a first color component, a second component, and a third component in a first color space, an upper limit of a first color component of the first pixel in the first color space to a first fixed value if a value of a fourth color component in a second color space is below a first value of the fourth color component in the second color space and above a second value of the fourth color component in the second color space, wherein the value of the fourth color component in the second color space is generated using at least a maximum value of the first color component in the first color space;
- set a lower limit of the first color component in the first color space to a second fixed value if another value of the fourth color component in the second color space is below the first value of the fourth color component in the second color space and above the second value of the fourth color component in the second color space, wherein said another value of the fourth color component in the second color space is generated using at least a minimum value of the first color component in the first color space; and
- obtain a filtered value of the first color component for the first pixel which is larger than or equal to the lower limit and lower than or equal to the upper limit.

* * * * *